United States Patent [19]
Tagami et al.

[11] Patent Number: 5,402,171
[45] Date of Patent: Mar. 28, 1995

[54] ELECTRONIC STILL CAMERA WITH IMPROVED PICTURE RESOLUTION BY IMAGE SHIFTING IN A PARALLELOGRAM ARRANGEMENT

[75] Inventors: Yoshitomo Tagami, Urayasu; Yuji Ide; Masafumi Umeda, both of Yokohama; Toshihiro Morohoshi, Ichikawa; Kazuhiro Takashima, Tokyo; Mitsuo Sasuga, Saitama; Akihiko Sugikawa, Osaka, all of Japan

[73] Assignee: Kabushiki Kaisha Toshiba, Kawasaki, Japan

[21] Appl. No.: 118,581

[22] Filed: Sep. 10, 1993

[30] Foreign Application Priority Data

Sep. 11, 1992 [JP] Japan .................. 4-243737

[51] Int. Cl.⁶ .............................................. H04N 5/335
[52] U.S. Cl. ................................... 348/219; 348/279; 348/280; 250/208.1
[58] Field of Search ................ 348/219, 332, 335, 322, 348/271; H04N 5/335, 9/07, 9/77, 5/225; 250/208.1

[56] References Cited

U.S. PATENT DOCUMENTS

| | | | |
|---|---|---|---|
| 3,110,762 | 11/1963 | Frank | 178/6 |
| 4,517,603 | 5/1985 | Epsztein et al. | 348/219 |
| 4,633,317 | 12/1986 | Uwira et al. | 348/219 |
| 4,638,371 | 1/1987 | Milch | 348/219 |
| 4,641,038 | 2/1987 | Baker | 348/332 |
| 4,920,418 | 3/1990 | Robinson | 348/219 |
| 4,967,264 | 10/1990 | Parulski et al. | 348/271 |
| 4,998,164 | 3/1991 | Endo et al. | 348/219 |

FOREIGN PATENT DOCUMENTS

| | | | |
|---|---|---|---|
| 63-284978 | 11/1988 | Japan | H04N 5/335 |
| 63-284980 | 11/1988 | Japan | H04N 5/335 |
| 378388 | 4/1991 | Japan | H04N 9/07 |
| 3231589 | 10/1991 | Japan | H04N 9/07 |
| 470275 | 3/1992 | Japan | H04N 5/235 |

OTHER PUBLICATIONS

Hoagland, Kenneth A., 'Image-Shift Resolution Enhancement Techniques for CCD Imagers', SID 82 Digest, 1982.

Primary Examiner—James J. Groody
Assistant Examiner—Cheryl Cohen
Attorney, Agent, or Firm—Cushman, Darby & Cushman

[57] ABSTRACT

An electronic still camera comprises a solid state image sensor for outputting a color picture signal corresponding an incident optical image, a signal processor for signal-processing the color picture signal from the solid state image sensor to produce a color still picture signal, a recorder for recording the color still picture signal produced by the signal processor, and a driver for moving at least one of the optical image and the solid state image sensor from an original position in a horizontal direction by a pixel pitch and in an oblique axial direction defined by horizontal and vertical lines extending respectively from the original position in the horizontal and vertical directions by half the pixel pitch.

32 Claims, 37 Drawing Sheets

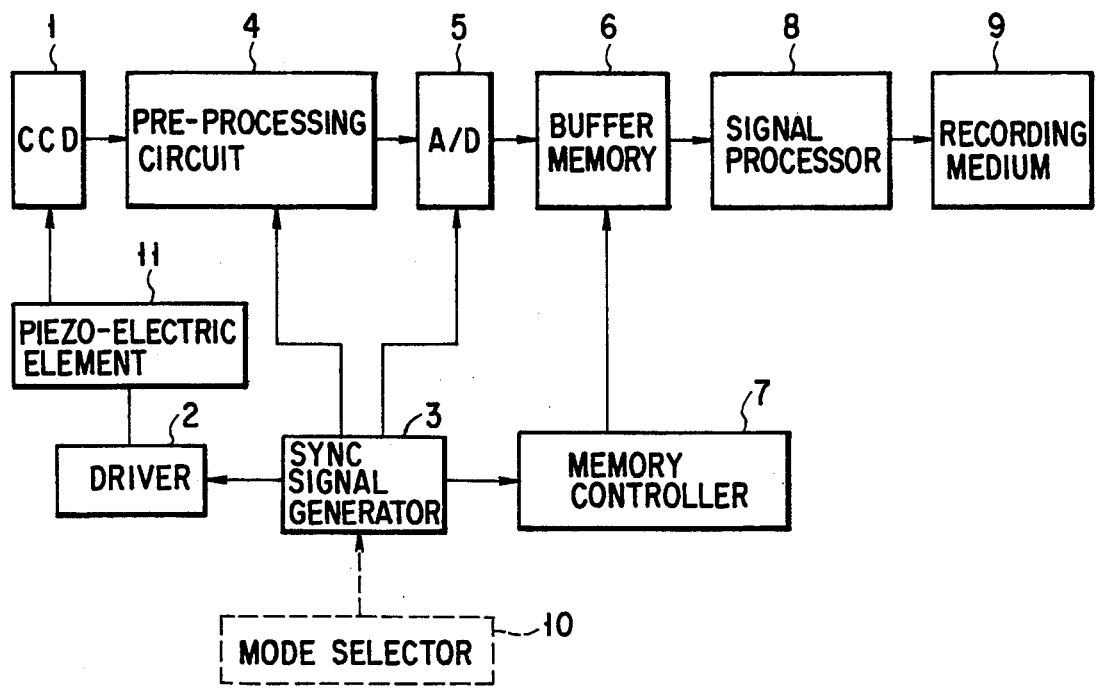
F I G. 1
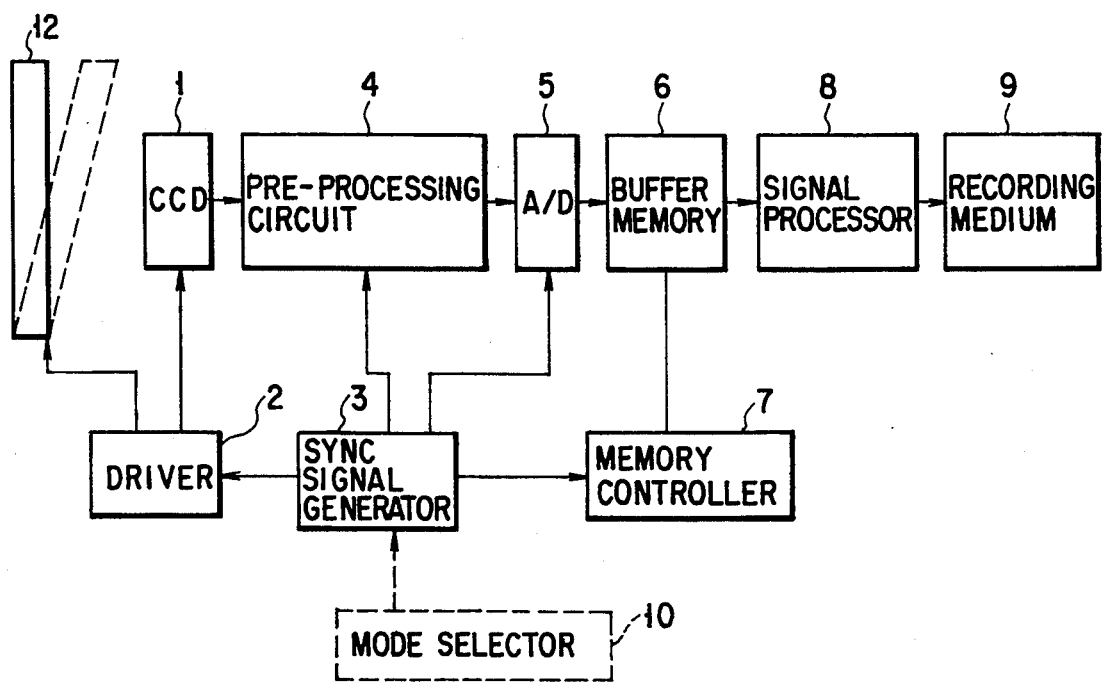
F I G. 2

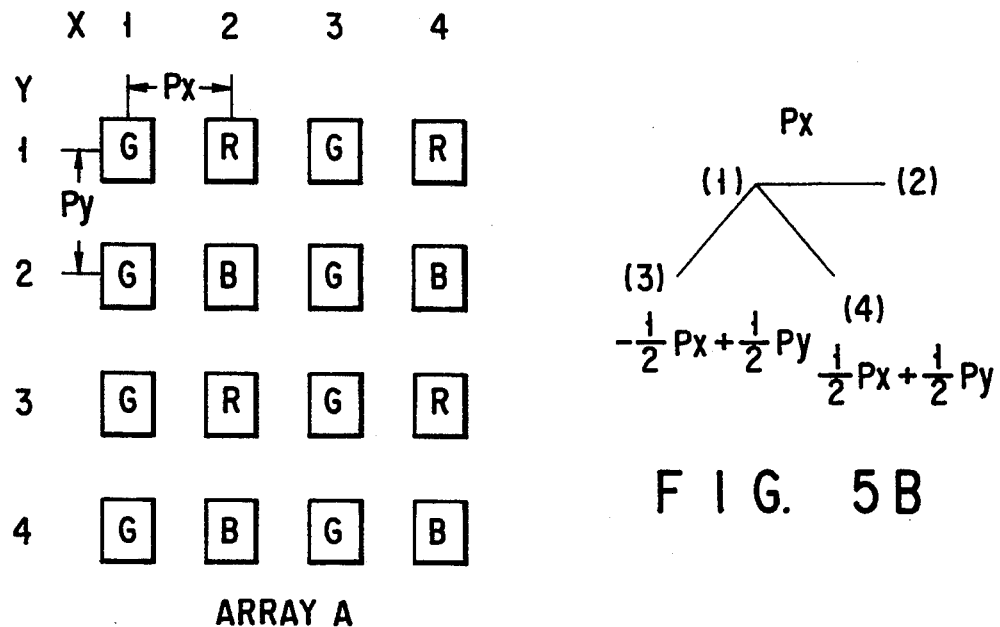
FIG. 5A
FIG. 5B
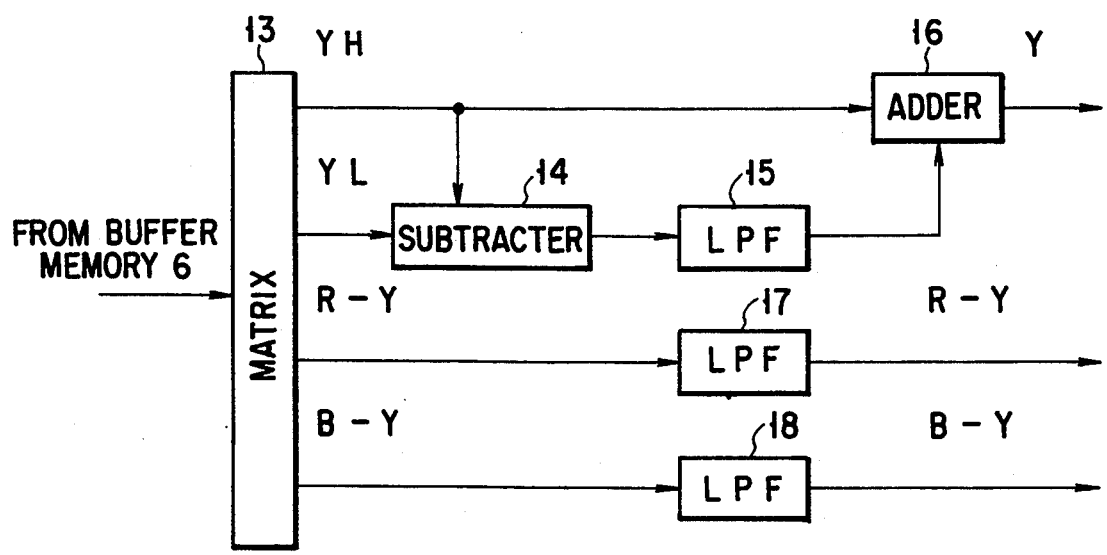
FIG. 6

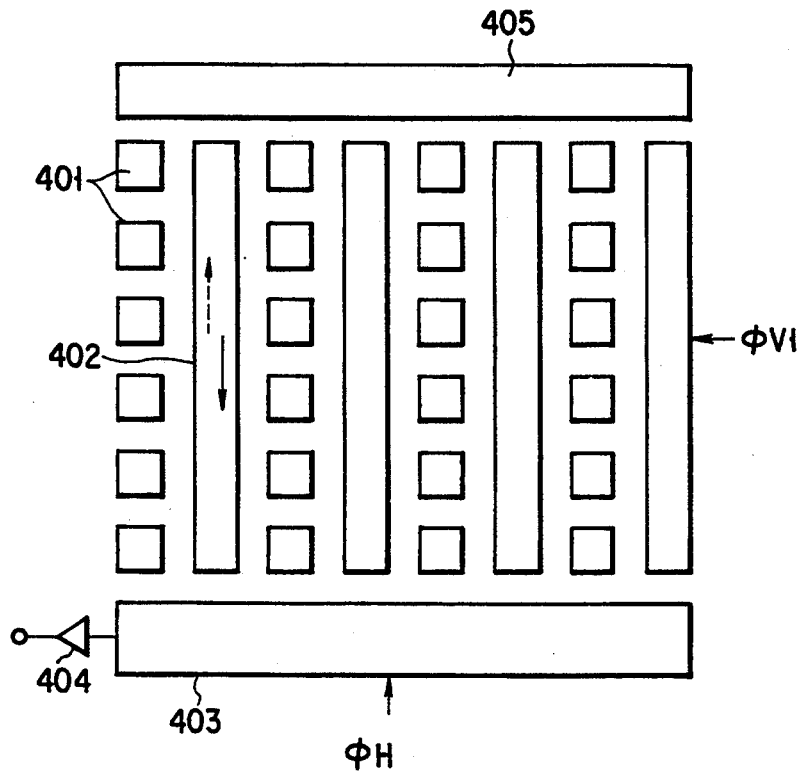
FIG. 7
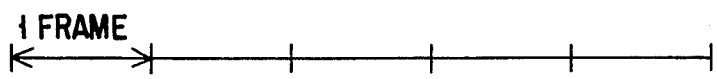
FIG.8A CHARGE STORING
FIG.8B CCD POSITION
FIG.8C CHARGE DRAINING
FIG.8D CHARGE STORING AFTER CHARGE DRAIN
FIG.8E CHARGE EXTRACTION

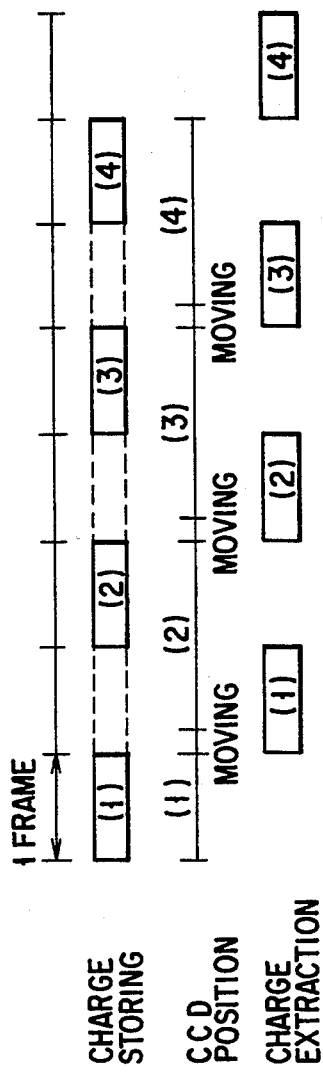
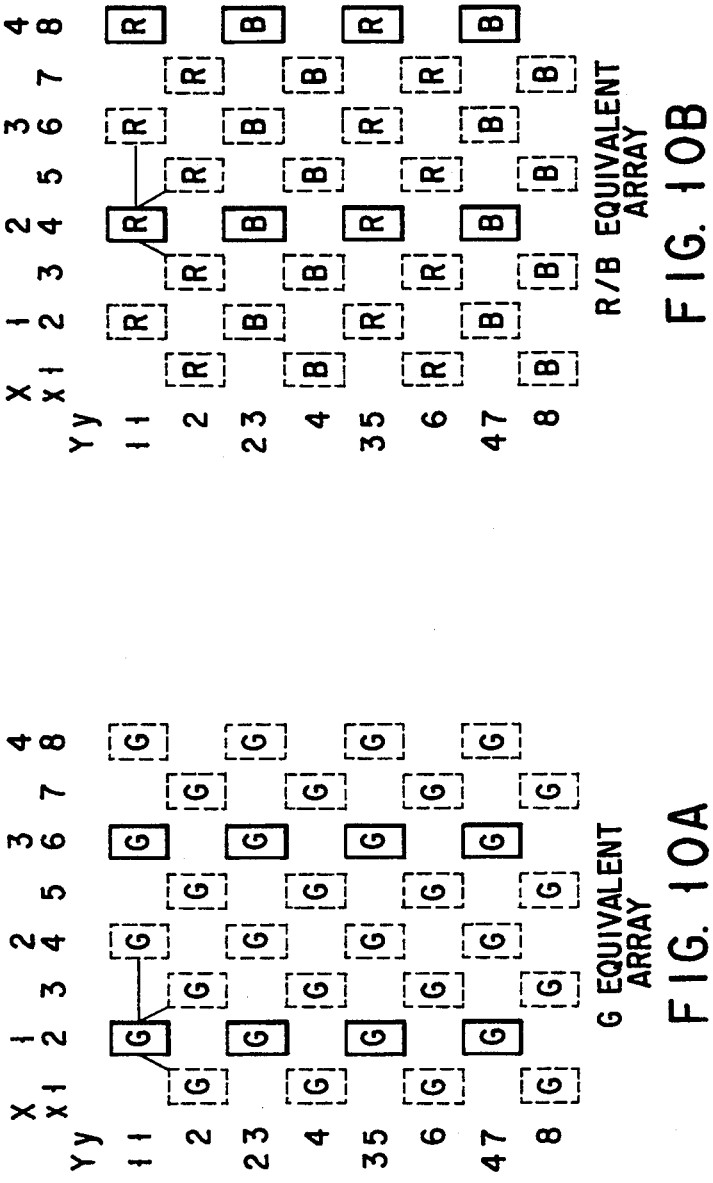

HORIZONTAL ADDRESS →

VERTICAL ADDRESS ↓

| G1.2 (1) | R1.2 (2) | G1.4 (2) | R1.4 (1) | G1.6 (1) | R1.6 (2) | G1.8 (2) | R1.8 (1) |
|---|---|---|---|---|---|---|---|
| G2.1 (3) | R2.1 (4) | G2.3 (4) | R2.3 (3) | G2.5 (3) | R2.5 (4) | G2.7 (4) | R2.7 (3) |
| G3.2 (1) | B3.2 (2) | G3.4 (2) | B3.4 (1) | G3.6 (1) | B3.6 (2) | G3.8 (2) | B3.8 (1) |
| G4.1 (3) | B4.1 (4) | G4.3 (4) | B4.3 (3) | G4.5 (3) | B4.5 (4) | G4.7 (4) | B4.7 (3) |
| G5.2 (1) | R5.2 (2) | G5.4 (2) | R5.4 (1) | G5.6 (1) | R5.6 (2) | G5.8 (2) | R5.8 (1) |
| G6.1 (3) | R6.1 (4) | G8.3 (4) | R6.3 (3) | G6.5 (3) | R6.5 (4) | G6.7 (4) | R6.7 (3) |
| G7.2 (1) | B7.2 (2) | G7.4 (2) | B7.4 (1) | G7.6 (1) | B7.6 (2) | G7.8 (2) | B7.8 (1) |
| G8.1 (3) | B8.1 (4) | G8.3 (4) | B8.3 (3) | G8.5 (3) | B8.5 (4) | G8.7 (4) | B8.7 (3) |

A l.m
(n)

A: FILTER TYPE
1: VERTICAL ADDRESS (y NUMBER) IN FIGS. 10A & 10B
m: HORIZONTAL ADDRESS (x NUMBER) IN FIGS. 10A & 10B
(n): SHIFTED POSITION OF CCD

F I G. 11

ARRAY C

G EQUIVALENT ARRAY

R/B EQUIVALENT ARRAY

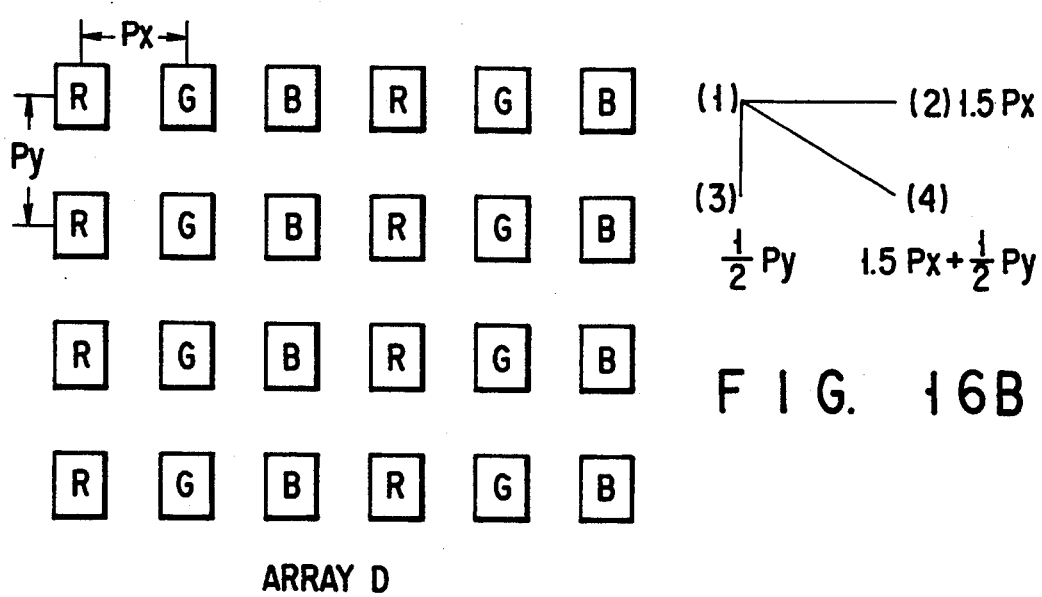
ARRAY D
FIG. 16A
FIG. 16B
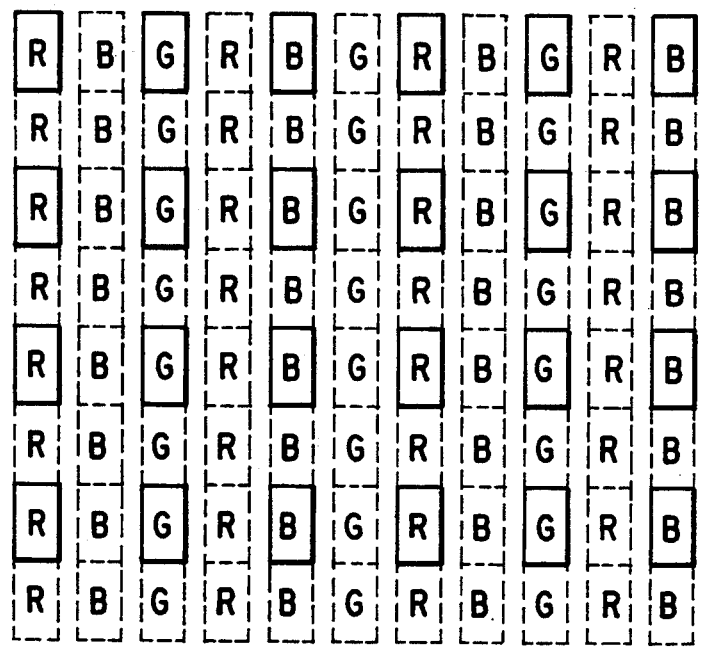
EQUIVALENT ARRAY
FIG. 17

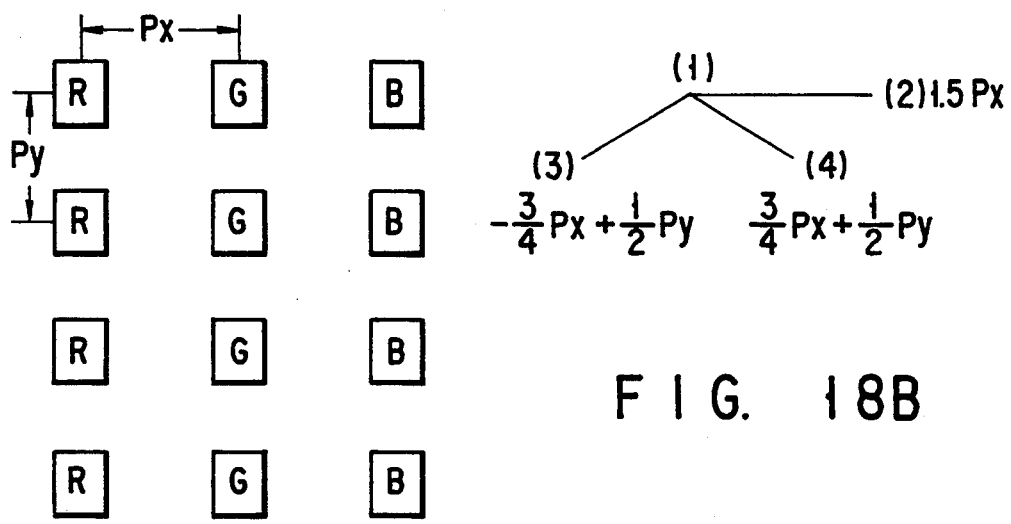
FIG. 18B
ARRAY D
FIG. 18A
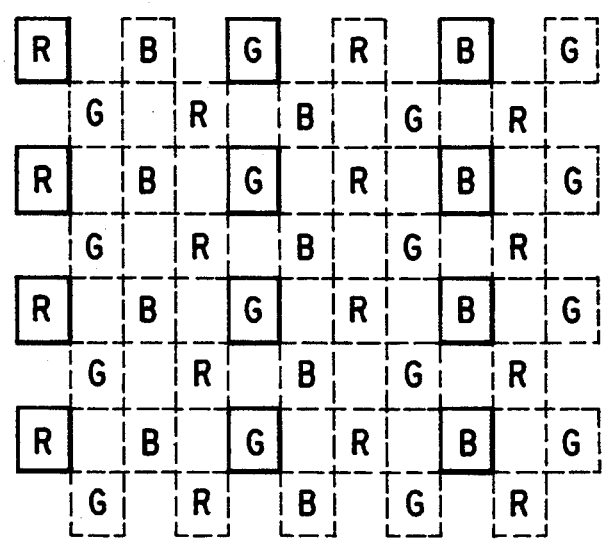
EQUIVALENT ARRAY
FIG. 19

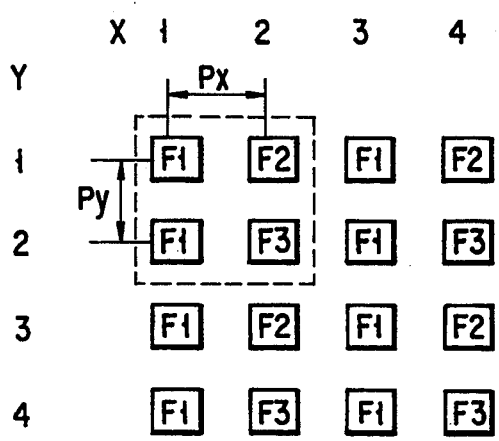
FIG. 20
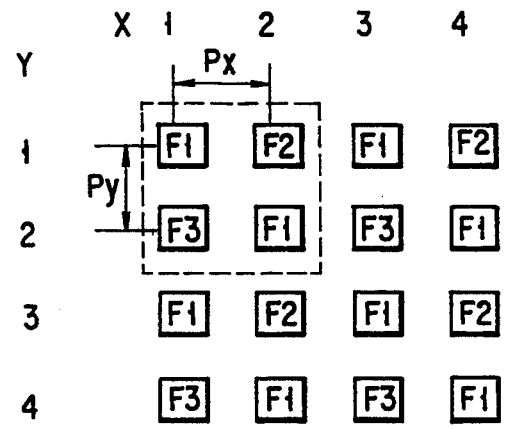
FIG. 21
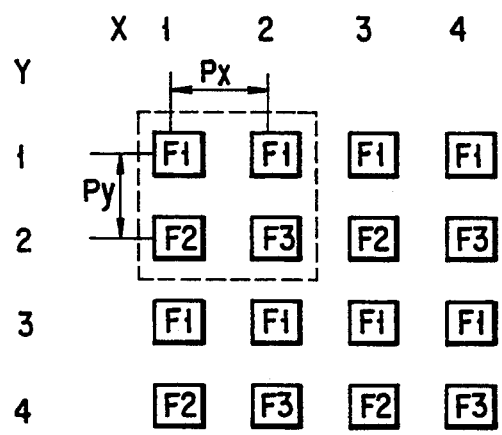
FIG. 22
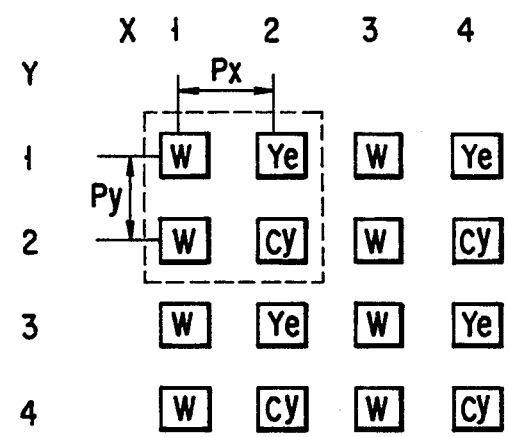
FIG. 23
$$\begin{array}{c} Px \\ (1) \longrightarrow (2) \\ (3) \swarrow \searrow (4) \\ -\tfrac{1}{2}Px+\tfrac{1}{2}Py \quad \tfrac{1}{2}Px+\tfrac{1}{2}Py \end{array}$$
FIG. 24

F1 EQUIVALENT ARRAY

FIG. 25A

F2, F3 EQUIVALENT ARRAY

FIG. 25B

W EQUIVALENT ARRAY

FIG. 26A

Ye, Cy EQUIVALENT ARRAY

FIG. 26B (1) Py
(2)
(3) $\frac{1}{2}Px - \frac{1}{2}Py$
(4) $\frac{1}{2}Px + \frac{1}{2}Py$

FIG. 27

F I G. 28A — F1 EQUIVALENT ARRAY

F I G. 28B — F2, F3 EQUIVALENT ARRAY

F I G. 29

F I G. 30

F I G. 31

F I G. 32

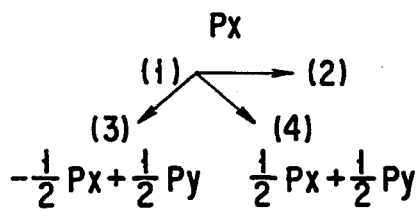
F I G. 33
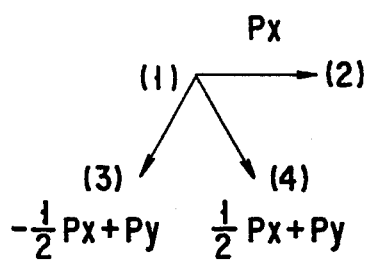
F I G. 35
```
X  1     2     3     4
x  1  2  3  4  5  6  7  8
Y y
1 1 [Fa]  [Fa]  [Fa]  [Fa]
  2    [Fa]  [Fa]  [Fa]  [Fa]
2 3 [Fb]  [Fb]  [Fb]  [Fb]
  4    [Fb]  [Fb]  [Fb]  [Fb]
3 5 [Fa]  [Fa]  [Fa]  [Fa]
  6    [Fa]  [Fa]  [Fa]  [Fa]
4 7 [Fb]  [Fb]  [Fb]  [Fb]
  8    [Fb]  [Fb]  [Fb]  [Fb]
```
Fa : Ye, Cy PIXELS
Fb : G, Mg PIXELS
F I G. 34
```
X  1     2     3     4
x  1  2  3  4  5  6  7  8
Y y
1 1 [Fa][Fb][Fa][Fb][Fa][Fb][Fa][Fb]
  2
2 3 [Fb][Fa][Fb][Fa][Fb][Fa][Fb][Fa]
  4
3 5 [Fa][Fb][Fa][Fb][Fa][Fb][Fa][Fb]
  6
4 7 [Fb][Fa][Fb][Fa][Fb][Fa][Fb][Fa]
  8
```
Fa : Ye, Cy PIXELS
Fb : G, Mg PIXELS
F I G. 36
```
X   1    2    3    4
       ├Px┤
Y  1 [Ye][Cy][Ye][Cy]
   Py
   2 [G ][Mg][G ][Mg]
   3 [Ye][Cy][Ye][Cy]
   4 [G ][Mg][G ][Mg]
```
F I G. 37
```
X   1    2    3    4
       ├Px┤
Y  1 [Ye][Cy][Ye][Cy]
   Py
   2 [Mg][G ][Mg][G ]
   3 [Ye][Cy][Ye][Cy]
   4 [G ][Mg][G ][Mg]
```
F I G. 38

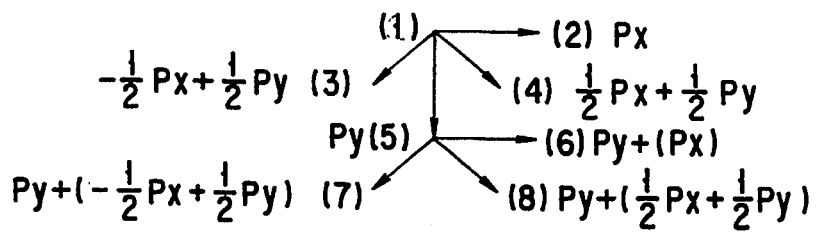
FIG. 39
F F1,F2,F3 EQUIVALENT ARRAY
FIG. 42
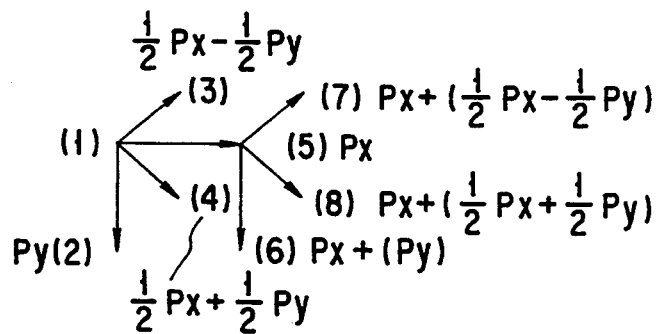
FIG. 40
FIG. 41

ARRAY E

EQUIVALENT ARRAY

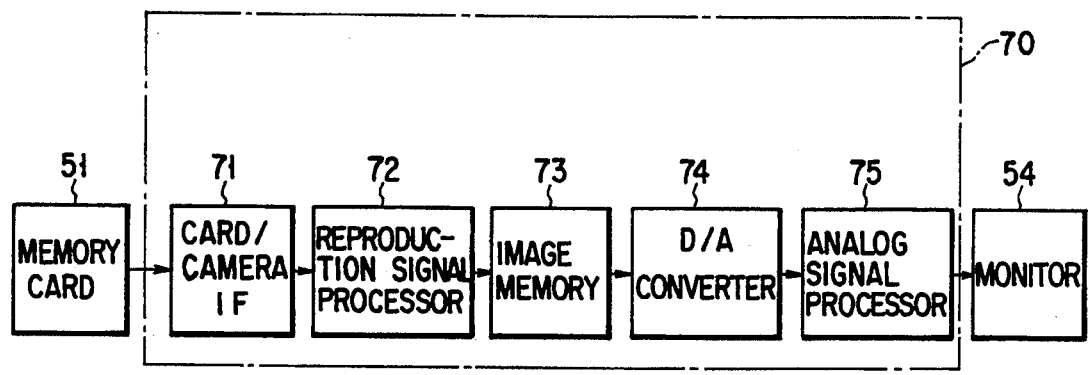
F I G. 51
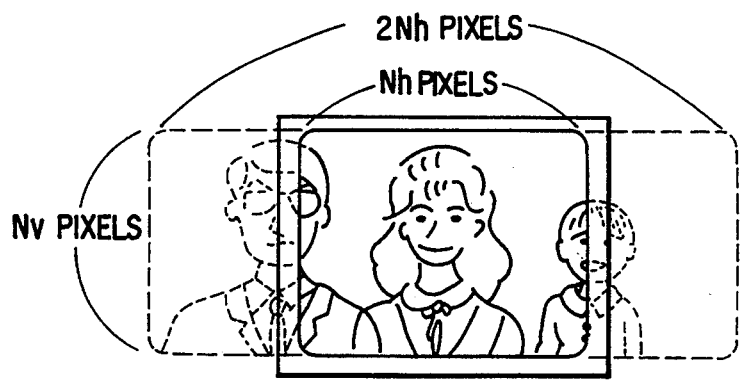
F I G. 52
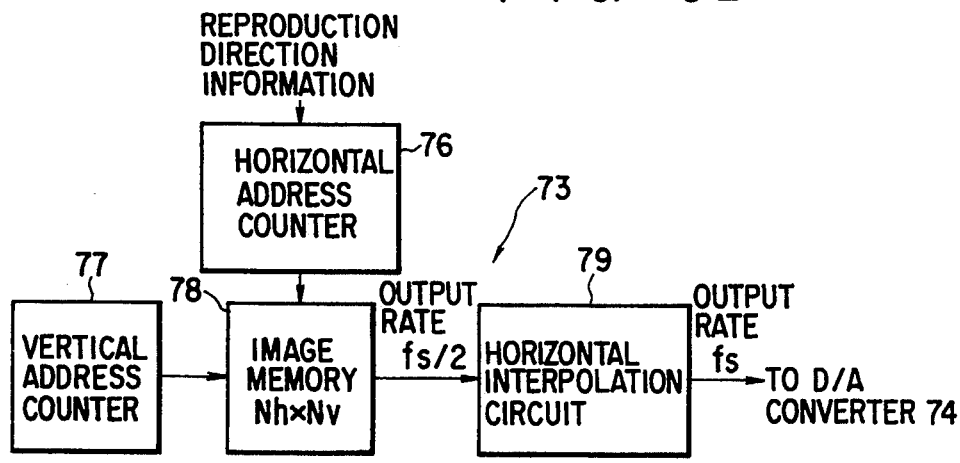
F I G. 53

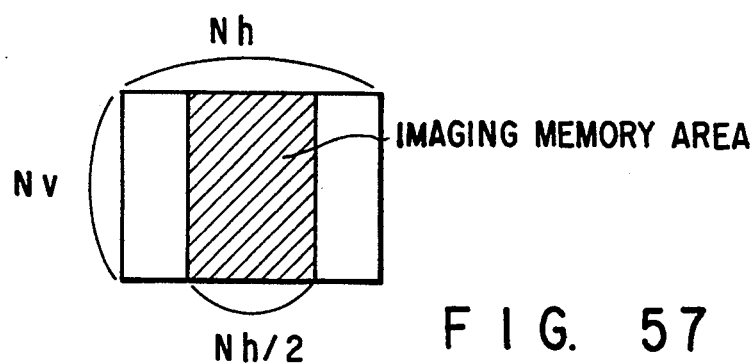
F I G. 57
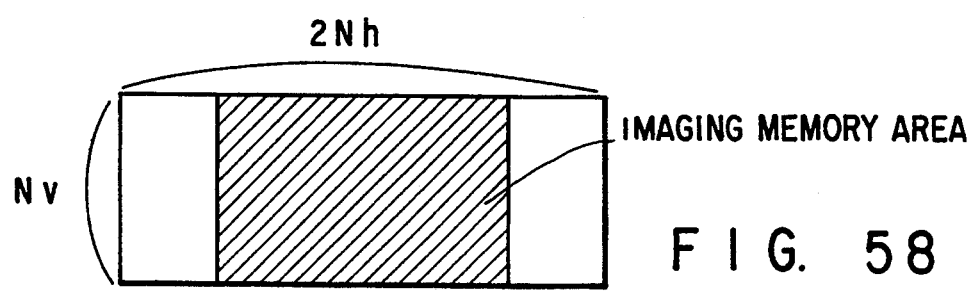
F I G. 58
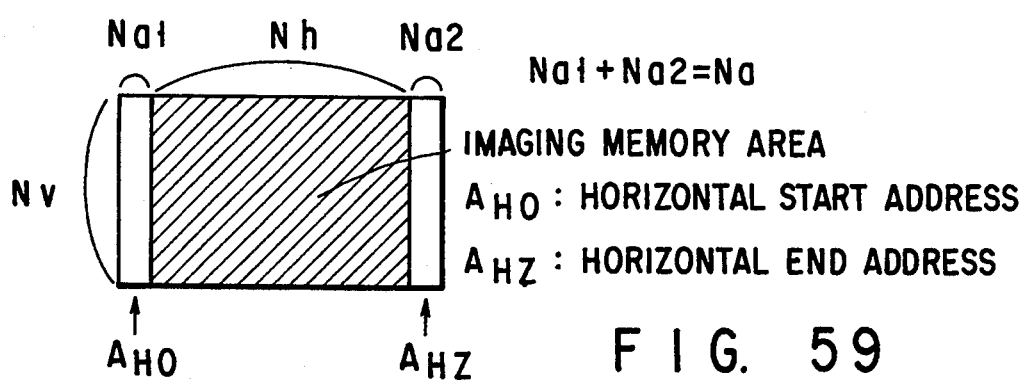
F I G. 59
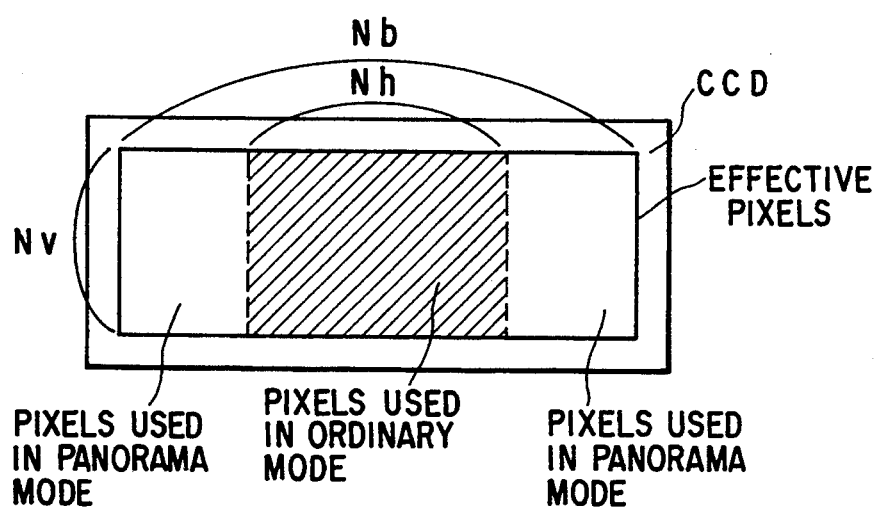
F I G. 60

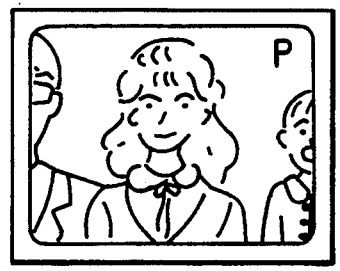
F I G. 61
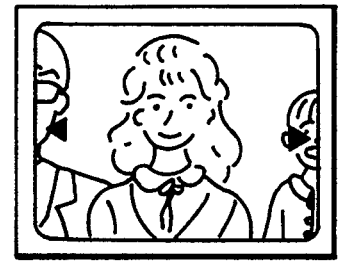
F I G. 62
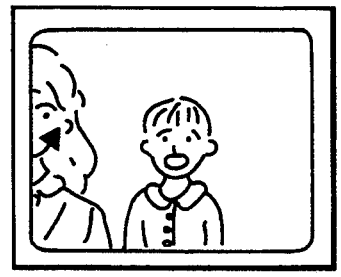
F I G. 63
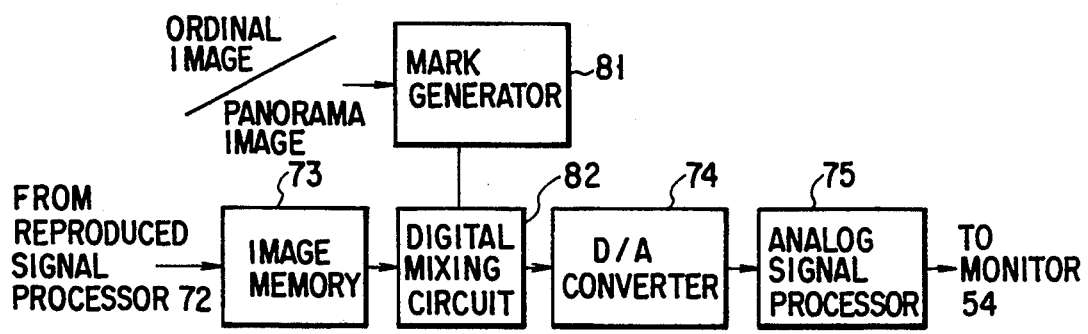
F I G. 64
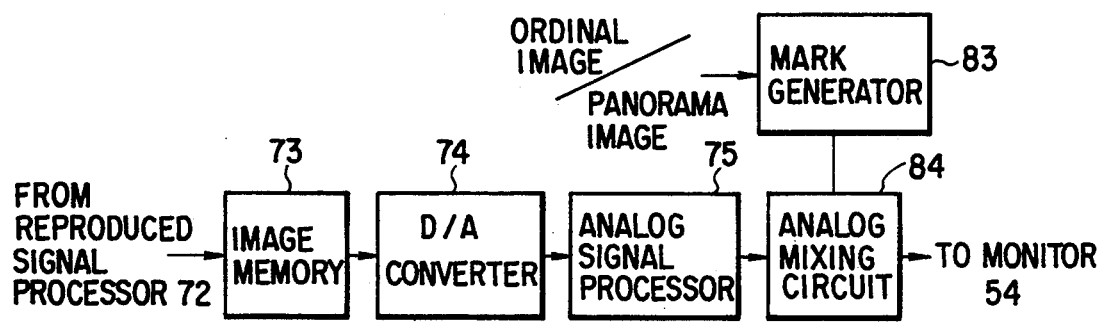
F I G. 65

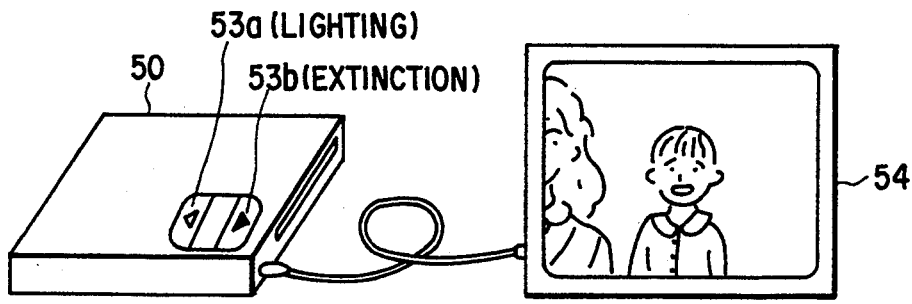
FIG. 66
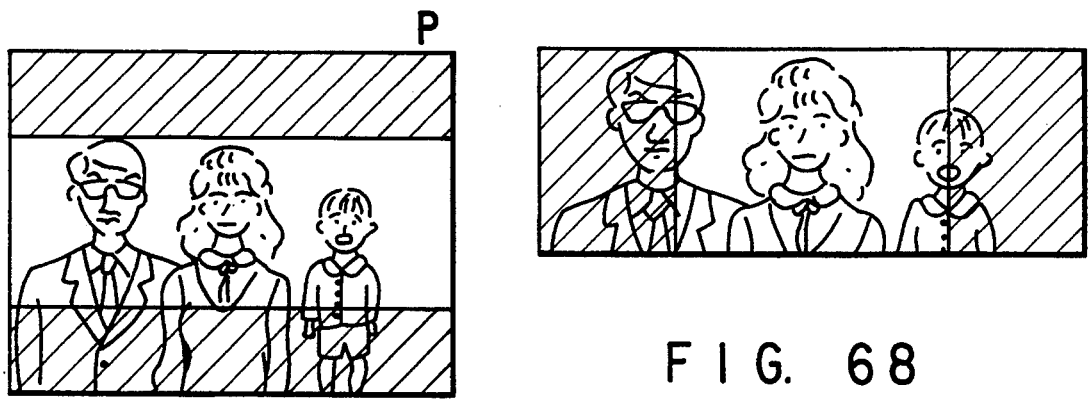
FIG. 67
FIG. 68
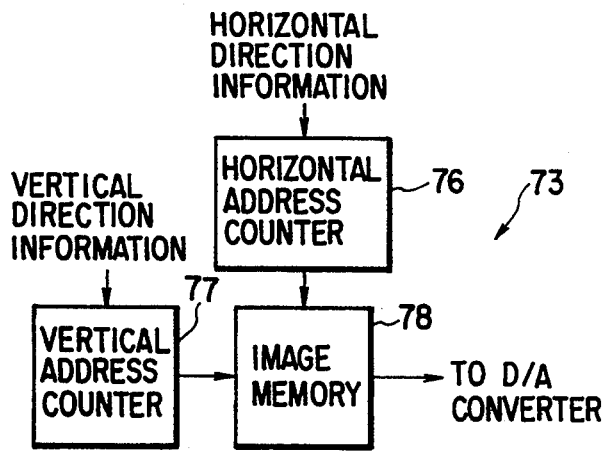
FIG. 69
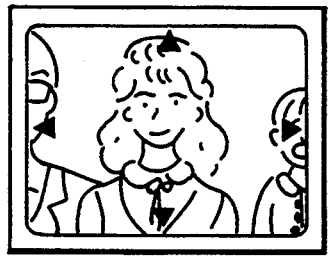
FIG. 70

| LOCATION | YOKOHAMA | | 3.10.1992 15:20 |

OUTDOOR  INDOOR

KIND  PERSON(S)  LANDSCAPE  PRINTED MATTER

DATE  ☐ MONTH ☐ DATE ☐ YEAR

SEASON  TIME OF THE DAY  HOW LONG AGO

BEFORE ABOUT  2 MONTHS

1 DAY  1 WEEK  1 MONTH  1 YEAR

F I G. 76

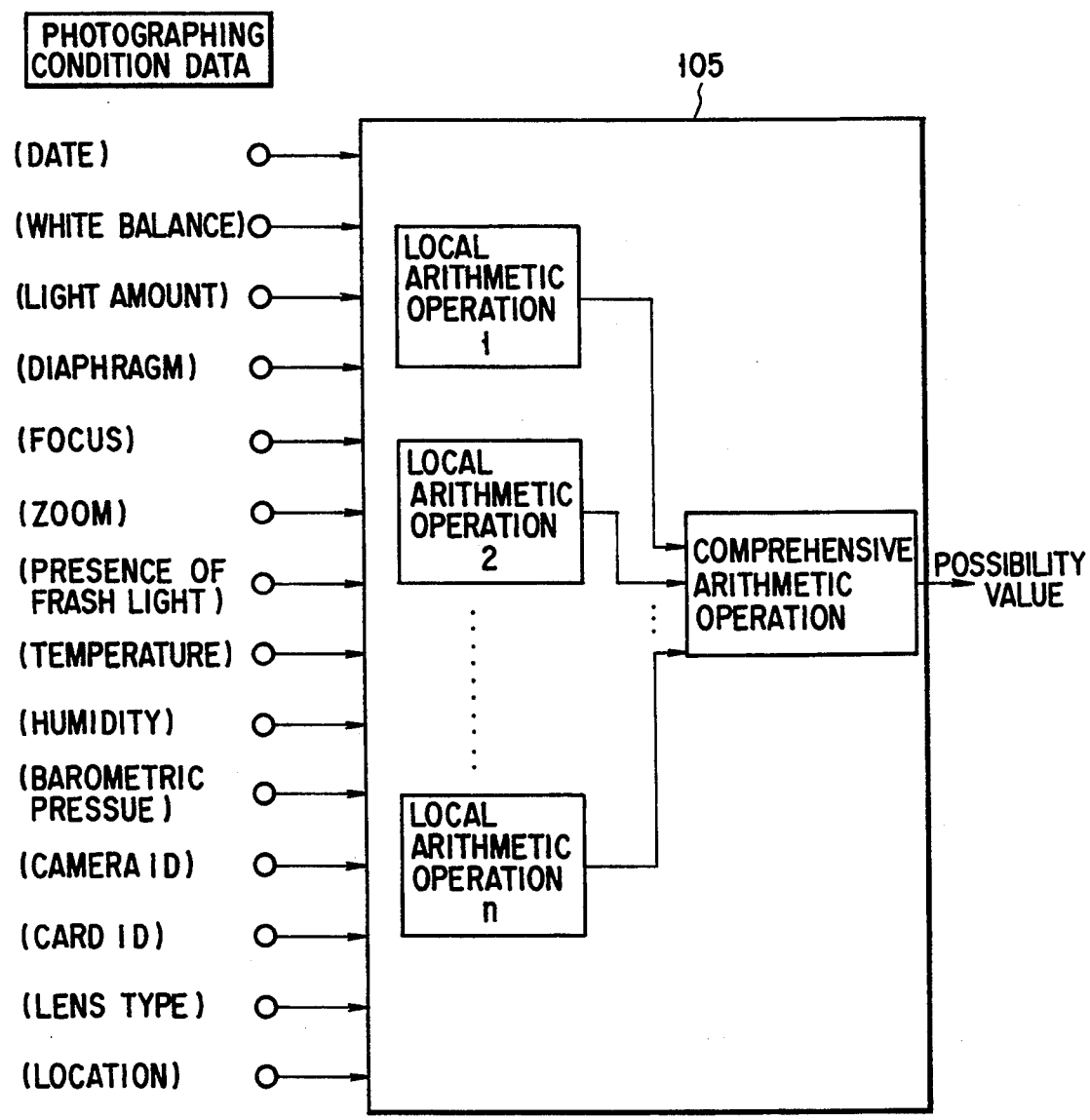
F I G. 77

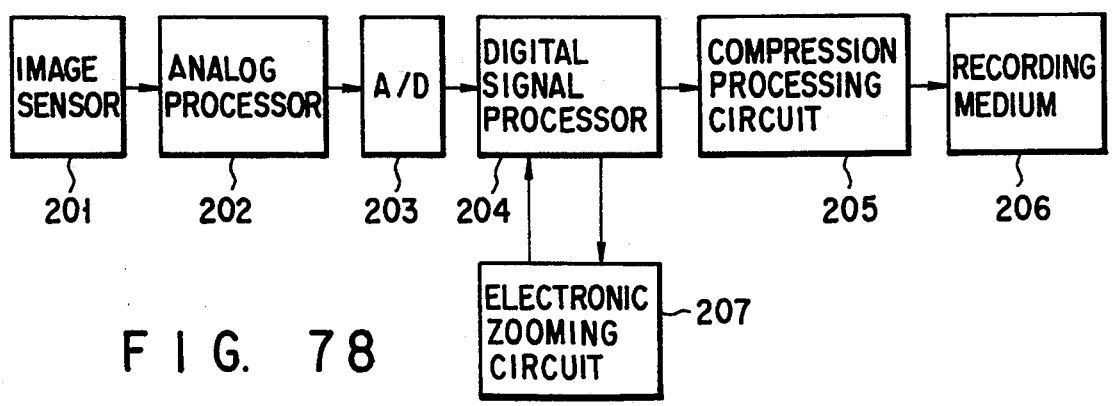
F I G. 78
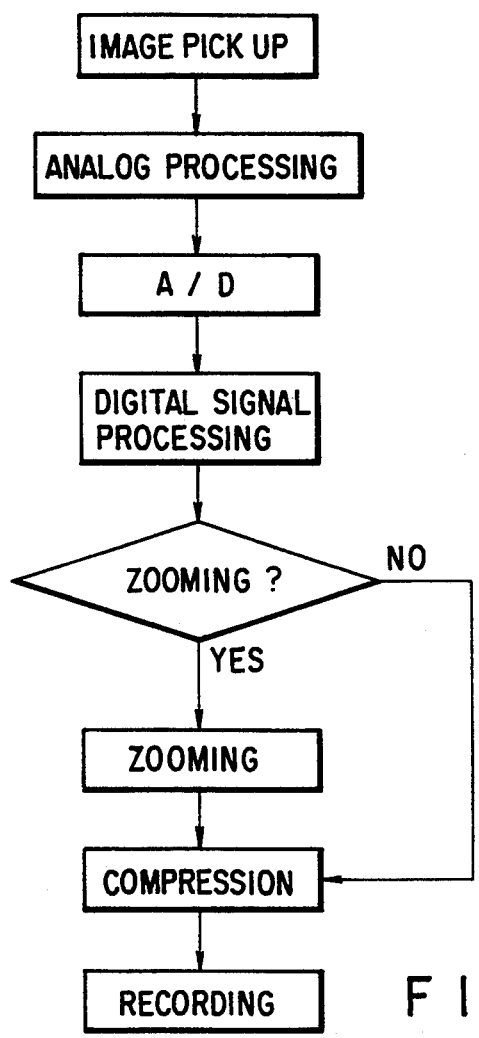
F I G. 79

$$\begin{bmatrix} 0 & 10 & 20 & 30 & 40 & 50 & 60 & 70 \\ 20 & 30 & 40 & 50 & 60 & 70 & 80 & 90 \\ 40 & 50 & 60 & 70 & 80 & 90 & 100 & 110 \\ 60 & 70 & 80 & 90 & 100 & 110 & 120 & 130 \\ 80 & 90 & 100 & 110 & 120 & 130 & 140 & 150 \\ 100 & 110 & 120 & 130 & 140 & 150 & 160 & 170 \\ 120 & 130 & 140 & 150 & 160 & 170 & 180 & 190 \\ 140 & 150 & 160 & 170 & 180 & 190 & 200 & 210 \end{bmatrix}$$ 8×8 PIXEL BLOCK

DCT ↓

$$\begin{bmatrix} 840 & -180 & 0 & -19 & 0 & -6 & 0 & -1 \\ -364 & 0 & 0 & 0 & 0 & 0 & 0 & 0 \\ 0 & 0 & 0 & 0 & 0 & 0 & 0 & 0 \\ -38 & 0 & 0 & 0 & 0 & 0 & 0 & 0 \\ 0 & 0 & 0 & 0 & 0 & 0 & 0 & 0 \\ -11 & 0 & 0 & 0 & 0 & 0 & 0 & 0 \\ 0 & 0 & 0 & 0 & 0 & 0 & 0 & 0 \\ -3 & 0 & 0 & 0 & 0 & 0 & 0 & 0 \end{bmatrix}$$ DCT COEFFICIENT

QUANTIZATION ← QUANTIZED DCT COEFFICIENT — QUANTIZATION TABLE $$\begin{bmatrix} 84 & 9 & 0 & 0 & 0 & 0 & 0 & 0 \\ -18 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad \begin{bmatrix} 10 & 20 & 30 & 40 & 50 & 60 & 70 & 80 \\ 20 & 30 & 40 & 50 & 60 & 70 & 80 & 90 \\ 30 & 40 & 50 & 60 & 70 & 80 & 90 & 100 \\ 40 & 50 & 60 & 70 & 80 & 90 & 100 & 110 \\ 50 & 60 & 70 & 80 & 90 & 100 & 110 & 120 \\ 60 & 70 & 80 & 90 & 100 & 110 & 120 & 130 \\ 70 & 80 & 90 & 100 & 110 & 120 & 130 & 140 \\ 80 & 90 & 100 & 110 & 120 & 130 & 140 & 150 \end{bmatrix}$$

INVERSE QUANTIZATION ↓

$$\begin{bmatrix} -840 & -180 & 0 & 0 & 0 & 0 & 0 & 0 \\ -360 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$ DCT COEFFICIENT

INVERSE DCT ↓

$$\begin{bmatrix} 11 & 16 & 25 & 36 & 49 & 60 & 69 & 74 \\ 21 & 26 & 34 & 46 & 58 & 70 & 79 & 83 \\ 38 & 43 & 52 & 63 & 76 & 87 & 96 & 101 \\ 61 & 66 & 75 & 86 & 99 & 110 & 119 & 124 \\ 86 & 91 & 100 & 111 & 124 & 135 & 144 & 149 \\ 109 & 114 & 123 & 134 & 147 & 158 & 167 & 172 \\ 127 & 131 & 140 & 152 & 164 & 176 & 184 & 189 \\ 136 & 141 & 150 & 161 & 174 & 185 & 194 & 199 \end{bmatrix}$$ DECODED 8×8 PIXEL BLOCK

FIG. 80

ELECTRONIC STILL CAMERA WITH IMPROVED PICTURE RESOLUTION BY IMAGE SHIFTING IN A PARALLELOGRAM ARRANGEMENT

BACKGROUND OF THE INVENTION

1. Field of the Invention

The present invention relates to an electronic still camera.

2. Description of the Related Art

Electronic still cameras are classified into two types: the first type involves analog recording using a floppy disk and the second type involves digital recording using a semiconductor memory (RAM etc.). Digital recording has various advantages over analog recording. For instance, digital recording produces no image deterioration due to copying, and does not involve any rotating mechanism for image recording, which contributes to making the camera compact.

The solid state image sensors which are employed in ordinary commercial cameras typically have about 400,000 pixels in view of the cost of the solid state image sensors. The solid state image sensors having pixels of that quantity can reproduce nearly satisfactory pictures when viewed on existing monitors, but the reproduced pictures do not have a satisfactory quality when output on a HD (High Definition) monitor or hard-copied. A Hi-vision solid state image sensor (having about 200 million pixels) for high definition is expensive and is not therefore suitable for commercial electronic still cameras.

There is a still picture input system which uses an inexpensive solid state image sensor having about several hundred thousand pixels and accomplishes high resolution by shifting the solid state image sensor. According to this system, the red (R) filter of a color filter disk is located in front of the solid state image sensor and a picture signal is read from the solid state image sensor. This signal is subjected to a predetermined process in a pre-processor, and is then converted into a digital value by an A/D converter. The picture signal is then processed to have a recording format by a digital signal processor before being recorded on a recording medium. When R data of one frame is recorded by the above operation, the solid state image sensor is moved by a fine distance to obtain a high resolution, and then the recording operation similar to the above is performed to obtain a plurality of frame data for R. When processing for R is completed, the color filter disk rotates to put the green (G) filter in front of the solid state image sensor. The G signal is processed and recorded in the same manner as the R signal The same processing is likewise executed for the blue (B) filter.

A still picture with high resolution is acquired in the above manner. Since, however, the solid state image sensor used in this system is a monochromatic device and requires a rotary filter for picking up image information in a field sequential image pickup system, the camera body is large and the sensor can pick up the image of only a still object. In this respect this solid state image sensor is not suitable for an electronic still camera which picks up a moving object as a still picture.

When a black and white object such as characters is imaged by an electronic still camera using an ordinary solid state image sensor having about 400,000 pixels, color moire occurs due to the color filter array and a clear picture cannot be obtained. To reduce the color moire, a crystal optical filter is generally provided. But this method deteriorates the resolution and is undesirable.

Digital electronic still camera systems, which records a still picture as a digital signal in a card type semiconductor memory as a recording medium, have been announced or put on the market by several companies. This semiconductor memory card is detachably mounted into the camera body. The unit price for semiconductor memories per bit is still expensive and the memory capacity is still insufficient, so that an optical disk, magneto optical disk, hard disk, magnetic tape, magnetic bubble memory, etc. are used or usable to record data for a long period of time or record a vast amount of data. Imaged data can be recorded on the semiconductor memory card as well as the secondary recording medium for each still picture.

Those electronic still cameras can transfer digital picture data to the monitor of a personal computer or a work station and display thereon. The digital picture data is typically converted into an analog signal input to the RF terminal or video terminal of an ordinary monitor of the TV standards and displayed on the monitor. In this case, the reproduced images are those images which are formed on the imaging area of the image sensor at the imaging time, and this area is fixed.

The auxiliary recording medium such as a semiconductor memory card, disk, and tape can record imaging data for each still picture. One cannot see, at a glance, the contents of the digital system, such as a memory card, and the above video floppy system, unlike the conventional photographic print. To see the contents, the user should place the recording medium in a reproducing apparatus and reproduce it, or write a memo on the package.

Jpn. Pat. Appln. No. 2-234492, entitled "Digital Electronic Still Camera System" discloses as an image retrieval method, a technique of using the conditions at the imaging time to improve the efficiency of image retrieval. The imaging conditions include the date of the imaging, white balance, the amount of incident light, focus, aperture, zoom, the use or non-usage of flash, humidity, atmospheric pressure, ID of the imaging camera and the type of the lens. On the reproducing side, the imaging conditions are indicated in the form of questions to allow a retriever to answer the questions, or the retriever should input the imaging conditions himself or herself. For instance, probable questions ask if the imaging was done in a room or outside the room, and if the object is a person, scenery or printed matter. The reproducing section read the imaging condition data required by the questions performs the necessary operations and reproduces images from the one with the highest probability.

Electronic still cameras, which digitize analog image information acquired from an image sensor and then compresses the digital data before recording, have already been commercialized.

The zoom function is widely used in home video movie cameras and compact cameras. There are two zooming methods for home video movie cameras: the first method uses a zoom lens and the second one is electronic zooming that performs operations on picture signals output from the image sensor. While the zoom lens can acquire good images at the time of zooming, a larger lens is needed for higher magnification, which stands in the way of making cameras compact. The electronic zooming, on the other hand, does not require a zoom lens and can thus contribute to accomplishing light and compact video movie cameras.

In performing an electronic zooming process on an image, as the image is spatially sampled by the image sensor, interpolation between sample pixels should be performed in accordance with the magnification. In this case, a typical method is to prepare data of pixels to be interpolated through interpolation using actual pixel data acquired by the image sensor. To execute pixel interpolation in real time, a bi-linear interpolation which requires a small circuit scale is widely used.

An example of this bi-linear interpolation is described in, for example, IEEE Transactions on Consumer Electronics Vol. 37, No. 3, August 1991, "An Electronic Zoom Video Camera using Image scanner control." This zooming however impairs the band of the original signals, thus deteriorating the resolution. The existing video movie cameras output or record image information as analog signals, not as digital image data in compressed form.

With regard to image compression, compression using block coding is employed as the international standard for motion pictures and still pictures and the adaptation of this system to a Hi-vision still picture storage device, a TV telephone, TV conference system and so on is studied. In conducting electronic zooming on those stored or coded digital images on the reproduction side,-block deformation originated from the block coding would be sensed by human eyes, degrading the image quality.

SUMMARY OF THE INVENTION

It is therefore a primary object of the present invention to provide a high-quality electronic still camera that uses a color solid state image sensor, which has conventionally been used in commercial systems, to acquire pictures which can be viewed on an HD TV and can provide satisfactory images when hard copied.

It is the second object of this invention to provide an electronic still camera that uses a color solid state image sensor, which has conventionally been used in commercial systems, to acquire high-quality pictures of a black and white object, such as characters, with high resolution and without color moire.

It is the third object of this invention to provide an electronic still camera which has a wider output range of reproduced images than the standard TV monitors and allows an operator to alter the image output range.

It is the fourth object of this invention to provide an electronic still camera which can efficiently retrieve a desired image from among recorded images.

It is the fifth object of this invention to provide an image sensor which has an electronic zoom function and a highly-efficient image compressing function with suppressed image-quality deterioration even through those functions involve processing that normally deteriorate the image quality.

To achieve the first object, an electronic still camera according to this invention comprises a solid state image sensor having a color filter including a plurality of color filter elements indicating a plurality of colors which are arranged in horizontal and vertical axial directions, and a plurality of pixels at positions corresponding to the color filter elements, for outputting a color picture signal corresponding to an incident optical image, a moving unit for moving at least one of the optical image and the solid state image sensor from an original position in at least two directions by a pixel pitch between the pixels and half the pixel pitch, respectively, one of the directions being one of the horizontal and vertical axial directions and the other an oblique axial direction (vector direction) defined by horizontal and vertical lines extending respectively from the original position in the horizontal and vertical axial directions, and a signal processing unit for signal-processing the color picture signal obtained from the solid state image sensor on the original position and at least one moved position, to produce a color picture signal of a color still picture.

The color solid state image sensor includes a color filter in which plural units of mosaic filters, each unit arranged in two rows and two columns, are cyclically arranged in the horizontal axial direction and a direction perpendicular thereto.

The one unit of a mosaic filter includes two first color filter elements F1, one second color filter element F2 and one third color filter element F3. The moving section shifts the solid state image sensor by a pixel pitch (Px) in the horizontal direction or by a pixel pitch (Py) in the vertical direction so that the first color filter elements F1 respectively come to the positions of the second and third color filter elements F2 and F3 and further shifts the color solid state image sensor obliquely by distances of $(-\frac{1}{2}Px+\frac{1}{2}Py)$ and $(\frac{1}{2}Px+\frac{1}{2}Py)$ or $(\frac{1}{2}Px-\frac{1}{2}Py)$ and $(\frac{1}{2}Px+\frac{1}{2}Py)$ so that the first color filter elements F1 are equivalently arranged in a checkered pattern with half a horizontal pixel pitch and half a vertical pixel pitch. Accordingly, data is picked up, at a total of four positions to acquire a color still picture.

Alternatively, the solid state image sensor may include a color filter in which plural units of mosaic filters, each unit arranged in two rows and four columns or four rows and two columns are cyclically arranged in the horizontal axial direction and a direction perpendicular thereto. The one unit of a mosaic filter includes four first color filter elements F1, two second color filter elements F2 and two third color filter elements F3. In addition to the shifting to four positions by the aforementioned method, additional shifting is performed as follows. With an offset given to the position to which the color solid state image sensor is shifted vertically by a vertical pixel pitch (Py) or horizontally by a horizontal pixel pitch (Px), shifting is likewise conducted to four positions from that offset position, so that the second and third color filter elements F2 and F3 are arranged in checkered patterns with half a horizontal pixel pitch and half a vertical pixel pitch. Accordingly, data is picked up at a total of eight positions to acquire a color still picture.

The first color filter element F1 is one of a white filter (W), a color filter (Y) having a luminance spectra transmission characteristic and a green filter (G), and the second and third color filter elements F2 and F3 are two of a yellow filter (Ye), a cyan filter (Cy), a red filter (R) and a blue filter (B).

Further, a solid state image sensor, which has color filter elements of a yellow filter (Ye) and a cyan filter (cy) for odd lines (or even lines), and a magenta filter (Mg) and a green filter (G) for even lines (or odd lines), is shifted horizontally by a pixel pitch (Px) and obliquely by $(\frac{1}{2}Px+\frac{1}{2}Py)$ and $(-\frac{1}{2}Px+\frac{1}{2}Py)$ to acquire data at a total of four positions in order to yield a color still picture. This solid state image sensor may be shifted horizontally by a pixel pitch (Px) and obliquely by $(\frac{1}{2}Px+Py)$ and $(-\frac{1}{2}Px+Py)$ to acquire data at a total of four positions in order to yield a color still picture.

Furthermore, data may be obtained at eight positions to provide a color still picture.

Moreover, the red filter elements, green filter elements and blue filter elements of the color filter of the color solid state image sensor may be cyclically arranged in three columns, the color solid state image sensor may be shifted horizontally by 1.5Px, vertically by ½Py and obliquely by (1.5Px+½Py), and data is obtained at a total of four positions to provide a single color still picture. Alternately, the color solid state image sensor may be shifted horizontally by 1.5Px, and obliquely by (−¾Px+½Py) and (¾Px+½Py), and data is obtained at a total of four positions to provide a single color still picture.

The above-described color solid state image sensor has a charge draining function so that charges are drained during the shifting of the solid state image sensor by the moving section.

To achieve the second object of this invention, an electronic still camera according to this invention comprises a color solid state image sensor having a color filter; a color image signal processing section for performing signal processing on an output signal of the color solid state image sensor to produce a color picture signal of a still picture; a binary image signal processing section for performing binary processing on the output signal of the color solid state image sensor to produce a binary picture signal; and a recording section for recording the color picture signal acquired from the color image signal processing section or the binary picture signal acquired from the binary image signal processing section.

Alternatively, there is provided an electronic still camera comprising a first imaging module including at least an optical lens and a color solid state image sensor; a color image signal processor for performing signal processing on an output signal of the first imaging module to produce a color picture signal of a still picture; a second imaging module including at least an optical lens and a monochromatic solid state image sensor; a monochromatic image signal processing for performing signal processing on an output signal of the second imaging module to produce a monochromatic picture signal of a still picture; and a recording section for recording the color picture signal acquired from the color image signal processing section or the monochromatic picture signal acquired from the monochromatic image signal processing section, the first and second imaging modules being designed attachable and detachable.

To achieve the third object of this invention, there is provided an electronic still camera which has a normal imaging mode for performing single signal reading from an image sensor with a fixed reproduction image output range, and another mode for performing signal reading plural times by shifting an object forming position on the image sensor and performing signal processing suitable for this reading, thereby ensuring a variable image output range at the time of image reproduction.

The electronic still camera according to this invention comprises a solid state image sensor for forming the image of an object thereon; a moving section for moving the position of the object image on the solid state image sensor; a signal reading section for reading a still picture signal from the solid state image sensor plural times in accordance the movement of the position of the object image by the moving section; a recording section for recording that of the still picture signals read by the signal reading section which belongs to a designated predetermined area, on a recording medium; a reproducing section for reproducing a still picture signal recording on the recording medium; and a display section for displaying the still picture signal reproduced by the reproducing section.

Further, the reproduction image output range may be widened by using an image sensor having a wider image output range than the reproduction monitor.

To achieve the fourth object, according to this invention, there is provided an electronic still camera which comprises a camera section for recording picture signals, picked up by a solid state image sensor, on a first recording medium; and a reproducing section to which the first recording medium or a second recording medium on which plural pictures of picture signals recorded on the first recording medium are recorded is attachable and which reproduces a picture with the first or second recording medium attached thereto, the camera section having an imaging condition data recording section for, when recording a picture on the first recording medium, recording imaging condition data then at the same time, the reproducing section having a retrieval questioning section for setting questions for a picture to be output, and an output section for reading imaging condition data recorded on the first or second recording medium to determine a picture having a high probability being associated with question data from the retrieval setting section and outputting the determined picture with a high probability.

To achieve the fifth object, an image sensor of this invention comprises an interpolation section for providing electronically enlarged display of a predetermined region of a digital picture; and image compression means for performing image compression by block coding, interpolation being performed before image compression. Further, this image sensor is provided with a section for storing only that region to be enlarged by interpolation on a recording medium, when a high magnification is selected.

More specifically, this image sensor comprises a solid state image sensor; an interpolation section for performing interpolation on a still picture signal output from the solid state image sensor for image enlargement; a compression section for performing compression on the still picture signal interpolated by the interpolation section; a recording section for recording the still picture signal, compressed by the compression section, on a recording medium; a reproducing section for reproducing the still picture signal recorded on the recording medium; and a display section for displaying the still picture signal reproduced by the reproducing section.

The electronic still camera provided to achieve the first object uses a color solid state image sensor and moves the solid state image sensor or optical image in the horizontal axial direction, vertical axial direction and oblique axial direction in a manner suitable for the color filter array in HD mode to acquire data at a total of four positions, thereby providing a single still picture. This design can improve the resolution.

Further, as no charges are accumulated during the movement, the shift-oriented blur will nor occur so that a clear image can be obtained.

Furthermore, the signal processing is so designed as to eliminate the need for an additional signal processor for the HD mode, thus contributing to making the electronic still camera compact.

The electronic still camera provided to achieve the second object performs binary processing in a binary signal processor, putting importance on the resolution, when a color solid state image sensor is used to pick up an image that simply requires binary data, such as characters, thus allowing for effective reduction of data and yielding a high-resolution binary image.

As the imaging modules are designed to be attachable to and detachable from the camera body imaging matching the purpose is possible.

The electronic still camera provided to achieve the third object moves the position of the image sensor or moves the optical passage between the lens and the image sensor by use of means attaining the first object to shift the object image on the image sensor, and reads a picture signal at each position, thereby acquiring vertical scans twice the normal ones. A half of those vertical axial picture signals are processed as an effective picture portion and are recorded on a recording medium. The horizontal image angle of the image recorded on the recording medium is twice the normal angle.

In reproducing this image in the reproducing circuit, the display range of the reproduced image can be shifted horizontally by changing the horizontal read position in the read frame memory. The shifting the horizontal object image at the time of image input can improve the resolution.

Although an image sensor with a wide horizontal image angle is used and the center pixels are used in the normal imaging, the horizontal reproduction image range can be widened by using the entire pixels in another imaging mode.

The electronic still camera provided to achieve the fourth object records picture signals as well as position information, generated outside or in the electronic camera, together with other imaging condition data, on a recording medium at the imaging time. The image reproducing section reads the picture signals and the position information associated with the also recorded imaging condition data, and sequentially outputs pictures starting with the one having the position information that mostly likely matches with the retrieval question about the imaging position.

The electronic still camera provided to achieve the fifth object has a normal imaging mode and a zoom imaging mode. In normal imaging mode, this camera performs analog signal processing and analog-to-digital conversion on the signals from the image sensor, and then performs digital signal processing not including a zoom process before the signals are output or recorded.

In zoom imaging mode, the camera performs analog signal processing and analog-to-digital conversion on the signals from the image sensor, and then performs digital signal processing including a zoom process before the signals are output or recorded. The zoom processing section in zoom imaging mode selects different processes at different magnifications, the aforementioned low magnification and the aforementioned high magnification.

At the low magnification, the deterioration of the picture quality in image compression can be minimized by executing image compression after interpolation. At the high magnification, the influence of image compression to deteriorate the picture quality can be avoided by recording picture signals on a recording medium without compressing that portion alone which is to be enlarged by interpolation.

At either the low magnification or high magnification, therefore, the deterioration of the picture quality originated from image compression can be minimized and the amount of image data to be output on the recording medium can be reduced to allow a greater number of pictures to be recorded on a small-capacity recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of an electronic still camera according to a first embodiment of the present invention;

FIG. 2 is a block diagram of an electronic still camera according to a second embodiment of the present invention;

FIGS. 5A and 5B are diagrams for respectively explaining a color filter array used in this invention and how the color filter array is moved;

FIG. 6 is a block diagram showing a digital signal processor in the electronic still camera of this invention;

FIG. 7 is a diagram showing the exemplary structure of a solid state image sensor;

FIGS. 8A through 8E are diagrams for explaining how electric charges are accumulated when the solid state image sensor in FIG. 7 is used in HD mode;

FIGS. 9A through 9C are diagrams for explaining another state of the accumulation of electric charges when the solid state image sensor in FIG. 7 is used in HD mode;

FIGS. 10A and 10B are diagrams illustrating an equivalent color filter array when a solid state image sensor with the color filter array shown in FIG. 5A is used in HD mode;

FIG. 11 is a diagram for explaining the two-dimensional addresses in a buffer memory with the use of the equivalent color filter array in HD mode shown in FIGS. 10A and 10B;

FIGS. 16A and 16B are diagrams for respectively explaining a further color filter array used in this invention and how the color filter array is moved;

FIG. 17 is a diagram illustrating an equivalent color filter array when a solid state image sensor with the color filter array shown in FIG. 16A is used in HD mode;

FIGS. 18A and 18B are diagrams for respectively explaining the same color filter array as shown in FIG. 16A and the movement of that color filter array;

FIG. 19 is a diagram illustrating an equivalent color filter array when a solid state image sensor with the color filter array shown in FIG. 18A is used in HD mode;

FIG. 20 is a diagram showing a color filter array of a color solid state image sensor used in the electronic still camera of this invention;

FIG. 21 is a diagram showing a different color filter array of a color solid state image sensor used in the electronic still camera of this invention;

FIG. 22 is a diagram showing another color filter array of a color solid state image sensor used in the electronic still camera of this invention;

FIG. 23 is a diagram showing a color filter array in which F1, F2 and F3 of the color filter array shown in FIG. 20 are a W (white) filter element, Ye (yellow) filter element, and Cy (cyan) filter element, respectively;

FIG. 24 is a diagram showing how a color solid state image sensor is shifted in HD mode of this invention;

FIGS. 25A and 25B are diagrams respectively illustrating equivalent color filter arrays when solid state image sensors with the color filter arrays shown in FIGS. 20 and 21 are used in HD mode shown in FIG. 24;

FIGS. 26A and 26B are diagrams illustrating an equivalent color filter array when a solid state image sensor with the color filter array shown in FIGS. 23 is used in HD mode shown in FIG. 24;

FIG. 27 is a diagram showing a different shifting state of a color solid state image sensor in HD mode of this invention;

FIGS. 28A and 28B are diagrams respectively illustrating equivalent color filter arrays when solid state image sensors with the color filter arrays shown in FIGS. 21 and 22 are used in HD mode shown in FIG. 27;

FIG. 29 is a diagram showing a color filter array adaptable to this invention in which F1, F2 and F3 of the color filter array shown in FIG. 20 are a G (green) filter element, R (red) filter element, and Cy (cyan) filter element, respectively;

FIG. 30 is a diagram showing a color filter array adaptable to this invention in which F1, F2 and F3 of the color filter array shown in FIG. 20 are a G (green) filter element, Ye (yellow) filter element, and Cy (cyan) filter element, respectively;

FIG. 31 is a diagram showing a color filter array adaptable to this invention in which F1, F2 and F3 of the color filter array shown in FIG. 20 are a Y (a color filter having a spectral transmission characteristic of a luminance signal) filter element, R (red) filter element, and Cy (cyan) filter element, respectively;

FIG. 32 is a diagram showing a color filter array of a color solid state image sensor for explaining another embodiment of this invention;

FIG. 33 is a diagram showing a color solid state image sensor having the color filter array shown in FIG. 32 is shifted in HD mode;

FIG. 34 is a diagram illustrating an equivalent color filter array when a solid state image sensor with the color filter array shown in FIGS. 32 is used in HD mode shown in FIG. 33;

FIG. 35 is a diagram showing a color solid state image sensor having the color filter array shown in FIG. 32 is shifted in HD mode;

FIG. 36 is a diagram showing a color solid state image sensor having the color filter array shown in FIG. 32 is shifted in HD mode shown in FIG. 35;

FIG. 37 is a diagram showing a different color filter array adaptable to this invention;

FIG. 38 is a diagram showing another color filter array adaptable to this invention;

FIG. 39 is a diagram showing a further color filter array adaptable to this invention;

FIG. 40 is a diagram showing the 8-position shifting state in HD mode of this invention;

FIG. 41 is a diagram showing another 8-position shifting state in HD mode of this invention;

FIG. 42 is a diagram showing an equivalent color filter array acquired when shifts as shown in FIGS. 40 and 41 are performed;

FIG. 51 is a block diagram showing a reproduction signal processing system in this embodiment;

FIG. 52 is a diagram for explaining the necessary number of pixels in the image reproduction on a monitor in this embodiment;

FIG. 53 is a block diagram of a first example of an display memory shown in FIG. 53;

FIG. 57 is a diagram of a first example of the address space of the display memory;

FIG. 58 is a diagram of a second example of the address space of the display memory;

FIG. 59 is a diagram of a second example of the address space of the display memory;

FIG. 60 is a diagram of an image sensor having an image angle longer in the horizontal direction than that of an ordinary image sensor;

FIG. 61 is a diagram exemplifying the reproduction screen showing the mode is a panorama mode;

FIG. 62 is a diagram showing an example of the reproduction screen indicating that the reproduction range is movable in both right and left directions;

FIG. 63 is a diagram showing an example of the reproduction screen indicating that the reproduction range is movable only in the left direction;

FIG. 64 is a block diagram showing a first example of a reproducing section equipped with a mark generator;

FIG. 65 is a block diagram showing a second example of the reproducing section equipped with a mark generator;

FIG. 66 is a diagram exemplifying an electronic still camera having an operation section equipped with a display section whose reproduction range is movable;

FIG. 67 is a diagram exemplifying the display in the finder of an electronic still camera having a panorama mode;

FIG. 68 is a diagram showing another example of the display in the finder of an electronic still camera having a panorama mode;

FIG. 69 is a block diagram of an output image memory section of an electronic still camera having top, bottom, right and left display ranges;

FIG. 70 is a diagram showing an example of an image display which represents that it has top, bottom, right and left display ranges;

FIG. 76 is a diagram showing an example of a question screen for retrieving image data picked up by the electronic still camera of this invention;

FIG. 77 is a block diagram illustrating an operation for image retrieval;

FIG. 78 is a block diagram according to a still further embodiment which has a zooming function and a compressing function;

FIG. 79 is a flowchart illustrating the flow of the control according to this embodiment;

FIG. 80 is a diagram showing a compression system for blocked image data which is used in this embodiment;

DETAILED DESCRIPTION OF THE PREFERRED EMBODIMENTS

Figure 3:
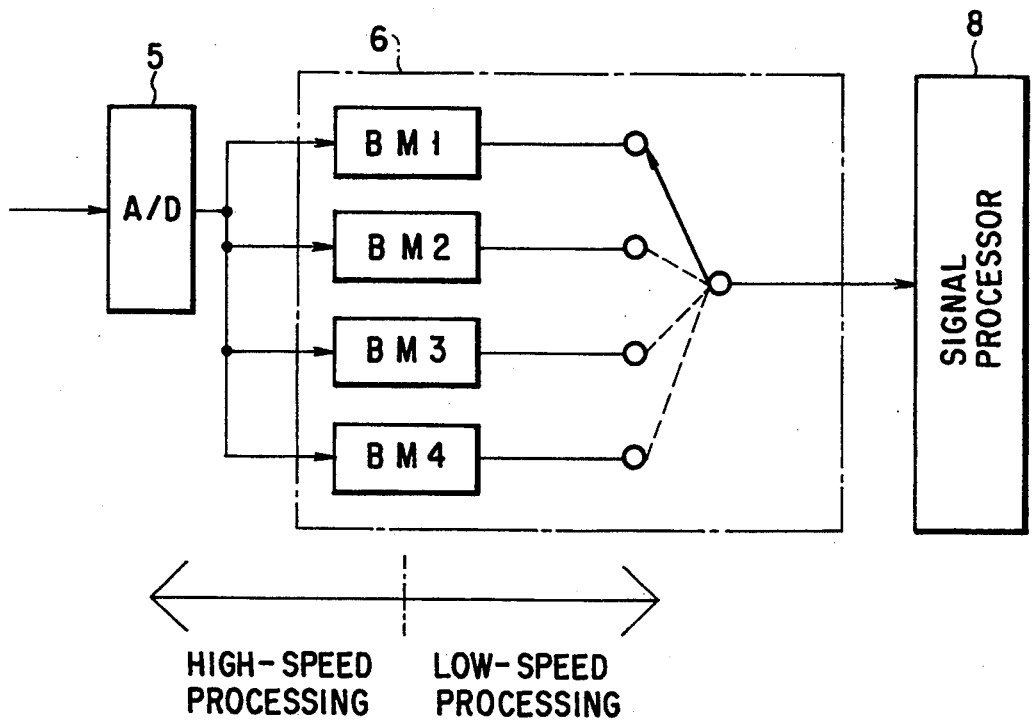
FIG. 3 is a block diagram of an electronic still camera according to a third embodiment of the present invention.

FIG. 1 is a block diagram of an electronic still camera according to the first embodiment of the present invention. In this drawing, a color solid state image sensor such as a CCD (Charge Coupled Device) 1 is shifted by a piezo device 11 that is driven by a driver 2. The output terminal of the CCD 1 is connected to a buffer memory 6 sequentially via a pre-processing circuit 4 and an A/D converter 5 in series. The preprocessing circuit 4 and A/D converter 5 are controlled by sync signals output from a sync signal generator 3. The buffer memory 6 is controlled by a memory controller 7 which also receives a sync signal from the sync signal generator 3. The output terminal of the buffer memory 6 is connected via a signal processor 8 to a recording medium 9 such as a semiconductor memory. The output terminal of a mode selector 10 is connected to the sync signal generator 3.

The normal processing of the above electronic still camera will be described first.

In this case, the normal imaging mode is selected by the mode selector 10, and a sync signal pulse is sent to the driver 2 from the sync signal generator 3, allowing one frame of picture signals to be read from the driver 2. The driver 2 supplies a read signal to the color CCD 1 and supplies a drive signal to the piezo device 11 to shift the CCD 1. The picture signals read from the color CCD 1 are input to the pre-processing circuit 4 where it is subjected to a predetermined process such as pre-amplification, white balance or gamma correction. The signal from the pre-processing circuit 4 are converted into digital signals by the A/D converter 5, and the digital signals are then temporarily stored in the buffer memory 6. When one frame of picture data is stored in the buffer memory 6, it is processed in a non-interlace mode. If the readout from the color CCD 1 is interlaced data, the data can be processed in a non-interlace form by putting the picture signals through the buffer memory 6. The picture signals read from the buffer memory 6 are input to the signal processor 8. This signal processor 8 produces a luminance signal and a color difference signal from each picture signal, performs data compression and records the compressed data on the recording medium 9 such as a semiconductor memory.

The signal processing with the color filter elements of the color CCD 1 laid out as shown in FIG. 5A will be described with reference to a luminance/color difference signal processing circuit shown in FIG. 6.

The signal read from the buffer memory 6 is converted into a high band luminance signal $Y_H$, a low band luminance signal $Y_L$ and color difference signals R-Y and B-Y by a matrix circuit 13. The following are the matrix equations for the $G_{2(Y),3(X)}$ pixels in FIG. 5A.

$$Y_H = 0.25(G_{1,3} + G_{2,3} + R_{1,2} + B_{2,2}) \quad (1)$$

$$Y_L = 0.30(R_{1,2} - G_{1,3}) + 0.11(B_{2,2} - G_{2,3}) + G_{2,3} \quad (2)$$

$$R - Y = 0.70(R_{1,2} - G_{1,3}) - 0.11(B_{2,2} - G_{2,3}) \quad (3)$$

$$B - Y = -0.30(R_{1,2} - G_{1,3}) + 0.89(B_{2,2} - G_{2,3}) \quad (4)$$

The matrix equations for the $G_{3,3}$ pixels are as follows:

$$Y_H = 0.25(G_{2,3} + G_{3,3} + R_{3,2} + B_{2,2}) \quad (5)$$

$$Y_L = 0.30(R_{3,2} - G_{3,3}) + 0.11(B_{2,2} - G_{2,3}) + G_{3,3} \quad (6)$$

$$R - Y = 0.70(R_{3,2} - G_{3,3}) - 0.11(B_{2,2} - G_{2,3}) \quad (7)$$

$$B - Y = -0.30(R_{3,2} - G_{3,3}) + 0.89(B_{2,2} - G_{2,3}) \quad (8)$$

The color difference signals R-Y and B-Y passing through the matrix circuit 13, which performs the above processing, are subjected to band limitation by low-pass filters (LPF) 17 and 18. The luminance signal Y is produced by subjecting the $Y_L$-$Y_H$ signal to band limitation by an LPF 15 and adding the signal $Y_H$ to the resultant signal. The thus produced luminance signal and the color difference signals are subjected to data compression by a compressing circuit (not shown) and the compressed signals are recorded on the recording medium 9.

A description will now be given of an HD recording mode.

FIG. 5B illustrates the shifting of the color CCD 1 in HD recording mode. First, the HD mode is selected by the mode selector 10, and four frames of sync signal pulses are output from the sync signal generator 3. Picture signals are read from the color CCD 1 first in the normal state (original position (1)), and are stored in the buffer memory 6. When the storage of one frame of picture signals is complete, the color CCD 1 is shifted horizontally from the original position (1) to the position (2) by Px.

Px and Py are horizontal and vertical pixel pitches, respectively. There may be various kinds of means to shift the color CCD 1. For instance, the color CCD 1 itself may be shifted by the piezo device 11 or the like, or a parallel-plate member 12 may be provided in front of the color CCD 1 as in the second embodiment shown in FIG. 2 and changed in its angle to change the optical passage, thereby ensuring equivalent shifting of the color CCD 1. Such shifting mechanisms are disclosed in Jpn. Pat. Appln. KOKAI Publication Nos. Sho 58-130677 and Sho 60-54576.

When the color CCD 1 is shifted to the position (2) from the position (1) by the above method, picture signals are read from the color CCD 1 and are then stored in the buffer memory 6. Likewise, picture signals are also read from the color CCD 1 at the position (3) ($-\frac{1}{2}$Px+$\frac{1}{2}$Py) and the position (4) ($\frac{1}{2}$Px+$\frac{1}{2}$Py) and are stored in the buffer memory 6. Each of the positions (3) and (4) is from the position (1) in a vector direction defined by horizontal and vertical lines extending respectively from the original position (1) in the horizontal and vertical axial directions, and the positions (1), (2), (3) and (4) correspond to four vertexes of parallelogram, respectively. In other words, the four lines connecting the positions (1), (2), (3) and (4) define a parallelogram.

Now the relationship between the operation of reading signals from the color CCD 1 and the pixel shift will be described in detail.

In the following description, an interline transfer CCT (IT-CCT) which can ensure full line scanning as shown in FIG. 7 is used as the color CCD 1. The CCD array has a vertical transfer section 402 provided adjacent to each row of photoelectric conversion elements 401 each consisting of a photodiode. The electric charges of the individual photoelectric conversion elements 401 are transferred to the associated vertical transfer section 403 and are then transferred to a horizontal transfer section 403 line by line by a field shift pulse $\phi V1$. The electric charges are then output to an output terminal (OUT) from an output circuit 404 as electric signals by a pulse $\phi H$. Provided at the other end of the vertical transfer section 402 is a charge drain section 405.

The state of the electric charges in the color solid state image sensor will be described referring to FIGS. 8A through 8E. In the case the processes at the positions (1), (2), (3) and (4) as shown in FIG. 5B are performed consecutively, the electric charges would be accumulated as shown in FIG. 8A. When the color CCD 1 is shifted, for example, from the position (1) to the position (2), the shifting takes time as shown in FIG. 8B, and the accumulation of the electric charges at the position (2) becomes inaccurate accordingly, yielding a blurred image. To overcome this problem, the electric charges are drained during the shifting as shown in FIG. 8C. By this charge draining, the accumulation of the electric charges after draining matches with the charge accumulation in a period excluding the shifting period as shown in FIG. 8D thus eliminating image blurring. The accumulated electric charges are transferred to the vertical transfer section 402, and are read therefrom with a delay of one frame period as shown in FIG. 8E.

Another example of shifting is to process picture signals at an interval of one frame as shown in FIGS. 9A to 9C. In this way the period of the accumulation of electric charges and the moving period can be made different from each other, preventing the occurrence of image blurring.

Although the present invention is applied to a full line scanning type IT-CCD in the foregoing description of this embodiment, this invention can be applied to all solid state image sensors having a charge draining function, such as an interlace scanning type IT-CCT and frame interline transfer type CCD (FIT-CCD).

FIGS. 10A and 10B illustrate an equivalent pixel arrangement when signal are read at the aforementioned four positions (1) to (4) corresponding to the four vertexes of parallelogram. It is apparent from those diagrams that the G filter elements are arranged in a checkered pattern with a horizontal pixel pitch of $\frac{1}{2}$Px and a vertical pixel pitch of $\frac{1}{2}$Py, and the R filter elements and B filter elements are alternately arranged at every third line at a vertical pixel pitch of $\frac{1}{2}$Py. By properly selecting the arrangement of the color filter elements and the shifting direction in this manner, a shifted equivalent pixel arrangement can take a regular position, thus ensuring high definition (HD).

The signal processing with this pixel arrangement will now be described. The pixel arrangement shown in FIGS. 10A and 10B quite differs from the normal pixel arrangement, so that the signal processing for the former arrangement should also differ from that for the latter arrangement, thus requiring a separate signal processor. In this case, the circuit scale becomes large, which is undesirable particularly in making an electronic still camera compact The following will described how the signal processor in normal mode is used in the solid state image sensor in the case of FIGS. 10A and 10B.

First, frame data at four positions are stored in the buffer memory 6. In consideration of two-dimensional addresses, the frame data are written in the buffer memory 6 in the order shown in FIG. 11 by the memory controller 7. The array of the color filter elements of the CCD 1 (array A) is equivalent to the two-dimensional address arrangement with every two vertical lines of addresses treated as one line. The signal processing in this case is executed as follows.

For the vertical addresses with y numbered 1, 3, 5, . . . , processing is performed with respect to the horizontal addresses with x numbered 2, 4, 6, . . . , and for the vertical addresses with y numbered 2, 4, 6, . . . , processing is performed with respect to the horizontal addresses with x numbered 1, 3, 5, and so on The computation for $G_{3(y),6(x)}$ pixels is performed as follows.

$$Y_H = 0.25(G_{1,6} + G_{3,6} + R_{1,6} + B_{3,6}) \quad (9)$$

$$Y_L = 0.30(R_{1,6} - G_{1,6}) + 0.11(B_{3,6} - G_{3,6}) + G_{3,6} \quad (10)$$

$$R - Y = 0.70(R_{1,6} - G_{1,6}) - 0.11(B_{3,6} - G_{3,6}) \quad (11)$$

$$B - Y = -0.30(R_{1,6} - G_{1,6}) + 0.89(B_{3,6} - G_{3,6}) \quad (12)$$

The operation for $G_{4(y),5(x)}$ pixels is performed as follows.

$$Y_H = 0.25(G_{2,5} + G_{4,5} + R_{2,5} + B_{4,5}) \quad (13)$$

$$Y_L = 0.30(R_{2,5} - G_{2,5}) + 0.11(B_{4,5} - G_{4,5}) + G_{4,5} \quad (14)$$

$$R - Y = 0.70(R_{2,5} - G_{2,5}) - 0.11(B_{4,5} - G_{4,5}) \quad (15)$$

$$B - Y = -0.30(R_{2,5} - G_{2,5}) + 0.89(B_{4,5} - G_{4,5}) \quad (16)$$

When the vertical addresses (y) are for the N-th line, a computation is performed using data of that line and the (N−2)-th line and data of the horizontal addresses (x) as apparent from the above. Accordingly, luminance signals can be produced with a horizontal pitch of ½Px, ensuring resolution more than twice the normal resolution. As an object in monochromatic mode is expressed only by the signals of the vertical lines, the vertical resolution becomes two times the normal resolution.

Through the above-described processing, a picture quality as high as that of an HD TV can be obtained. It is apparent from the comparison with the equations (1) to (8) that this embodiment performs the same computation as in the normal mode to execute the signal processing, so that the very same signal processor 8 can be used with a change in signal reading from the buffer memory 6.

Figure 12A:
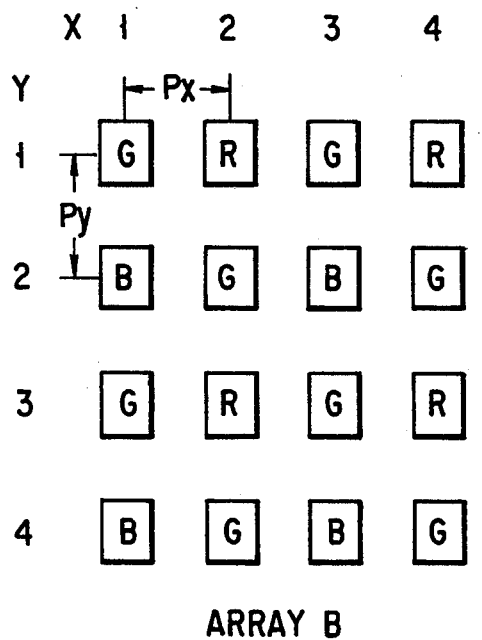
FIGS. 12A and 12B are diagrams for respectively explaining a different color filter array used in this invention and how the color filter array is moved.
Figure 12B:
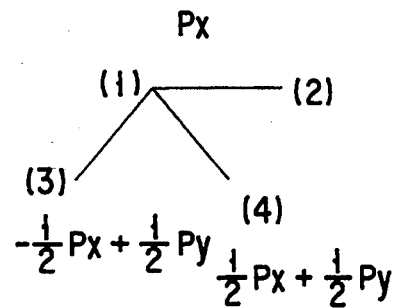
Figure 13A:
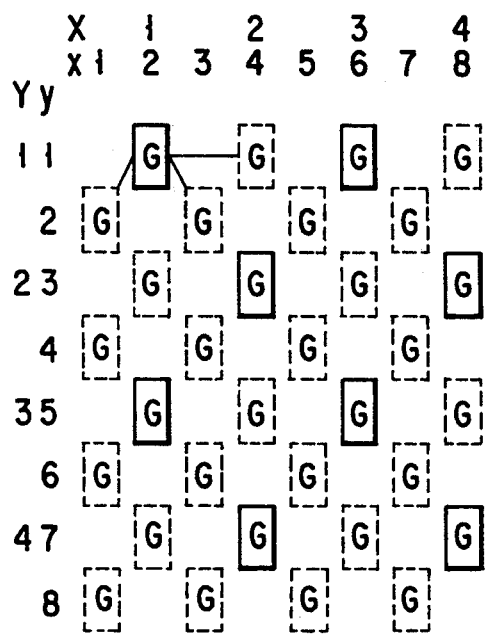
FIGS. 13A and 13B are diagrams illustrating an equivalent color filter array when a solid state image sensor with the color filter array shown in FIG. 12A is used in HD mode.
Figure 13B:
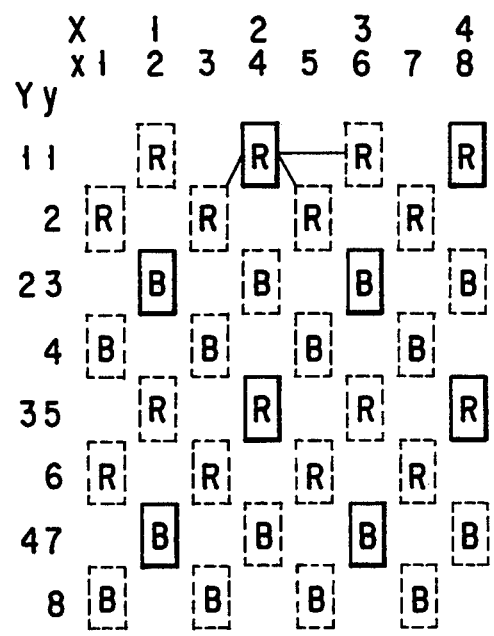
Figure 14A:
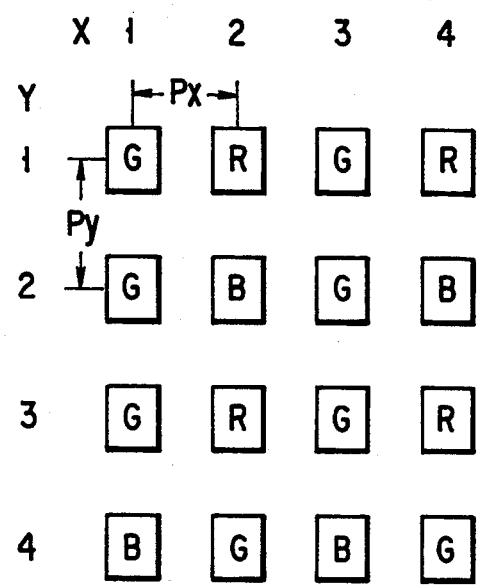
FIGS. 14A and 14B are diagrams for respectively explaining another color filter array used in this invention and how the color filter array is moved.
Figure 14B:
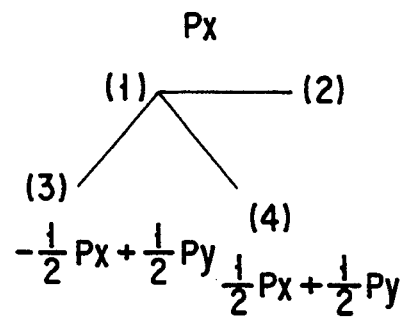
Figure 15A:
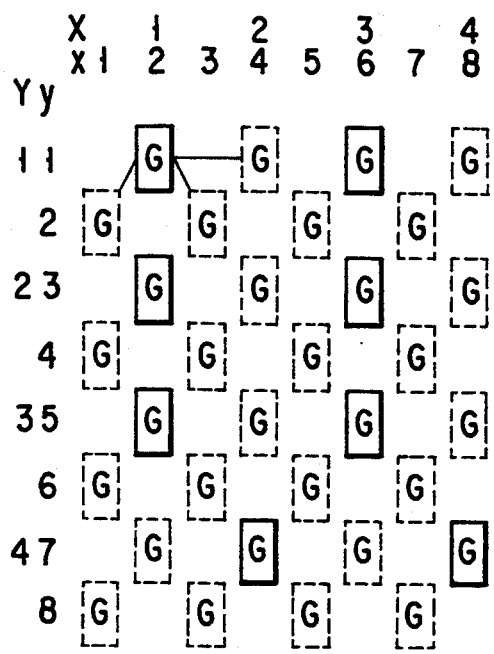
FIGS. 15A and 15B are diagrams illustrating an equivalent color filter array when a solid state image sensor with the color filter array shown in FIG. 14A is used in HD mode.
Figure 15B:
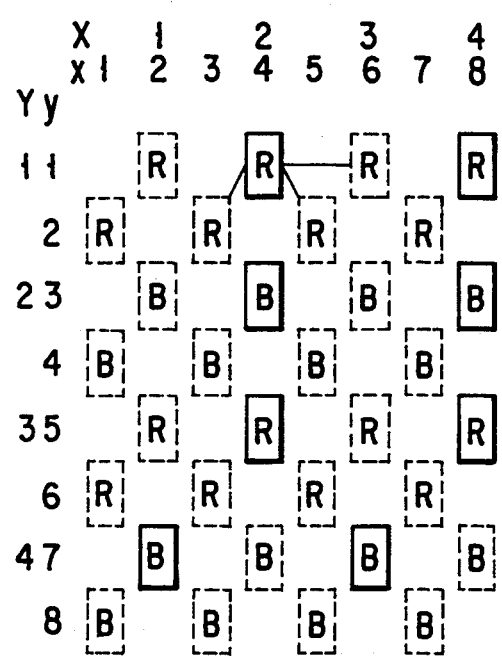
Figure 43:
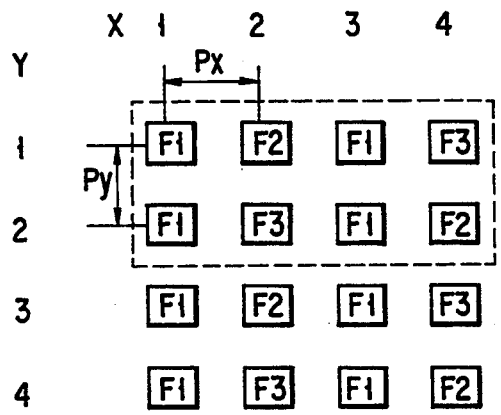
FIG. 43 is a diagram showing a different color filter array adaptable to the shifting shown in FIG. 40.

Although the array A shown in FIG. 5A has been explained in the foregoing description, the same processing can be performed for an array B shown in FIG. 12A and an array C shown in FIG. 14A. FIGS. 13A and 13B and FIGS. 15A and 15B show equivalent color filter element arrays when the color CCD 1 is shifted horizontally from a position (1) to a position (2) by Px and obliquely from the position (1) to positions (3) and (4) by −½Px+½Py and ½Px+½Py as shown in FIGS. 5B, 12B and 14B as in the case of the array A in FIG. 5A. It is apparent that those color filter element arrays become quite the same as the array A in FIG. 5A. The array is not limited to those arrays and other arrays can be used to achieve the above-described embodiment simply by vertically arranging G filters in every line and vertically arranging R and B filters in every other lines.

A description will now be given of an array D (RGB stripe filter array shown in FIG. 16A. In this case, the color CCD 1 is shifted as shown in FIG. 16B. That is, the color CCD 1 is shifted horizontally from a position (1) to a position (2) only by 1.5Px, vertically therefrom to a position (3) by ½Py and obliquely therefrom to a position (4) by 1.5Px+½Py. Each of the positions (3) and (4) is from the position (1) in a vector direction defined by horizontal and vertical lines extending respectively from the original position (1) in the horizontal and vertical axial directions, and the positions (1) to (4) correspond to the four vertexes of parallelogram, respectively. It is apparent from the equivalent color filter element array (FIG. 17) obtained by the shift that the array becomes an RGB stripe array, so that the same signal processor 8 as used in the previous embodiment is used and the horizontal and vertical resolutions become twice the normal ones.

A description will now be given of the system of further improving the horizontal resolution for the array D shown in FIG. 18A. As shown in FIG. 18B, the color CCD 1 is shifted horizontally from a position (1) to a position (2) by 1.5Px, obliquely therefrom to a position (3) by −¾Px+½Py, and obliquely therefrom to a position (4) by ¾Px+½Py. The positions (1) to (4) correspond to the vertexes of parallelogram, respectively. As apparent from the equivalent color filter element array (FIG. 19) obtained by shifting the color CCD 1 as shown in FIG. 18B, further improvement on the horizontal resolution can be expected in this embodiment.

With the use of the buffer memory 6, the following system may be accomplished. As the capacity of the buffer memory 6 should be as large as four times the pixels of the color CCD 1 for the HD mode, the electronic still camera of the above-described embodiment can be used for rapid continuous shots in normal imaging mode because of the use of this buffer memory 6.

In the third embodiment shown in FIG. 3, consecutive picture signals from the color CCD 1 are consecutively stored in memory regions BM1 BM2 BM3 and BM4 in the buffer memory 6. Four consecutive frames of image data stored in the buffer memory 6 are read out from the BM1, and are subjected to digital signal processing before being recorded on the recording medium 9.

Likewise, the image data stored in the memory regions BM2, BM3 and BM4 are processed in the same manner as the image data stored in the memory region BM1. The recording time of a single frame of a picture is restricted by the signal processing time or the time for data recording of the recording medium 9 or the like, so that high-speed continuous shots are difficult. As a solution to this, several frames of pictures are written in the buffer memory 6 at a high speed, and are then subjected to signal processing before being recorded on the recording medium 9. This way, the restriction such as the signal processing time would be removed, thus ensuring fast continuous shots.

Although the foregoing description of the third embodiment has been given with reference to the case where the buffer memory 6 is used for the HD mode, a system without the buffer memory 6 may be accomplished as a different embodiment.

Figure 4:
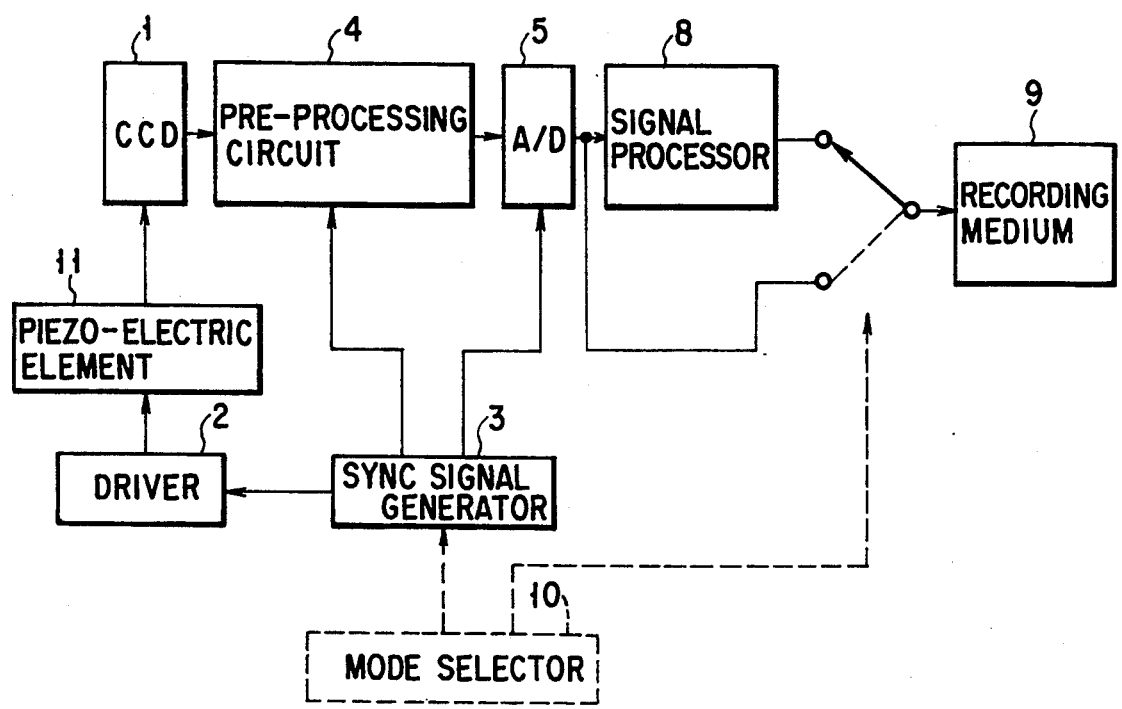
FIG. 4 is a block diagram of an electronic still camera according to a fourth embodiment of the present invention.

With reference to FIG. 4, this system will be described as the fourth embodiment.

First, picture signals are read out with the color CCD 1 positioned at a position (1) as shown in FIG. 5B, for example. The read signals are subjected to a predetermined process in the pre-processing circuit 4 and are then converted into digital signals by the A/D converter 5. The digital signals are recorded on the recording medium 9 without going through the signal processor 8 with the color filter element array unchanged. The same processing is performed when the CCD 1 is shifted to each of the positions (2), (3) and (4). When imaged data at the four positions are recorded on the recording medium 9, video signals are produced by the reproducing apparatus. In this manner, recording in HD mode can be executed without using the buffer memory 6.

A description will now be given of another example of signal processing in the embodiment shown in FIG. 2 with reference to the signal processor shown in FIG. 6, the color filter element array patterns shown in FIGS. 20 to 22 as well as FIGS. 23 through 26.

In the digital signal processor shown in FIG. 6, the signal read from the buffer memory 6 is converted into a high band luminance signal $Y_H$, a low band luminance signal $Y_L$ and color difference signals R-Y and B-Y by the matrix circuit 13. The matrix equations performed in this matrix circuit 13 are expressed as follows with respect to the $W_{2(Y),3(Y)}$ pixels in FIG. 23.

$$Y_H=(\tfrac{3}{8}SW_{2,3}+\tfrac{3}{8}SW_{1,3}+SYe_{1,2}+\\SCy_{2,2})/8=0.29R+0.42G+0.29 B \quad (17)$$

$$Y_L=\alpha(SYe_{1,2}-\tfrac{3}{8}SW_{1,3})+\beta_1(SCy_{2,2}-\tfrac{3}{8}SW_{2,3})+\tfrac{3}{8}SW_{2,3} \quad (18)$$

$$R-Y=\alpha_2(SYe_{1,2}-\tfrac{3}{8}SW_{1,3})+\beta_2(SCy_{2,2}-\tfrac{3}{8}SW_{2,3}) \quad (19)$$

$$B-Y=\alpha_3(SYe_{1,2}-\tfrac{3}{8}SW_{1,3})+\beta_3(SCy_{2,2}-\tfrac{3}{8}SW_{2,3}) \quad (20)$$

The matrix equations with respect to the $W_{3(Y),3(Y)}$ pixels are expressed as follows.

$$Y_H=(\tfrac{3}{8}SW_{3,3}+\tfrac{3}{8}SW_{2,3}+SYe_{3,2}+\\SCy_{2,2})/8=0.29R+0.42G+0.29 B \quad (21)$$

$$Y_L=\alpha(SYe_{3,2}-\tfrac{3}{8}SW_{1,3})+\beta_1(SCy_{2,2}-\tfrac{3}{8}SW_{2,3})+\tfrac{3}{8}SW_{2,3} \quad (22)$$

$$R-Y=\alpha_2(SYe_{3,2}-\tfrac{3}{8}SW_{1,3})+\beta_2(SCy_{2,2}-\tfrac{3}{8}SW_{2,3}) \quad (23)$$

$$B-Y=\alpha_3(SYe_{3,2}-\tfrac{3}{8}SW_{1,3})+\beta_3(SCy_{2,2}-\tfrac{3}{8}SW_{2,3}) \quad (24)$$

$SW_{y,x}$, $SYe_{y,x}$ and $SCy_{y,x}$ express output signals with the horizontal address (X) and vertical address (Y), With $S_W=R+G+B$, $S_{Ye}=R+G$ and $S_{Cy}=G+B$, R, G and B are normalized to "1." $\alpha_1$, $\alpha_2$, $\alpha_3$, $\beta_1$, $\beta_2$ and $\beta_3$ are matrix coefficients.

The color difference signals R-Y and B-Y passing through the matrix circuit 13, which performs the above processing, are subjected to band limitation by the low-pass filters (LPF) 17 and 18. The luminance signal Y is produced by subjecting the $Y_L$-$Y_H$ signal to band limitation by the LPF 15 and adding the signal $Y_H$ to the resultant signal. The thus produced luminance signal and the color difference signals are subjected to data compression by a compressing circuit (not shown) and the compressed signals are recorded on the recording medium 9.

A description will now be given of an HD recording mode.

FIG. 24 illustrates the shifting of the color CCD 1 in HD recording mode. First, the HD mode is selected by the mode selector 10, and four frames of sync signal pulses are output from the sync signal generator 3.. Picture signals are read from the color CCD 1 first in the normal state (original position (1)), and are written in the buffer memory 6. When one frame of picture signals are written in the buffer memory 6, the color CCD 1 is shifted horizontally from the original position (1) to the position (2) by Px. Px and Py are horizontal and vertical pixel pitches, respectively. The shifting means is realized by means for shifting the CCD 1 or means for changing a optical path for the optical image as described in the first embodiment.

When the color CCD 1 is shifted to the position (2) by the above method, picture signals are read from the color CCD 1 and are then written in the buffer memory 6. Likewise, picture signals are also read from the color CCD 1 at the position (3) ($-\tfrac{1}{2}Px+\tfrac{1}{2}Py$) and the position (4) ($\tfrac{1}{2}Px+\tfrac{1}{2}Py$) and are written in the buffer memory 6. The picture signals acquired at the four positions in this manner equivalently become signal acquired from the pixels arranged as shown in FIGS. 26A and 26B. The equivalent array in the case where this method is applied to the color filter shown in FIG. 20 is illustrated in FIGS. 25A and 25B. FIG. 25A illustrates an equivalent array of the filter elements F1, and FIG. 25B an equivalent array of the filter elements F2 and F3.

It is apparent from those drawings that all the color filter elements are arranged at a pixel pitch of $\tfrac{1}{2}Py$ in the horizontal direction and the color filter elements w are arranged at a pixel pitch of $\tfrac{1}{2}Py$ in the vertical direction. The Ye and Cy components are alternately arranged at every third line at a pixel pitch of $\tfrac{1}{2}Py$.

An example of the signal processing for the above array will be described below.

For the vertical addresses with y numbered 1, 3, 5, . . ., processing is performed with respect to the horizontal addresses with x numbered 1, 3, 5, . . ., and for the vertical addresses with y numbered 2, 4, 6, . . ., processing is performed with respect to the horizontal addresses with x numbered 2, 4, 6, and so on.

For example, the computation for $G_{5(y),3(x)}$ pixels is performed as follows.

$$Y_H=(\tfrac{3}{8}SW_{5,3}+\tfrac{3}{8}SW_{3,3}+SYe_{5,3}+\\SCy_{3,3})/8=0.29R+0.42G+0.29 B \quad (25)$$

$$Y_L=\alpha(SYe_{5,3}\tfrac{3}{8}SW_{5,3})+\beta_1(SCy_{3,3}-\tfrac{3}{8}SW_{3,3})+\tfrac{3}{8}SW_{5,3} \quad (26)$$

$$R-Y=\alpha_2(SYe_{5,3}-\tfrac{3}{8}SW_{5,3})+\beta_2(SCy_{3,3}-\tfrac{3}{8}SW_{3,3}) \quad (27)$$

$$B-Y=\alpha_3(SYe_{5,3}-\tfrac{3}{8}SW_{5,3})+\beta_3(SCy_{3,3}-\tfrac{3}{8}SW_{3,3}) \quad (28)$$

The matrix equations with respect to the $W_{4(Y),4(Y)}$ pixels are expressed as follows.

$$Y_H=(\tfrac{3}{8}SW_{4,4}+\tfrac{3}{8}SW_{2,4}+SYe_{2,4}+\\SCy_{4,4})/8=0.29R+0.42G+0.29 B \quad (29)$$

$$Y_L = \alpha(SYe_{2,4} - \tfrac{1}{3}SW_{2,4}) + \beta_1(SCy_{4,4} - \tfrac{1}{3}SW_{4,4}) + \tfrac{1}{3}SW_{4,4} \quad (30)$$

$$R - Y = \alpha_2(SYe_{2,4} - \tfrac{1}{3}SW_{2,4}) + \beta_2(SCy_{4,4} - \tfrac{1}{3}SW_{4,4}) \quad (31)$$

$$B - Y = \alpha_3(SYe_{2,4} - \tfrac{1}{3}SW_{2,4}) + \beta_3(SCy_{4,4} - \tfrac{1}{3}SW_{4,4}) \quad (32)$$

$SW_{y,x}$, $SYe_{y,x}$ and $SCy_{y,x}$ express output signals with the horizontal address (X) and vertical address (Y) in an equivalent array after shifting.

When the vertical addresses (y) are for the N-th line, a computation is performed using data of that line and the (N-2)-th line and data of the horizontal addresses (x) as apparent from the above. Accordingly, luminance signals can be produced with a horizontal pitch of $\tfrac{1}{2}$Px, ensuring resolution more than twice the normal resolution. As an object in monochromatic mode is expressed only by the signals of the vertical lines, the vertical resolution becomes two times the normal resolution.

When the color filter with the color filter array shown in FIG. 21 is shifted in accordance with the shifting pattern shown in FIG. 24, an equivalent array as shown in FIGS. 25A and 25B is obtained. As this equivalent array is quite the same as that of the color filter shown in FIG. 20, a high definition color picture can be obtained as in the case of the color filter shown in FIG. 20.

Figures 28A, 28B, 29, 30, 31, 32:
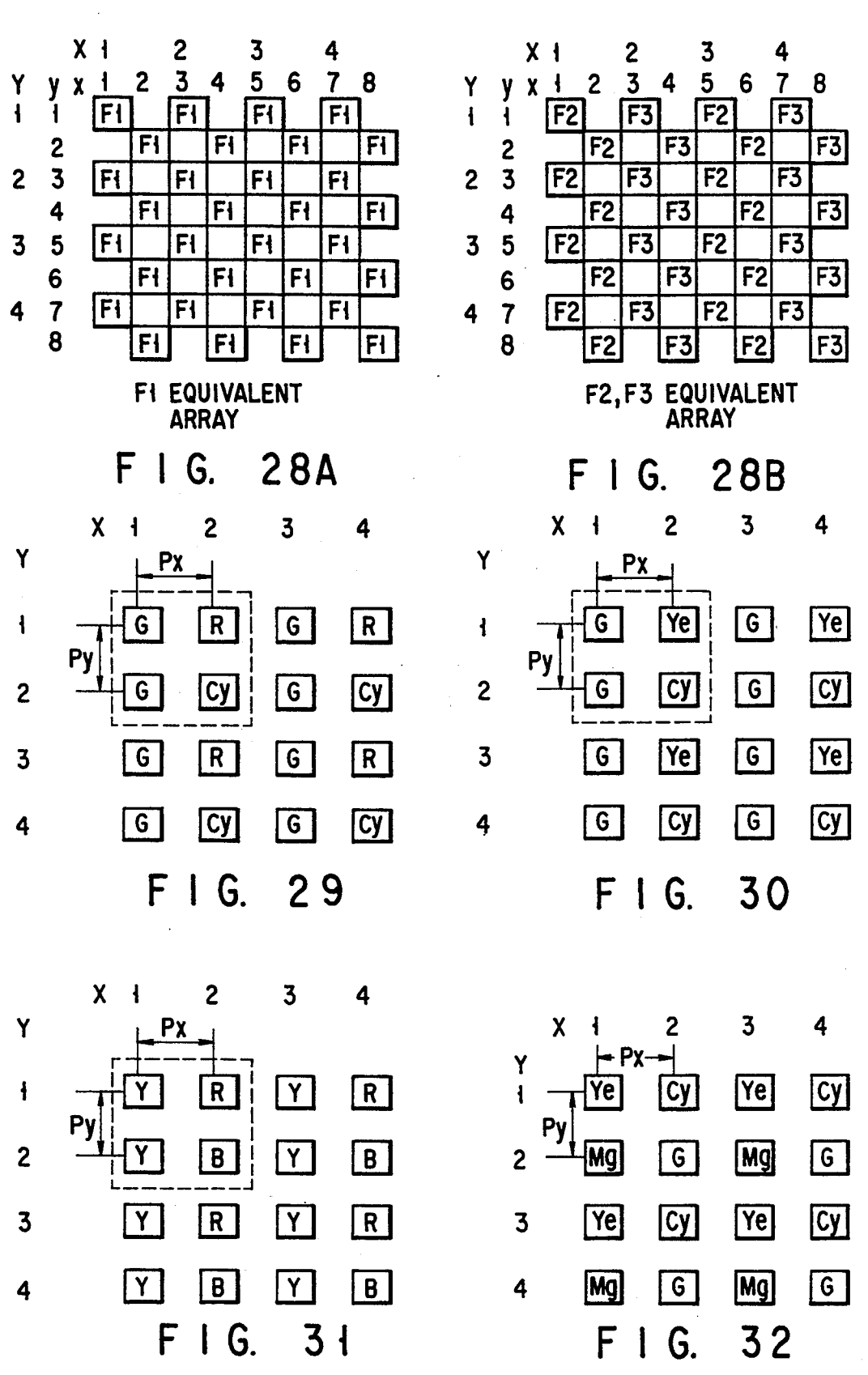

In the case of the color filter array shown in FIG. 22, the color CCD 1 is shifted vertically by Py and obliquely by ($\tfrac{1}{2}$Px$-\tfrac{1}{2}$Py) and ($\tfrac{1}{2}$Px$+\tfrac{1}{2}$Py) in accordance with the shifting pattern whose four positions (1) to (4) correspond to the four vertexes of parallelogram respectively, as shown in FIG. 27. An equivalent array acquired by this shifting is illustrated in FIGS. 28A and 28B. In this array, the color filter elements F1 are arranged in a checkered pattern with a horizontal pixel pitch of $\tfrac{1}{2}$Px and a vertical pixel pitch of $\tfrac{1}{2}$Py, and the filter elements F2 and F3 are arranged vertically in every line at a pixel pitch of $\tfrac{1}{2}$ and alternately every third column in the horizontal direction. In other words, this array is the same as the array shown in FIGS. 25A and 25B flipped sideways. Therefore, if the signal processing is performed with the horizontal addresses and the vertical addresses exchanged with each other in the computation, a high definition color picture can be obtained with the same matrix as shown in FIGS. 25A and 25B. The shifting pattern shown in FIG. 24 can be applied to the color filter element array shown in FIG. 21.

Although the array of the color filter elements W, Ye and Cy has been discussed in the foregoing description, the array is not limited to this particular type, but this invention can be applied to color filters with the following arrays as arrays including a complementary color filters.

This invention may be applied to a color filter as shown in FIG. 29 (F1: G (green), F2: R (red), and F3: Cy (cyan)), a color filter as shown in FIG. 30 (F1: G (green), F2: Ye (yellow), and F3: Cy (cyan)), and a color filter as shown in FIG. 31 (F1: Y (luminance), F2: R (red), and F3: B (blue)).

The Y (luminance) indicates filter elements having the spectral transmission characteristic of luminance.

Even with the above arrays containing a complementary color filter, a high definition color picture can be acquired by optimizing the shifting pattern.

A description will now be given of a high definition system as another embodiment, which uses four color filter elements shown in FIG. 32 (Ye (yellow), Cy (cyan), Mg (magenta) and G (green)). First, the luminance signal (Y), and color difference signals (R-Y, B-Y) in normal mode are produced by the following computation, for example.

The signals for the pixels Mg 2(y),3(x) are produced from the following equations.

$$Y = (2SG_{2,2} + SM_{2,3})/4 = 0.25R + 0.5G + 0.25B \quad (33)$$

$$R - Y = \alpha_1(SCy_{1,2} - SYe_{1,3}) + \beta_1(SMg_{2,3} - 2SG_{2,2}) \quad (34)$$

$$B - Y = \alpha_2(SCy_{1,2} - SYe_{1,3}) + \beta_2(SMg_{2,3} - 2SG_{2,2}) \quad (35)$$

The signals for the pixels $Ye_{3(y),3(X)}$ are produced from the following equations.

$$Y = (SY_{3,3} + SCy_{3,2})/4 = 0.25R + 0.5G + 0.25B \quad (36)$$

$$R - Y = \alpha_1(SCy_{3,2} - SYe_{3,3}) + \beta_1(SMg_{2,3} - 2SG_{2,2}) \quad (37)$$

$$B - Y = \alpha_2(SCy_{3,2} - SYe_{3,3}) + \beta_2(SMg_{2,3} - 2SG_{2,2}) \quad (38)$$

$S_{Ye Y,X}$, $S_{Cy Y,X}$, $S_{Mg Y,X}$ and $S_{G Y,X}$ express output signals corresponding the horizontal addresses (X) and vertical addresses (Y), and with $S_{Ye} = R + G$, $S_{Cy} = G + B$ and $S_{Mg} = R + B$, R, G and B are normalized to "1." $\alpha 1$, $\alpha 2$, $\beta 1$, and $\beta 2$ are matrix coefficients.

A description will now be given of an HD recording mode.

FIG. 33 illustrates the shifting of the color CCD 1 in HD recording mode. First, the HD mode is selected by the mode selector 10, and four frames of sync signal pulses are output from the sync signal generator 3. Picture signals are read from the color CCD 1 first in the normal state (original position (1)), and are written in the buffer memory 6. When one frame of picture signals are written in the buffer memory 6, the color CCD 1 is shifted horizontally from the original position (1) to the position (2) by Px, to the position (3) ($-\tfrac{1}{2}$Px$+\tfrac{1}{2}$Py) and to the position (4) ($\tfrac{1}{2}$Px$+\tfrac{1}{2}$Py) and picture signals are read at those positions. The read picture signals are then written in the buffer memory 6. The positions (1) to (4) correspond to the four vertexes of parallelogram, respectively.

The picture signals acquired at the four positions in this manner equivalently become signal acquired from the pixels arranged as shown in FIG. 34. In FIG. 34, Fa corresponds to the Ye (yellow) and Cy (cyan) filter elements, and Fb corresponds to the G (green) and Mg (magenta) filter elements. It is apparent from the drawing that all the color filter elements are arranged horizontally by a pixel pitch of $\tfrac{1}{2}$Px, and the filter elements W are arranged vertically by a pitch of $\tfrac{1}{2}$Py while the lines of thee Ye and Cy filter elements and the lines of the G and Mg filter elements are alternately arranged, two lines each, in the vertical direction. As far as the R, G and B components are concerned, all the components are included for both Fa and Fb, so that all the components are arranged horizontally and vertically by a pixel pitch of $\tfrac{1}{2}$. Accordingly, high definition can be provided.

An example of the signal processing for the above array will be described below.

For the vertical addresses with y numbered 1, 3, 5, . . . , processing is performed with respect to the horizontal addresses with x numbered 1, 3, 5, . . . , and for the vertical addresses with y numbered 2, 4, 6, . . . , processing is performed with respect to the horizontal addresses with x numbered 2, 4, 6, and so on.

The computation for the pixels Fa 5(y),3(x) is performed as follows.

$$Y = (SYe_{5,3} + SCy_{5,3})/4 = 0.25R + 0.5G + 0.25B \quad (39)$$

$$R - Y = \alpha_1(SCy_{5,3} - SYe_{5,3}) + \beta_1(SMg_{3,3} - 2SG_{3,3}) \quad (40)$$

$$B - Y = \alpha_2(SCy_{5,3} - SYe_{5,3}) + \beta_2(SMg_{3,3} - 2SG_{3,3}) \quad (41)$$

The computation for the pixels Fb4(y) 4(x) is performed as follows.

$$Y = (2SG_{4,4} + SM_{4,4})/4 = 0.25R + 0.5G + 0.25B \quad (42)$$

$$R - Y = \alpha_1(SCy_{2,4} - SYe_{2,4}) + \beta_1(SMg_{4,4} - 2SG_{4,4}) \quad (43)$$

$$B - Y = \alpha_2(SCy_{2,4} - SYe_{2,4}) + \beta_2(SMg_{4,4} - 2SG_{4,4}) \quad (44)$$

In the production of the luminance signal, as described above, the luminance signal can be produced line by line and at a pitch of ½Px, so that the horizontal and vertical resolutions are improved to about two times the normal resolutions. It should however be understood from the equations that for the vertical low-frequency components, if $(S_{Cy} + S_{Ye})$ is not equal to $(2S_G + S_{Mg})$, line crawl of the luminance signal may occur, which requires correction. This correction is performed as follows. If the white balance of the signals ($S_{Ye}$, $S_{Cy}$, $2_{SG}$ and $S_{Mg}$) read from the image sensor is obtained, for a monochromatic object, the equations (39) and (42) for the luminance signal equal each other, thus causing no line crawl. The line crawl of the luminance signal may occur when a color object is imaged, i.e., when R-Y≠0 or B-Y≠0. Therefore the occurrence of the line crawl can be suppressed by providing a correction table determining the amount of correction between lines of the luminance signal in accordance with the levels of the color difference signals (R-Y, B-Y) and performing the correction on the luminance signal with that amount.

A description will now be given of an embodiment in the case where the color CCD 1 is shifted in accordance with a shifting pattern wherein positions (1) to (4) correspond to the four vertexes of parallelogram, respectively, as shown in FIG. 35.

The color CCD 1 is shifted horizontally to the position (2) by Px, and obliquely to the position (3) by −½Px+Py and to the position (4) by ½Px+Py in the same manner as done in the previous embodiment. FIG. 36 illustrates an equivalent arrangement of the color filter elements in that case. It is apparent that the Cy and Ye pixels and the G and Mg pixels are arranged in a checkered pattern with a horizontal pixel pitch of ½ and a vertical pixel pitch of ½. The signal processing in this case, i.e., the generation of the high luminance signal $Y_H$ and the color difference signals R-Y and B-Y are performed as follows, for example. The computation for the pixels Fa$_{5(y),3(x)}$ is carried out as follows.

$$Y_L = (SYe_{5,3} + SCy_{5,3} + SMg_{5,2} + 2SG_{5,2})/8 = 0.25R + 0.5G + 0.25B \quad (45)$$

$$Y_H = (SYe_{5,3} + SCy_{5,3} + SMg_{3,3} + 2SG_{3,3})/8 = 0.25R + 0.5G + 0.25B \quad (46)$$

$$R - Y = \alpha_1(SCy_{5,3} - SYe_{5,3}) + \beta_1(SMg_{3,3} - 2SG_{3,3}) \quad (47)$$

$$B - Y = \alpha_2(SCy_{5,3} - SYe_{5,3}) + \beta_2(SMg_{3,3} - 2SG_{3,3}) \quad (48)$$

The computation for the pixels FbS(y),4(x) is carried out as follows.

$$Y_L = (SYe_{5,3} + SCy_{5,3} + SMg_{5,4} + 2SG_{5,4})/8 = 0.25R + 0.5G + 0.25B \quad (49)$$

$$Y_H = (SYe_{3,4} + SCy_{3,4} + SMg_{5,4} + 2SG_{5,4})/8 = 0.25R + 0.5G + 0.25B \quad (50)$$

$$R - Y = \alpha_1(SCy_{3,4} - SYe_{3,4}) + \beta_1(SMg_{5,4} - 2SG_{5,4}) \quad (51)$$

$$B - Y = \alpha_2(SCy_{3,4} - SYe_{3,4}) + \beta_2(SMg_{5,4} - 2SG_{5,4}) \quad (52)$$

From the above equations, the horizontal high luminance signal becomes $Y_H$ and the luminance signal can be produced at a pitch of ½Px, the acquired resolution is about twice the normal resolution. The vertical low luminance signal is expressed by the equation of $Y_L$ and is produced line by line. As the equivalent array has a pitch of Py as shown in FIG. 36, however, no improvement as high as that on the horizontal resolution is made. But, as no line crawl occurs, the luminance signal between lines need not be corrected.

Even in one-chip complementary color system, high definition is possible by optimizing the shifting pattern.

Although the array of the color filter elements shown in FIG. 32 has been discussed in the foregoing description of this embodiment the array is not limited to this particular type, but the same equivalent array as obtained by the shifting in the previous embodiment is also obtained for the arrays shown in FIGS. 37 to 39.

High definition is provided by writing data obtained at four positions in the previous embodiments. An embodiment of a system for further improving high definition will now be described below.

In the method of the previous embodiments, as in the case of the equivalent array shown in FIGS. 25A and 25B, for example, the color filter elements F1 which assign two pixels for four pixels can be arranged in a checkered pattern with horizontal and vertical pitches of ½, but the color filter elements F2 and F3 which assign one pixel for four pixels are vertically arranged at every third line (line after shifting, thus generating lines of insensible pixels. To overcome this problem, the pattern swing as shown in FIG. 40 is performed in this embodiment. In FIG. 40, the reading of picture signals at the positions (1), (2), (3) and (4) is the same as the signal reading at the four positions in the previous embodiments. In this case, swing to four positions can be accomplished with two shifting axes; the shifting position (2) only by Px in the horizontal direction and the shifting position (3) only by −½Px+½Py in the oblique direction. The position (4) can be obtained by the combination of those two axes. In this embodiment, another axis is added to the two axes. In other words, the shifting axis for the shifting position only by Px in the vertical direction, i.e., to the position (5), is added. The addition of this axis can provided an additional shifting pattern for shifting horizontally from a position (5) to a position (6) by Py+(px), and obliquely to a position (7) Py+(−½Px+½Py) and (8) Py+(½Px+½Py). The positions (5) to (8) correspond respectively to the four vertexes of parallelogram, similarly to the positions (1) to (4).

FIG. 42 illustrates an equivalent array that can be obtained at the eight positions (1) to (8). The color filter elements F in this equivalent array represent all the color filter elements F1, F2 and F3. With regard to the color filter elements F1, although overlapping pixels are generated, the overlapping data may be or may not be read. As apparent from the drawing as the three colors (F1, F2 and F3) are all arranged in a checkered pattern with horizontal and vertical pitches of ½, the computation for generating color can be accomplished pixel by pixel, and the processing is simple. This system can thus provide a high definition color picture with less occurrence of a false signal than the shifting to four positions.

Although the equivalent array shown in FIG. 42 is the same as the one obtained when the color filter elements in the arrays shown in FIGS. 20 and 21 are shifted in accordance with the shifting pattern shown in FIG. 40 the array is not limited to this particular type. With the array shown in FIG. 42 (F1 is G (green), F2 is R (red) and F3 is B (blue)), this embodiment can be applied to any array with two rows and four columns as a basic unit, like an array with a G stripe-R/G full checkered pattern which is considered best in an electronic still camera to provide the highest picture quality.

Figure 44:
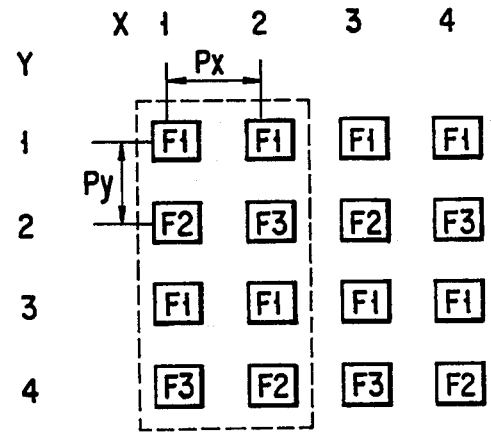
FIG. 44 is a diagram showing another color filter array adaptable to the shifting shown in FIG. 41.

Likewise, if the filter elements in the array shown in FIG. 22 (FIG. 21) are shifted at eight positions as shown in FIG. 41, an equivalent array as shown in FIG. 42 can be obtained. In this case this embodiment is not limited to this particular array, but can be applied to any array with four rows and two columns taken as a basic unit as shown in FIG. 44. Further this embodiment is not limited to the color filter array consisting of three colors, but may be applied to a mosaic pattern of Ye, Cy, Mg and G as shown in FIG. 32.

In short, the shifting at eight positions can accomplish higher definition if the restriction on the time of reading picture data is small.

Figure 45:
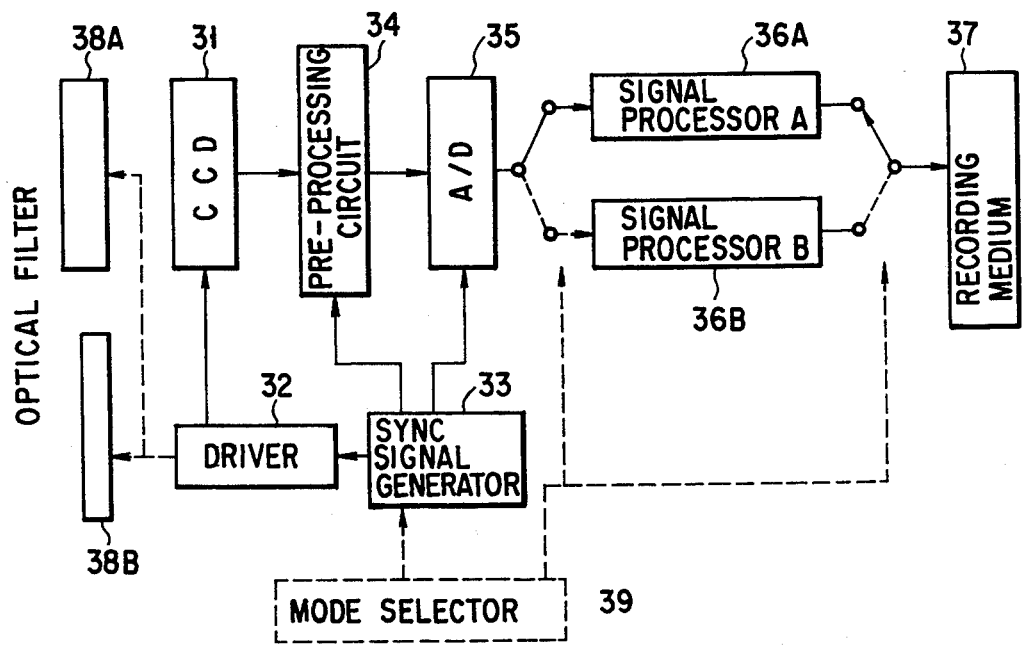
FIG. 45 is a block diagram of an electronic still camera according to another embodiment, which is designed to prevent the occurrence of color moire.

An embodiment shown in FIG. 45 is an electronic still camera which can provide a high-quality picture of a monochromatic object, such as characters, at high resolution without causing color moire. According to this embodiment, a color solid state image sensor (CCD) 31 is connected to a driver 32, and the output terminal of the CCD 31 is selectively connected to a signal processor 36A or a signal processor 36B via a pre-processing circuit 34 and an A/D converter 35. The output terminals of the signal processors 36A and 36B are connected to a recording medium 37, such as a semiconductor memory. Crystal optical filters 38A and 38B are driven by the driver 32, and are selectively arranged in front of the CCD 31. A sync signal generator (SG) 3 receives a mode select signal from a mode selector 39, and supplies sync signals to the preprocessing circuit 34 and A/D converter 35.

To begin with, the normal processing of the electronic still camera shown in FIG. 45 will be described. When the normal imaging mode is selected by the mode selector 39 the crystal optical filter 38A for reducing color moire originated from the color filter array is set in front of the color CCD 31. The signals read from the color CCD 31 are subjected to a predetermined process, such as pre-amplification, white balance or gamma correction, by the pre-processing circuit 34, and are then converted into digital signals by the A/D converter 35. The digital signals are then supplied to the signal processor 36A. This signal processor 36A producers a luminance signal from the picture signal, performs data compression and sends the compressed data to the recording medium 37, such as a memory card.

Then, the monochromatic imaging mode will be described. When the monochromatic imaging mode is selected by the mode selector 39, the crystal optical filter 38B, which suppresses aliasing noise originated from pixel sampling when the color solid state image sensor 31 is considered as a monochromatic image sensor is set in front of the color CCD 31.

Figures 46, 47, 48:
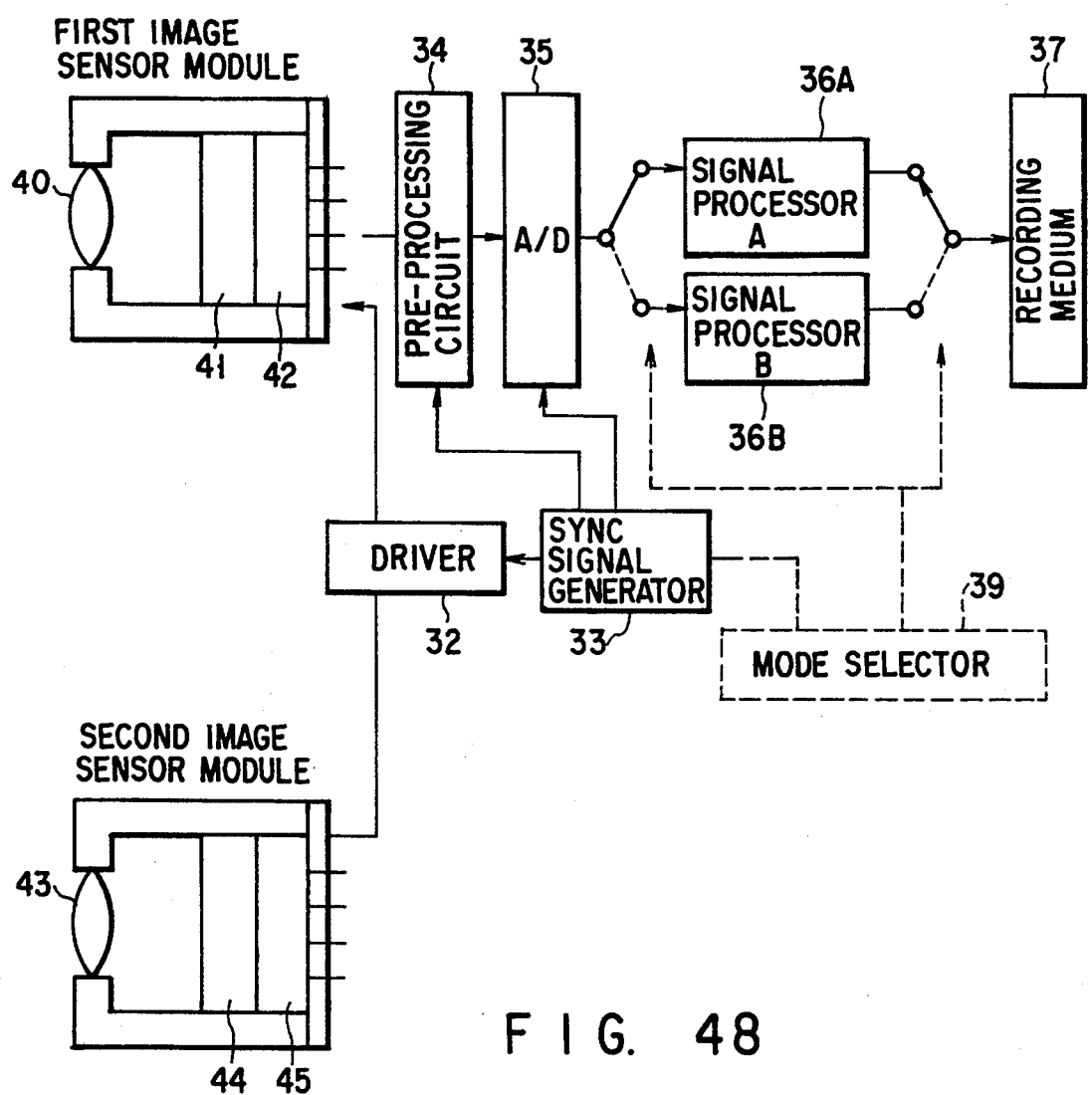
FIG. 46 is a diagram showing a color filter array for explaining the embodiment shown in FIG. 45.
FIG. 47 is diagram illustrating an equivalent color filter array when a solid state image sensor with the color filter array shown in FIG. 46 is treated as a monochromatic device.
FIG. 48 is a block diagram of an electronic still camera according to a further embodiment associated with the embodiment shown in FIG. 45.

The signals read from the color CCD 31 are subjected to a predetermined process by the preprocessing circuit 34, and are then converted into digital signals by the A/D converter 35. The digital signals are then supplied to the signal processor 36B where binarization is performed. Suppose that the color filter array of the color CCD 31 is an array E shown in FIG. 46. FIG. 47 illustrates an equivalent array when the color CCD 31 is used in monochromatic imaging mode. Here, $W_G$, $W_R$ and $W_B$ means that the color filters R, G and B are white pixels. If the object is monochromatic and white balance is obtained in the pre-processing circuit 34, the signal levels of $W_G$, $W_R$ and $W_B$ are equal to one another before A/D conversion, so that the threshold levels in the binarization in the signal processor 36B should have the same value for R, G and B.

If white balance for R, G and B is not obtained or when binarization is performed without obtaining white balance, the values for R G and B are checked and the threshold levels in the binarization are separately determined.

A description will now be given of another embodiment association with FIG. 45, referring to FIG. 48. In this embodiment, imaged signals output from a first imaging module, which comprises an optical lens 40, a crystal optical filter 41 and a color solid state image sensor 42, are subjected to a predetermined process, such as preamplification, white balance or gamma correction, by the pre-processing circuit 34, and are then converted into digital signals by the A/D converter 35. The digital signals are then supplied to the signal processor 36A. This signal processor 36A produces a luminance signal and color difference signals from the picture signal, performs data compression and records the compressed data on the recording medium 37, such as a semiconductor memory.

The first imaging module is attachable to and detachable from the electronic still camera, and can be exchanged with a second imaging module. The second imaging module is used, for instance when a picture can be black and white and the resolution is important. The second imaging module comprises an optical lens 43, a crystal optical filter 44 and a monochromatic solid state image sensor 45. The picture signals output from the second imaging module are subjected to a predetermined process by the pre-processing circuit 34 and are then converted into digital signals by the A/D converter 35. The digital signals are then supplied to the signal processor 36A. This signal processor 36A performs monochromatic processing on the received signals and records the resultant signals on the recording medium 37. If the number of pixels of the color solid state image sensor 42 of the first imaging module is set equal to the number of pixels of the monochromatic solid state image sensor 45 of the second imaging module, the same driver 32 and sync signal generator 33 may be used.

As the imaging modules are designed detachable from the electronic still camera as desired, imaging suitable to the purpose becomes possible. If the driver 32 and signal generator 33 are included in the imaging modules, those imaging modules can be exchanged with the imaging module of a solid state image sensor having a different number of pixels (e.g., an HD solid state image sensor).

Figure 49:
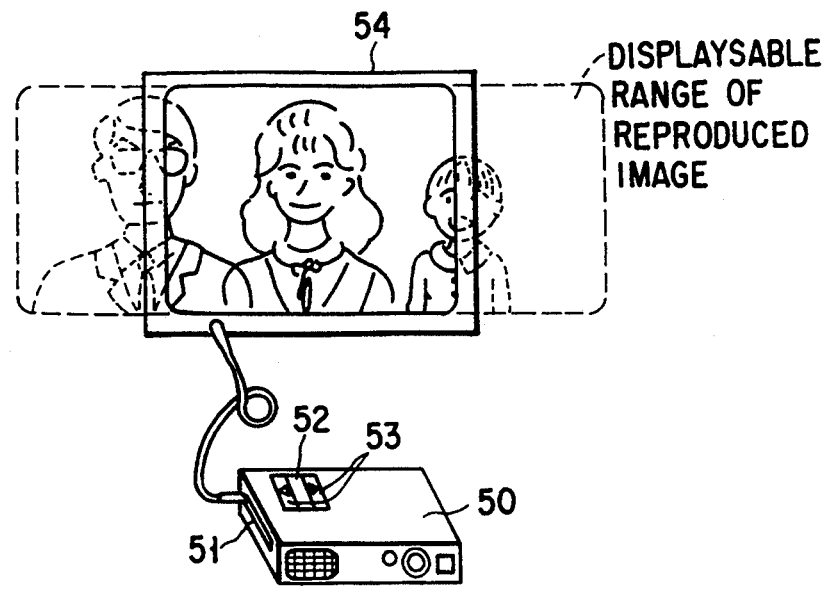
FIG. 49 is a diagram for explaining the functions of an electronic still camera according to a still another embodiment which can alter the display range.

Referring now to FIG. 49, a description will now be given of how to use an electronic still camera system which can reproduce a picture with a wider image output range than a standard TV monitor, and the concept of the system.

FIG. 49 illustrates a digital electronic still camera 50 having a reproducing function to allow the use of a memory card 51 as a recording medium and the reproduction of the image object on an ordinary TV monitor 54. Although the image output range of the conventional electronic still camera system is fixed, the broken line portion is the image output range of the reproduced image according to the system of this invention. An operator can change the image output range in the horizontal direction within this allowable image output range by operating a playback button 52 and direction buttons 53. Hereinafter, this image outputting method will be called "panorama mode."

A description will now be given of the imaging method which can ensure panorama reproduction. By reading signals at the position corresponding to a ½ pitch of the pixels in the vertical direction, using the method shown in FIGS. 1 and 2, the number of pixels in the vertical direction appears to be twice the number of pixels of the ordinary camera.

Figure 50:
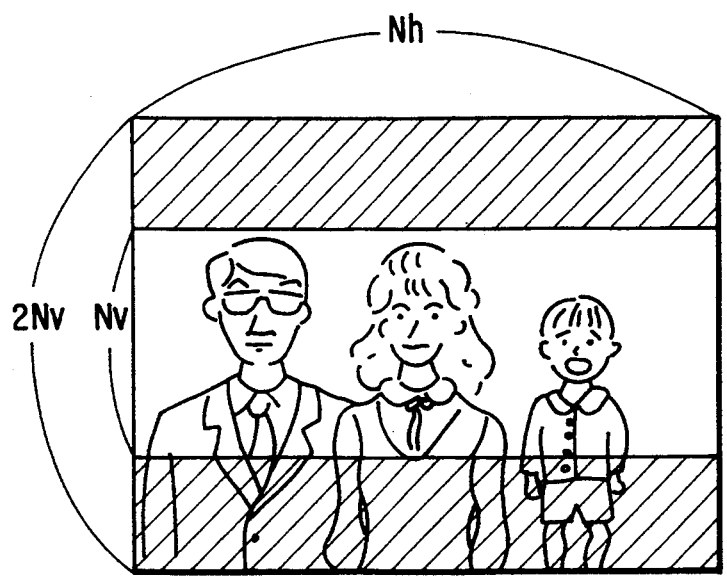
FIG. 50 is a diagram for explaining the imaging range of an image in this embodiment.

FIG. 50 illustrates an example of an imaged picture in this case. Provided that the number of the effective vertical pixels of the TV monitor 54 is Nv, the image in FIG. 50 has 2Nv vertical pixels. A half screen in an arbitrary vertical direction is taken as an effective image and is subjected to signal processing accordingly before being recorded on the recording medium, e.g., the memory card 51. In the example of FIG. 50, the unshaded portion is selected. The above manipulation can provide a recorded image having a range in which the image output range can be widened horizontally as shown in FIG. 49.

The reproducing means will now be described. FIG. 51 is a block diagram of a reproducing section 70 of the electronic camera 50. Still picture data recorded on the memory card 51 is sent to a still picture reproducing section of the electronic camera 50 via an interface (IF) 71 between the card and the camera. The data is recorded in an display memory circuit 73 via a digital reproduction signal processor 72. The output data of the display memory circuit 73 is converted into an analog signal by a D/A converter 74. The analog signal is output via an analog signal processing section 75 to the monitor 54.

Provided that the output rate at the time of outputting an ordinary monitor image is fs and the number of the horizontal image pixels then is Nh the effective horizontal image necessary for the panorama mode becomes twice Nh. As the number of the horizontal input pixels in panorama mode is Nh, the correct output image cannot be obtained if the horizontal pixels are output at the rate fs. To ensure the correct image output with the correct aspect the image should be output and reproduced at the rate of fs/2. Alternatively, as shown in FIG. 53 showing the display memory circuit 73, a horizontal interpolation circuit 79 may be provided at the subsequent stage of an display memory 78 so that the image is output at the rate of fs after the effective data is interpolated. FIG. 57 shows an example of the address space of the display memory 78 in this case; the display memory 78 needs a capacity of horizontal Nh×vertical Nv pixels. The shaded portion in FIG. 57 shows an example of the memory portion which is selected and its image is output.

In this example, the image portion in nearly the center of the allowable image output range is selected, and an operator can select the left or right direction button 53 shown in FIG. 49 to move the image output range. The selection of the image output direction by the operator is transmitted to a horizontal address counter 76 which generates the addresses of the display memory circuit 73, so that the start address of the horizontal addresses of the display memory 78 is changed, thereby horizontally shifting the image output range.

Figure 54:
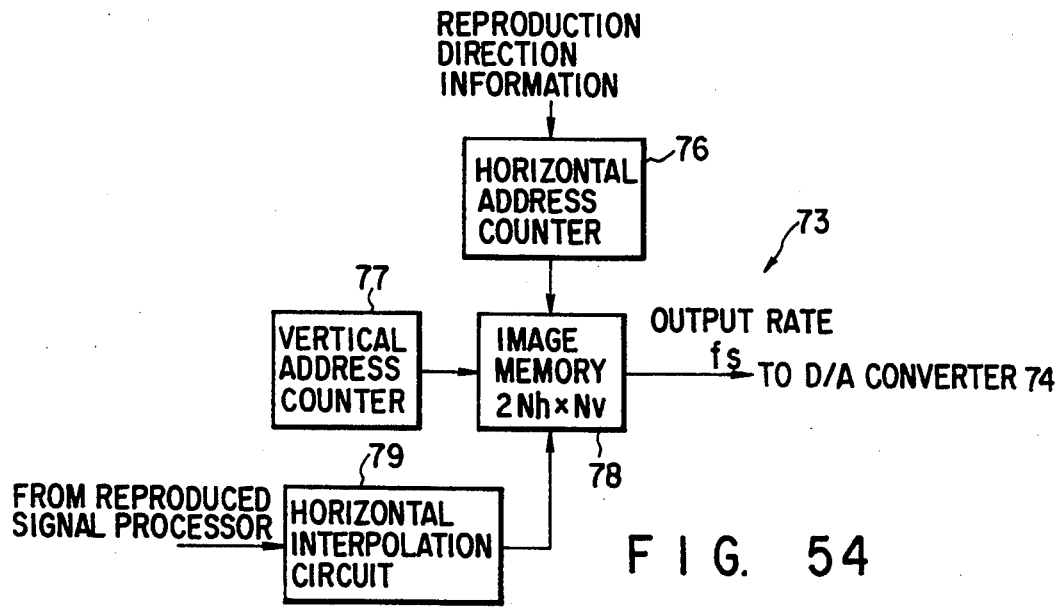
FIG. 54 is a block diagram of a second example of the display memory shown in FIG. 53.

FIG. 54 shows an example in which the horizontal interpolation circuit is placed at the previous stage of the display memory 78. The memory capacity of the display memory 78 needs to be twice the normal capacity in the horizontal direction as in the case of FIG. 58.

The embodiment with the vertical pixels increased to double has been discussed in the above.

Figure 55:
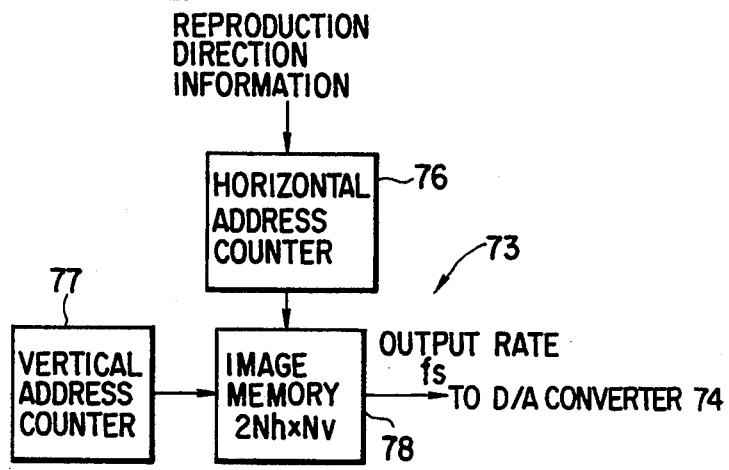
FIG. 55 is a block diagram of a third example of the display memory shown in FIG. 53.

A description will now be given of the case where like the number of the vertical pixels, the number of the horizontal pixels is also increased. This can be realized by HD mode. In the example of FIG. 50, the vertical pixels of 2Nv and horizontal pixels of Nh are input, but in this embodiment the vertical pixels of 2Nv and the horizontal pixels of 2Nh are input. Of those pixels, a half of the vertical pixels are selected and are subjected to signal processing before being recorded on the recording medium. The image data on the recording medium is reproduced by the reproducing section having the display memory circuit 73 in FIG. 55. The address space of the display memory 78 in this case is the same as shown in FIG. 58.

Figure 56:
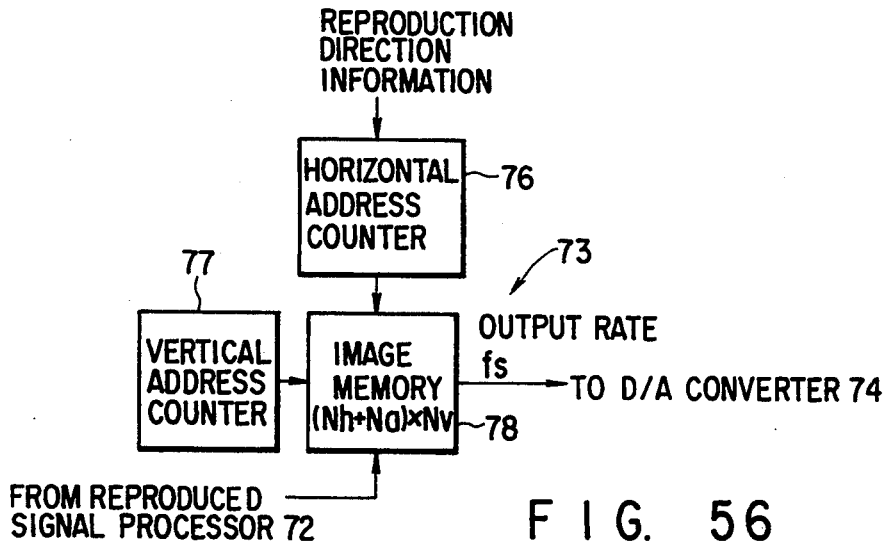
FIG. 56 is a block diagram of a fourth example of the display memory shown in FIG. 53.

FIG. 59 illustrates an example of another address space which can reduce the capacity of the display memory 78. The display memory 78 has memory space of the vertical pixels of Nv and the horizontal pixels of Nh+Na where 0≦Na<Nh. A memory for the horizontal pixels of Na in addition to the horizontal pixels of Nh for the selectively output image is provided, and image data in the designated direction for the Na pixels is put through the signal processor and is supplementarily recorded on the recording medium. Then, the start position of the horizontal addresses is shifted to move the display image. Accordingly, the horizontal address counter should be so designed as to select the head address next to the horizontal final address to provide continuous addresses. FIG. 56 presents a block diagram of the display memory circuit 73 in this case.

The capacity of the display memory 78 can be reduced by supplementing reproduction image data in the above manner as needed. If a block coding scheme such as still picture cosine transform is used in the signal processing, the memory can be used more efficiently by setting Na in accordance with the length of the horizontal block or a multiplication of that length.

The foregoing description has discussed the embodiment which shifts the position of an object image on the image sensor and performs signal reading plural times. A description will now be given of another embodiment which does not shift the position of the formed image.

FIG. 60 shows an example o fusing an image sensor having a wider horizontal image angle. The pixels used in normal imaging mode are the shaded portion in the center and the whole pixels are used in panorama mode The number of horizontal pixels Nb is not particularly specified as long as Nb>Nh.

FIG. 61 shows an image with a mark put in a panorama reproduction image to distinguish the reproduced image picked up in normal imaging mode from the reproduced image picked up in panorama mode. "P" at the upper right of the reproduced image represents a panorama image. At the time of reading data from the memory card, the reproducing section of the electronic camera reads image control data from the memory card which indicates whether the image data is an ordinary image or a panorama image, and selects signal processing matching the image. As one process in this processing, when the output image is a panorama image, a mark representing such is indicated in the reproduced image.

FIG. 62 indicates the direction in which an image can be displayed; in this case, it is indicated that display in both directions is possible. In FIG. 63, the direction mark on the image indicates that there is no image in the right direction and the image can be moved only in the left direction. The panorama mark or direction mark may be generated from a mark generator 81 constituted of a digital circuit and may be mixed with the image by a digital mixer 82 as shown in FIG. 64, or may be generated from a mark generator 83 constituted of an analog circuit and may be mixed with the image by an analog mixer 84 as shown in FIG. 65.

FIG. 66 shows an example in which a display section for indicating the displayable direction to the operator is provided at the operation section of an electronic camera. In this example, light-emitting portions are provided in direction buttons 53a and 53b and the light emission of those portions indicates the displayable direction to the operator. In this drawing, only the left direction is lit, indicating that only the leftward movement is possible.

To inform the user of whether the mode is the normal imaging mode or the panorama mode at the imaging time, the mode may be displayed on the liquid crystal display panel on the camera body or may be displayed in the view finder as shown in FIG. 67. The mark "P" at the upper right within the view finder in FIG. 67 indicates the panorama mode. "P" may be positioned in the finder image display. The entire finder is an effective image in normal imaging mode while the center portion excluding the upper and lower shaded portions is an effective image range in panorama mode. Means for distinguishing the shaded portions from the center portion may be a shield cover for the real image finder. For an electronic finder, the shaded portions can be distinguished from the center portion by increasing or decreasing the level of the luminance signal or increasing or decreasing the level of part of the color signals, e.g., any of the RGB signals, or the levels of two types of signals. FIG. 68 presents the display in the finder when an image sensor with a wide horizontal image angle shown in FIG. 60 is used; the center portion is an effective image range in normal imaging mode while the entire portion is an effective image range in panorama mode.

Although the panorama function in the horizontal direction has been discussed in the foregoing description, the display image may be expanded in the vertical direction or both in vertical and horizontal directions. For the expansion in the vertical and horizontal directions, the entire portion in FIG. 50 should be treated as an effective image range whereas the half portion is the vertical effective image range FIG. 69 is a block diagram of the display memory circuit 73 according to an embodiment in which an image sensor having the vertical pixels of Nv and the horizontal pixels of Nh are shifted twice in the vertical and horizontal directions, thereby seemingly change the image forming positions, thereby seemingly increasing the number of pixels to four times. FIG. 70 shows an example of the display image. As shown in FIG. 69 direction information is input to a vertical address counter 77 as per the horizontal address counter 76 In the example of FIG. 70, it is indicated that the image can be moved in the up and down directions as well as in the right and left directions. In this case, an image sensor having a longer horizontal length and a larger number of pixels than the image sensor for the normal TV should be used.

This image sensor may be a Hi-vision image sensor having about twice the number of the vertical pixels.

Figure 71:
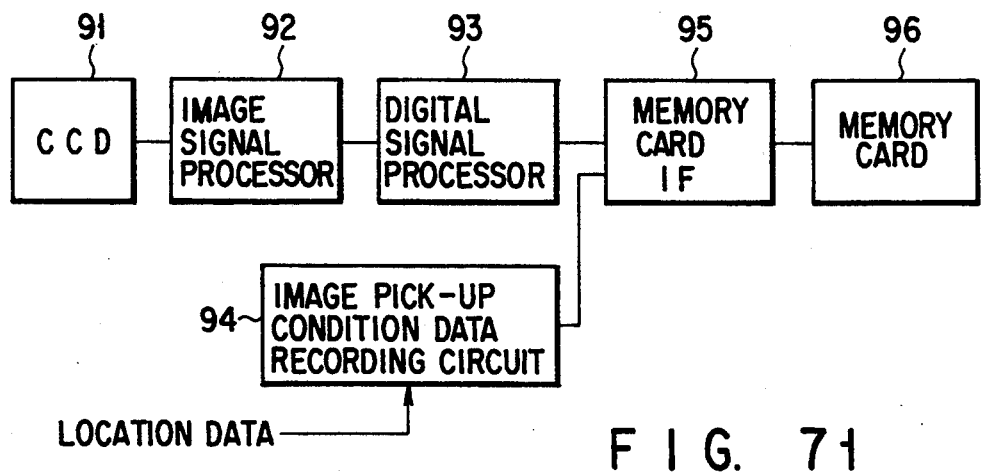
FIG. 71 is a block diagram of the recording section of an electronic still camera according to a further embodiment, equipped with a retrieval function.

An embodiment shown in FIG. 71 is an electronic still camera which can add position information indicating the imaging location to the imaging condition data. This electronic still camera comprises a solid state image sensor (CCD) 91, an image signal processor 92, a digital picture signal 93, an imaging condition data recording circuit 94, a memory card interface 95 and a memory card 96.

In FIG. 71, position information is added as imaging condition data. Position data indicating the location of imaging is generated in the camera or such position data is externally input, and this position data is recorded via the imaging condition data recording circuit 94 together with image data on the recording medium. The embodiment of FIG. 71 is a digital electronic still camera which record digital picture signals. The memory card 96 is used as a recording medium. The following description will also be given with reference to a digital electronic still camera.

As means for generating position data position data from a global positioning system (GPS) may be used, position data of a mobile telephone station may be used, discrimination may be made using the radio broadcasting such as FM broadcasting or AM broadcasting, which can be received at the location of the imaging, TV broadcasting, or an input through a keyboard or pen input board may be used.

Figure 72:
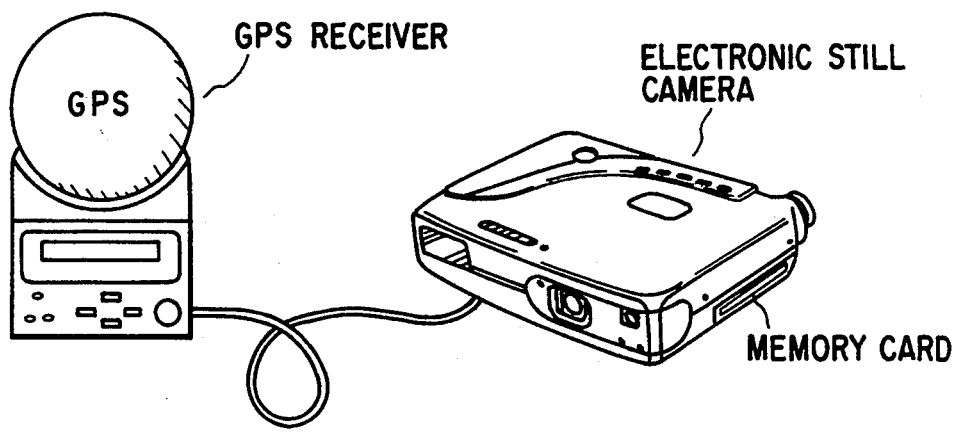
FIG. 72 is a diagram showing the case where the electronic still camera of this embodiment is connected to a GPS (Global Positioning System) receiver.
Figure 73:
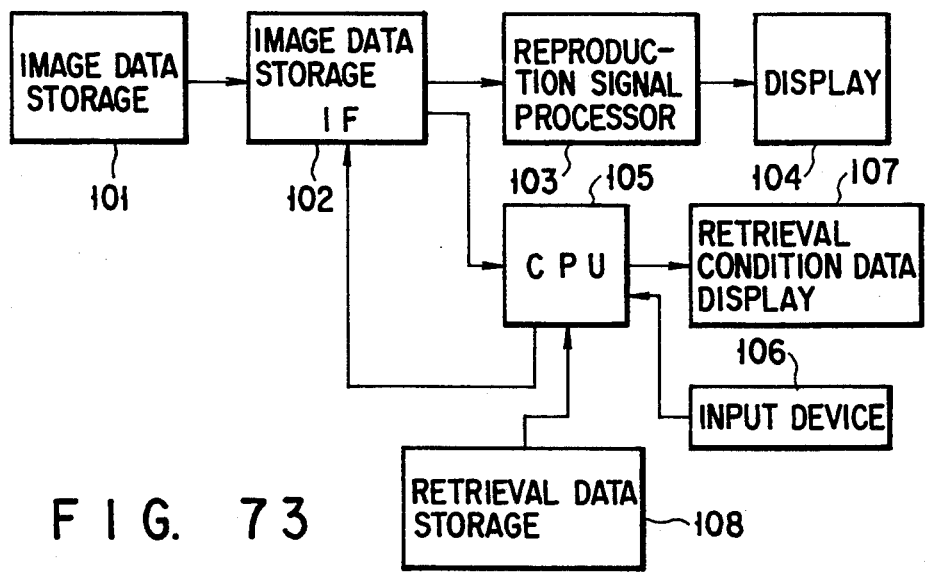
FIG. 73 is a block diagram showing the reproducing section of the electronic still camera according to this embodiment or the reproducing section of an electronic album having a medium for recording image data picked up by the electronic still camera.

FIG. 72 illustrates a GPS device connected to an electronic camera to input position data to the camera. At the same time as the imaging is performed or after the imaging, position data is read from the GPS device and is recorded, linked with the image data on the memory card. FIG. 73 is a block diagram of the reproducing section of an electronic camera or the reproducing section of an electronic album having a medium that stores and holds a large amount of image data picked up by an electronic camera. The reproducing section comprises an image data storage section 101, an image data storage interface 102, a reproduction signal processor 103, an image display section 104, a CPU 105, an input section 106, a retrieval question display section 107 and a retrieval data storage section 108.

The large capacity medium may be an optical disk, magneto optical disk hard disk, magnetic tape, magnetic bubble memory, etc. A user who wants to retrieve an image inputs the name of the imaging location through input means in the reproducing section. Then, the position data of that location is read from the retrieval data storage section, that position data is compared with the position data of each recorded image and the image data with a small error is output as being likely one. This image outputting ensures highly efficient image retrieval.

Figure 74:
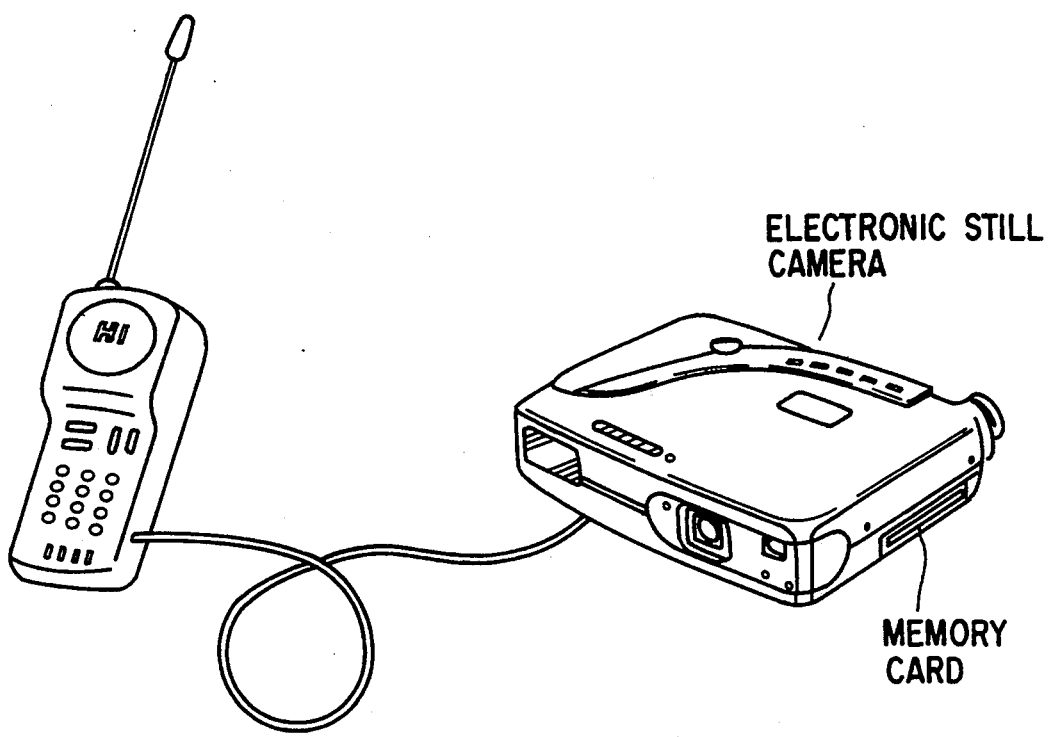
FIG. 74 is a diagram showing the case where the electronic still camera according to this embodiment is used as a mobile telephone.

FIG. 74 illustrates a mobile telephone connected to an electronic still camera to input position data to the camera. The electronic still camera is connected to the nearby relay station via the mobile telephone, and identification data of that relation station is input to the camera. As the position information of the identification data station is given to the reproducing section, the approximate location of the imaging is identified. The location of the imaging can be identified more specifically by utilizing the identification data of a plurality of relay stations.

In the examples of FIGS. 72 and 74, position data is input to the electronic still cameras from an external system, but the cameras may be provided with this function of acquiring position data.

Figure 75:
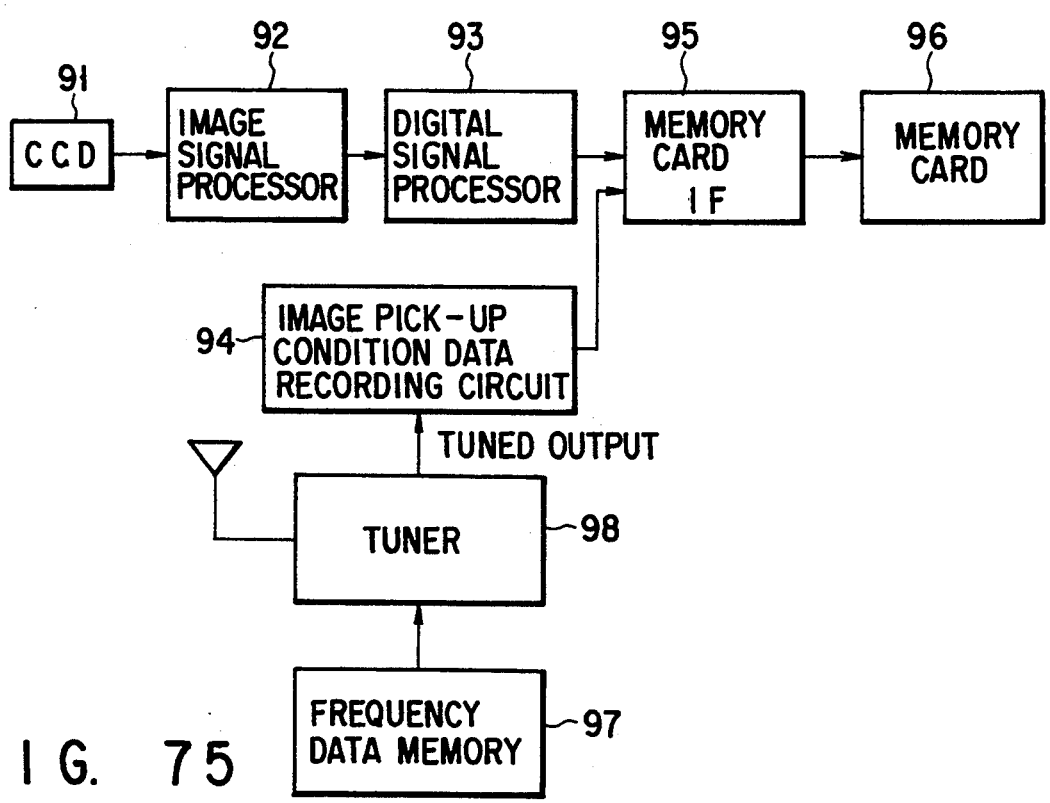
FIG. 75 is a block diagram of the electronic still camera of the embodiment shown in FIG. 71.

FIG. 75 shows an example in which radio waves or TV waves or both are used as means for inputting position data. The tuning frequency of an internal or external tuner 98 is selected from a plurality of frequencies previously set in a frequency data memory 97, and when a tuned output is generated, its output frequency is turned into data which is then recorded on the memory card 96 via the imaging condition data circuit 94.

As the frequency data of the broadcasting stations and relay stations are recorded in the retrieval data storage section in the reproducing section, the location of the image can be estimated by comparing this frequency data with the tuned frequency data in the memory card 96.

The present invention can be used together with the method of using various imaging condition data that has been described in Jpn. Pat. Appln. No. 2-234492, entitled "Digital Electronic Still Camera System." FIG. 76 shows an example of the retrieval screen in the reproducing section, in which position data is used together with other imaging condition data. When a retriever answers the questions on the screen, the reproducing section computes the probable values of each image based on the answers, compares those values with one another, and output the image with the most likely value first. FIG. 77 shows the state of the CPU 105 which performs computation. In accordance with the questions, imaging condition data of each image necessary for the computation is read out and is substituted into predetermined equations. The results of the individual computations are collected by a total computing section to be probability values of the individual images. The values are used in the comparison.

Although digital systems have been described in the foregoing description of the embodiments, this invention can also be applied to an analog system.

An embodiment shown in FIG. 78 is an electronic still camera system equipped with a zoom function and a compressing function. FIG. 79 presents a flowchart illustrating the control flow of this system. In FIG. 78, an image pick-up section 201 includes an optical system having a lens, shutter, etc., and a photoelectric converting element, such as a CCD, for photoelectrically converting an image formed by the optical system. The picture signals output from the image pick-up section 201 are input to an analog signal processor 202 where the signals are subjected to gamma correction or white balance adjustment. The output of the signal processor 202 is converted into digital data by an A/D converter 203, and this digital data is input as digital image information to a digital signal processor 204 including an interpolation processor.

When the zoom mode is selected by a user at the imaging time, the video image is electronically enlarged through linear interpolation or the like in the interpolation processor. The enlarged image data is input to an image compression circuit 205. The compression system may be a color still picture coding system which is one type of block coding such as JPEG. The video image compressed by this system is recorded in a memory pack, e.g., a video image recording medium 206, such as an IC card, which is detachably or exchangeably installed in or connected to the body of the electronic camera.

As described above this electronic zoom system performs image compression after executing interpolation, thereby eliminating the deterioration of the image quality originating from an increase in block deformation caused by the block coding, and suppresses the high-frequency component of the image through the interpolation, thereby suppressing the occurrence of block deformation due to image compression.

Figure 81A:
FIGS. 81A through 81F are diagram for explaining the features of this blocked-image data compression system.
Figure 81B:
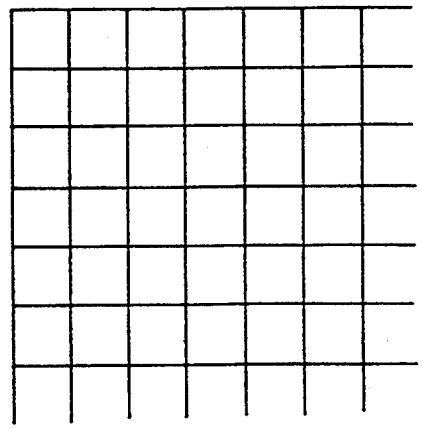
Figure 81C:
Figure 81D:
Figure 81E:
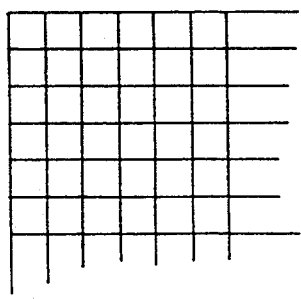
Figure 81F:
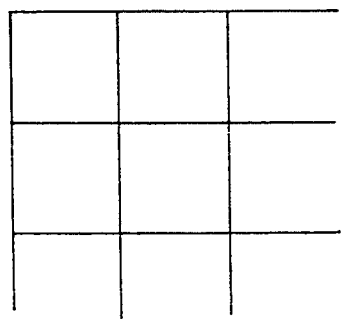

A description will now be given of the JPEG as the block data compression system referring to FIGS. 80, and 81A through 81F. According to the JPEG, the original image shown in FIG. 81A is separated into $8 \times 8$ pixel blocks as shown in FIG. 81B, and discrete cosine transform (DCT) is performed in that blocks. The high-frequency component of a DCT coefficient is eliminated by using a quantization table for roughly quantizing the high frequency to thereby accomplish highly efficient compression. But, the decoded image has a noncontinuity of the frequency component at the boundary of the blocks as shown in FIGS. 81C and 81D causing block deformation. If interpolation is performed after compression, therefore, the block-coding originated block deformation is enlarged as shown in FIG. 81E or 81F to be sensible to human eyes, making the deterioration of the image quality more prominent.

Figure 82:
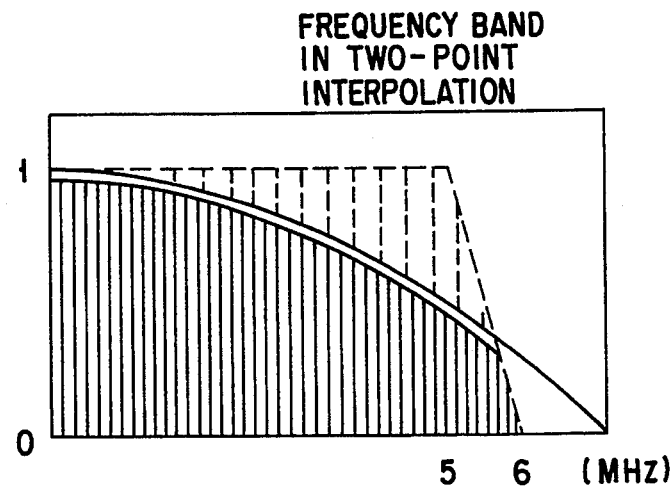
FIG. 82 is a diagram showing the band characteristic of a video signal and the band characteristic of a signal acquired by two-point interpolation.

The interpolation has a low pass characteristic as shown in FIG. 82, the amount of information of a high-frequency region is reduced at the time image compression is performed. As mentioned above, the block data compression system is accomplished by reducing the amount of information of the high-frequency region. Since the amount of information of the high-frequency region is already reduced by the interpolation the image information is not affected by the elimination of the high-frequency component in the compression process, so that the block deformation is suppressed.

The system of the present invention is not easily affected by the block coding and can suppress the deterioration of the image quality.

With regard to zooming, zooming by an optical system and electronic zooming may of course be used together.

Figure 83:
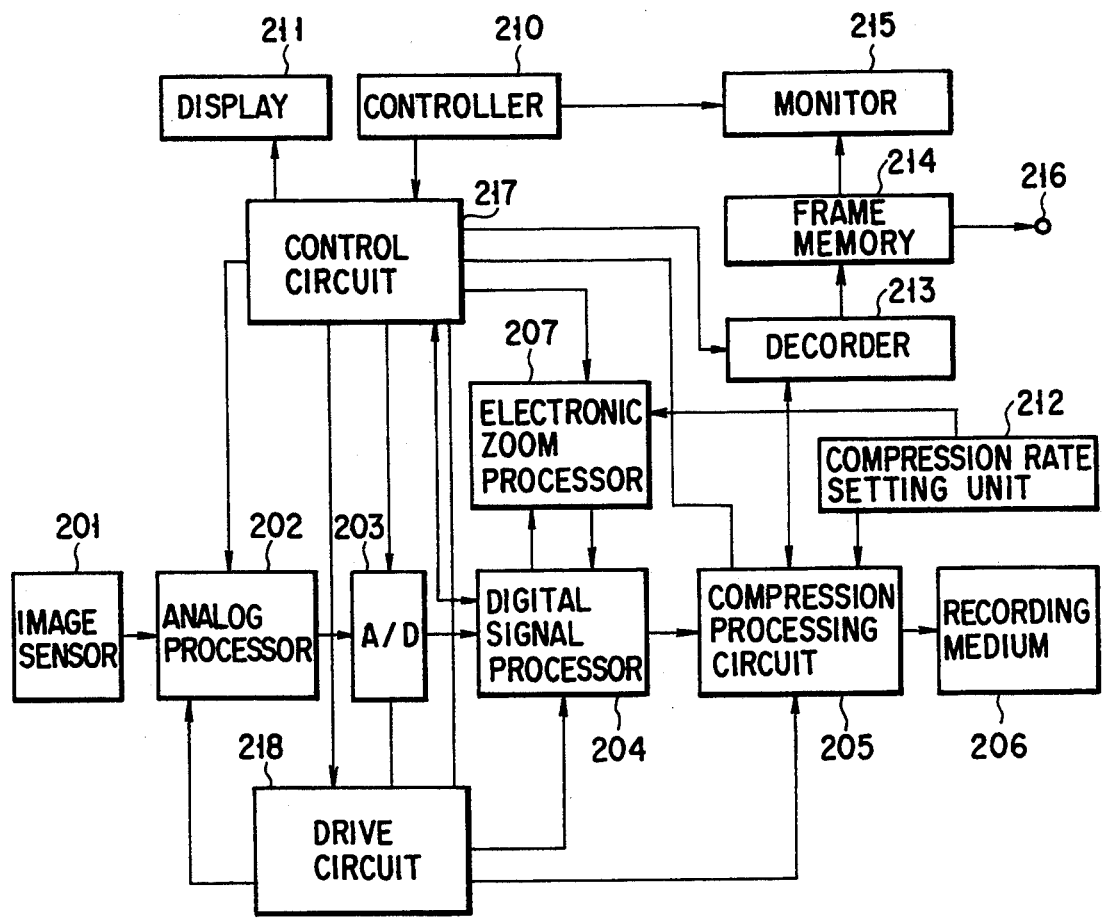
FIG. 83 is a block diagram of an image sensor according to a different embodiment associated with FIG. 78.

FIG. 83 illustrates an embodiment equipped with a function for changing the compression ratio by the zooming magnification and a function for checking a read image. The electronic still camera according to this embodiment has a controller 210 as a user interface so that the user can select the functions of the camera system such as the zooming function and image checking function. The content of the selected process is displayed on a display section 211, allowing the user to confirm the content.

The magnification is selected through the controller 210 by the user. As the magnification is increased, the amount of information of the high-frequency component on the spatial frequency is reduced in the case of electronic zooming. If the compression ratio of the block coding for roughly quantizing the high-frequency component is increased, therefore, its influence on the image quality is not high. The zoom magnification at the imaging time is input to a compression ratio selector 212, and a high compression ratio is selected as the magnification increases. This can save the memory without degrading the image quality.

When the function of checking the image supplied to the controller 210 is selected, image information from the image compressor circuit 205 or the recording medium 206 is sent to a decoder 213, and the decoded image is stored in a frame memory 214. This image information is output on a monitor 215 equipped on this image pick-up device or an external monitor terminal 216. Accordingly, it is possible to check whether or not the picked-up image is good before recording the image on the recording medium, such as an optical disk, magnetic disk or digital tape, or before printing.

Although this embodiment is an electronic camera which deals with digital still pictures, this system is effective when used in compression which involves block-coding originated quality deterioration in a digital motion picture camera.

Figure 84:
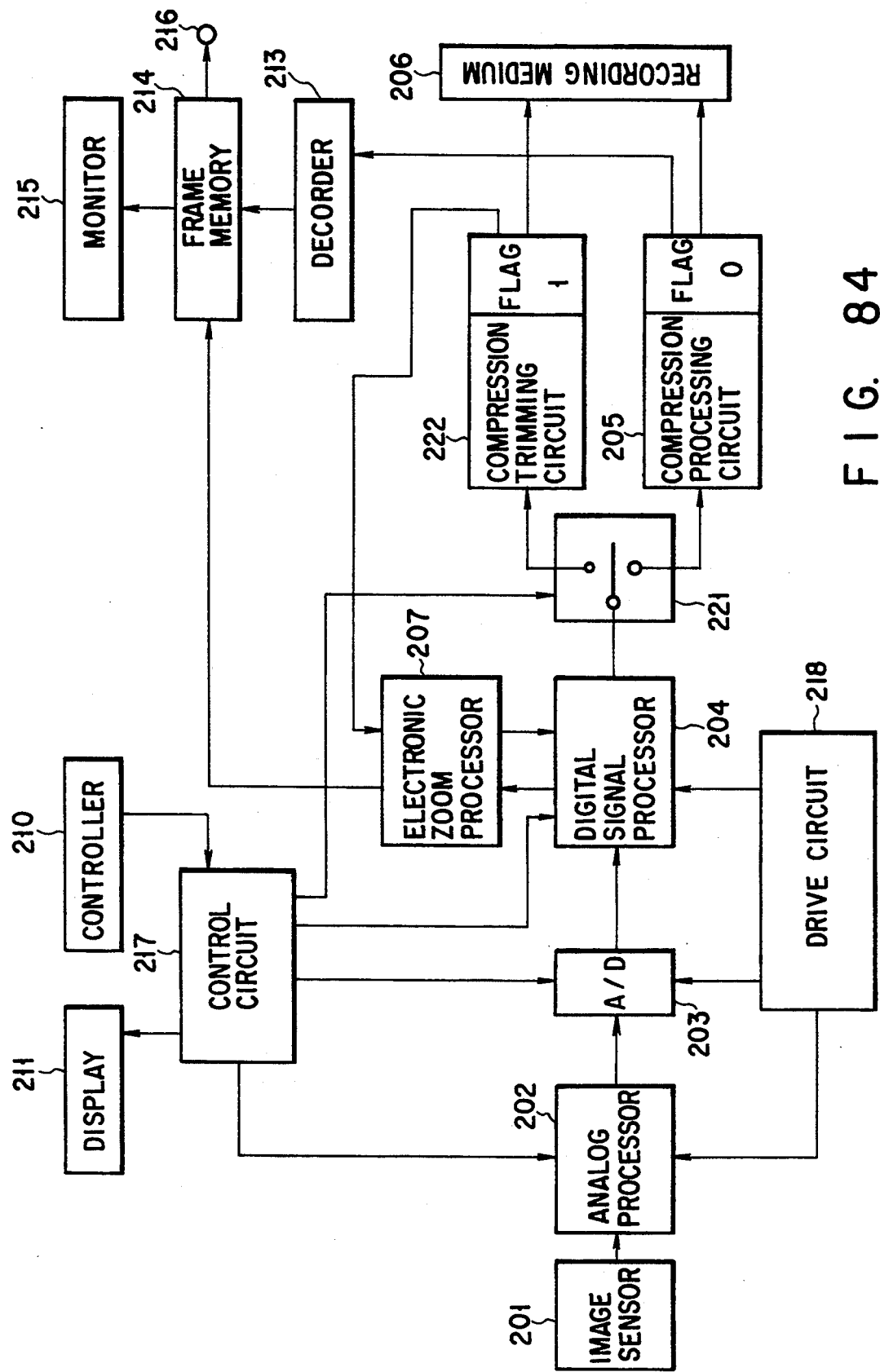
FIG. 84 is a block diagram of an image sensor according to another embodiment.
Figure 85:
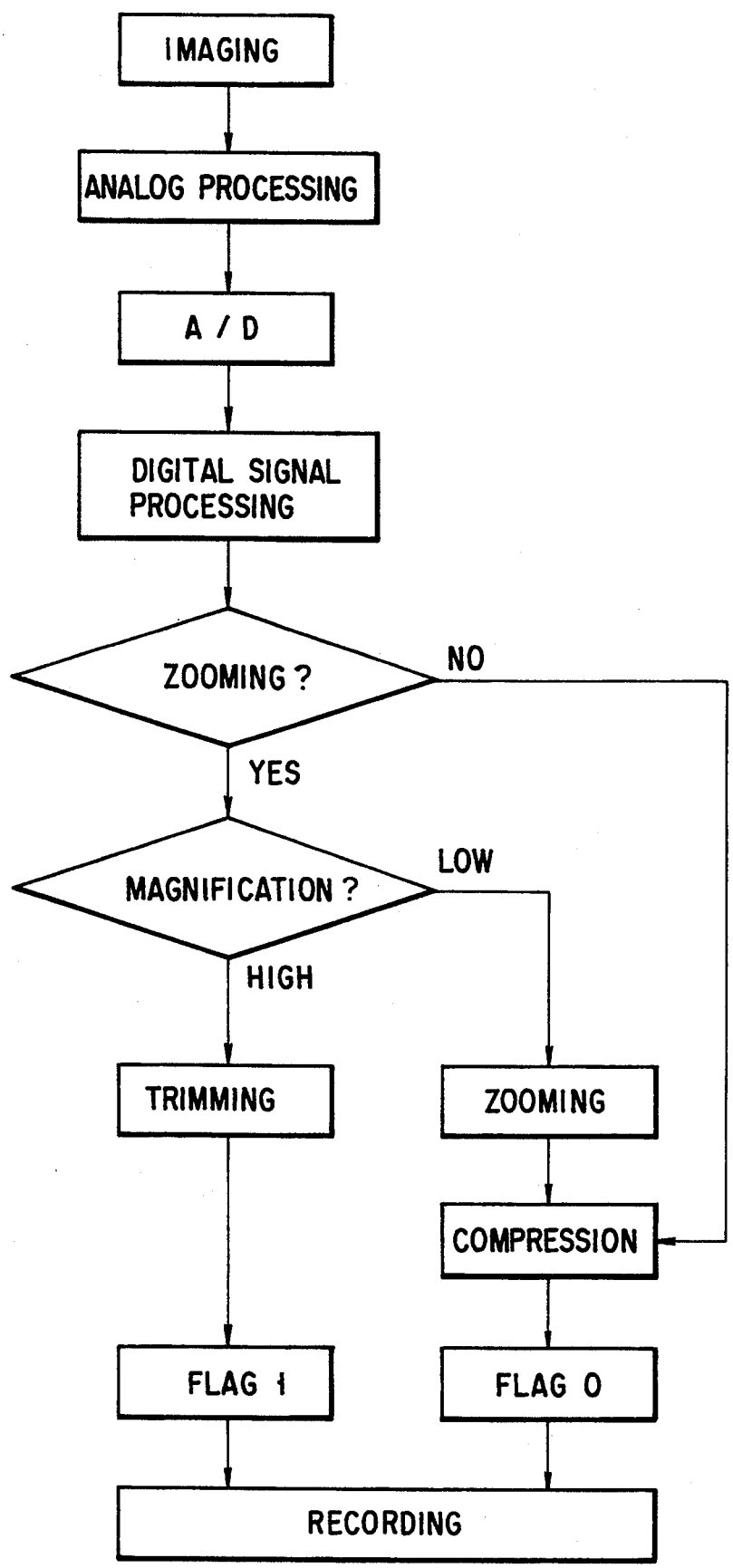
FIG. 85 is a flowchart illustrating the flow of the control according to this embodiment.

FIG. 84 is an image pick-up device according to the embodiment which has a function for selecting the proper processing at the time of low magnification or high magnification in zoom mode, and has processes suitable for the selection. FIG. 85 is a flowchart for controlling the image pick-up device in FIG. 84.

When the user selects the zoom mode at the imaging time, compression/segmentation process selecting section 221 determines whether or not to compress data. For high magnification, the process selecting section 221 selects the output of an image segmentation process circuit 222 without performing compression in the compression circuit 205. This process selecting section 221 selects the proper processing from the compression ratio of the compression circuit and the zoom magnification.

As the zoom magnification is increased, the number of real pixels in the region of the zoomed image becomes very small, so that the recording of this region alone needs a small amount of data, thus saving the memory. Further, deterioration of the interpolated image caused by the compression-originated deformation of the image will not occur. This system can save the memory and improve the quality of the zoomed image.

Figure 87:
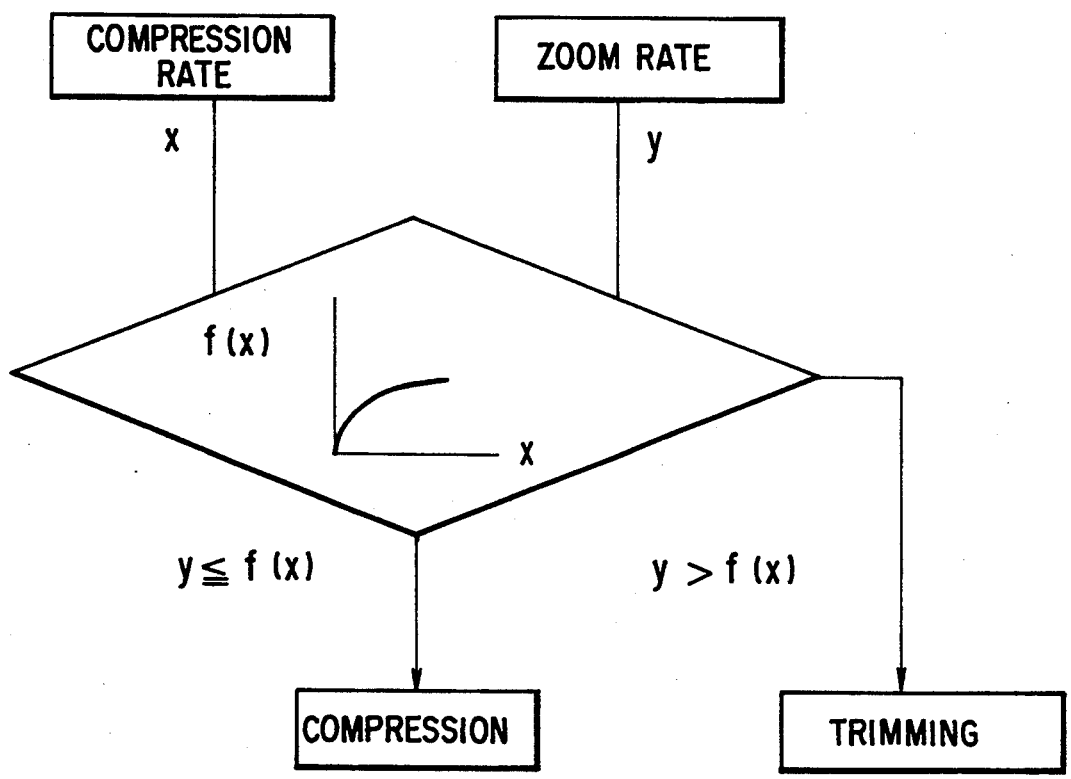
FIG. 87 is a diagram illustrating the principle of the function of a compression/extraction selecting section shown in FIG. 84.

FIG. 87 illustrates the operational principle of the compression/segmentation process selecting section 221. Based on the compression ratio and zoom magnification, the user makes an input to the process selecting section 221. This process selecting section 221 has a function f(x) inside. When $y \leq f(x)$ where x is the compression ratio and y is the magnification, which indicates that the magnification is smaller than the compression ratio, the process selecting section 221 selects compression. When $y > f(x)$, which indicates that the magnification is higher than the compression ratio the process selecting section 221 selects segmentation. An example of the internal function f(x) is $f(x) = \sqrt{x}$, and this function is previously given to the system. This device can perform the proper process so that the best image under the selected conditions can always be obtained.

Figure 86:
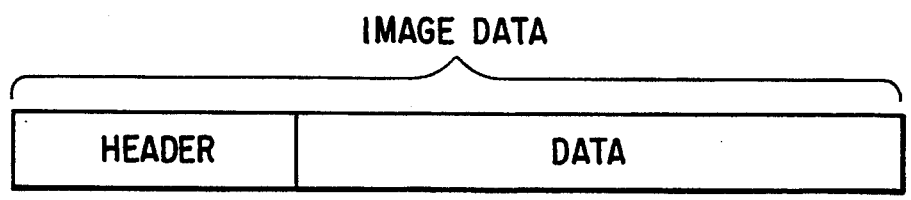
FIG. 86 is a diagram showing an image format.

An example of the image format is shown in FIG. 86. Additional information, such as the size of the image or imaging date, is included in the header portion, and a flag indicating whether segmentation has been performed and zooming is necessary is provided.

Figure 88:
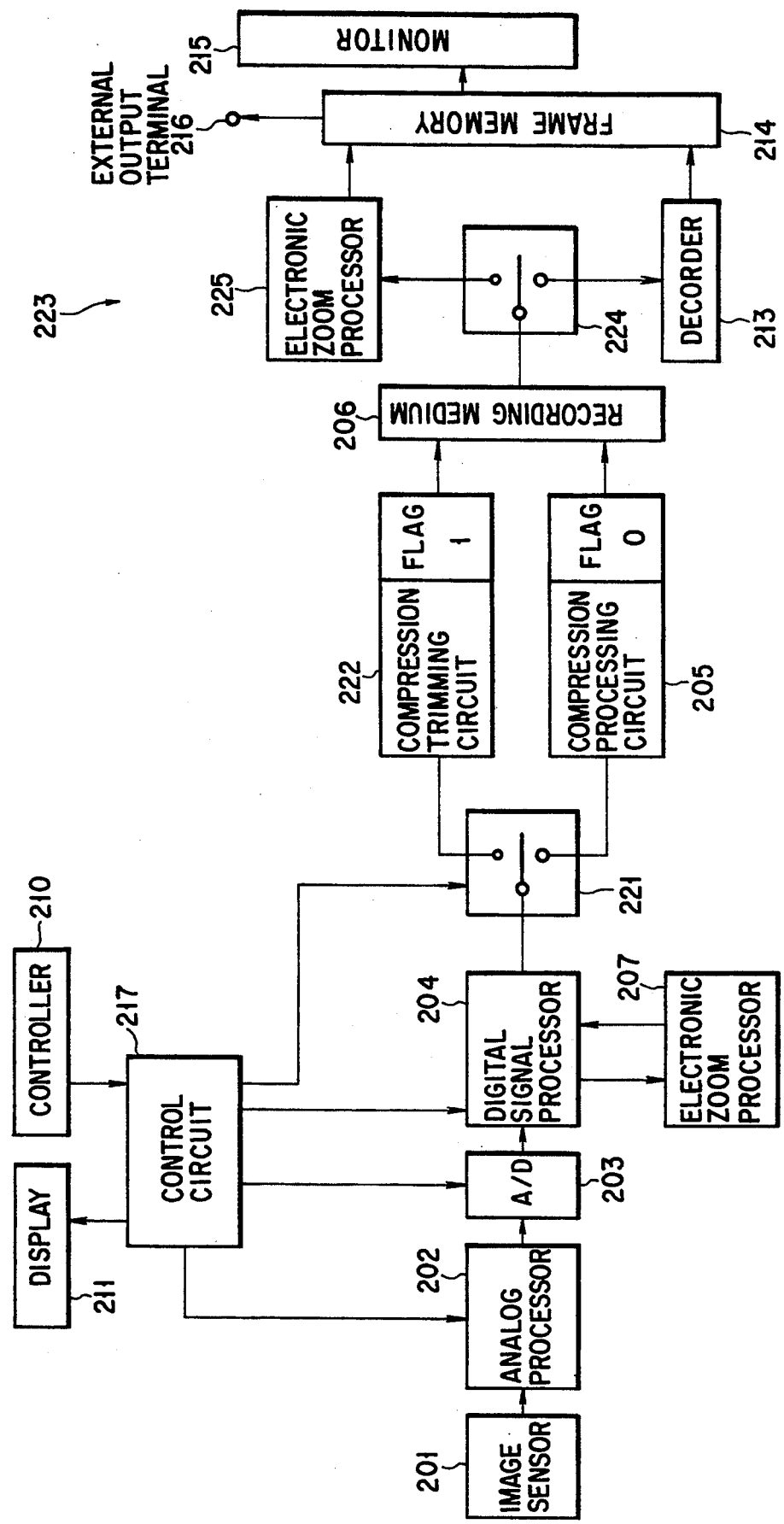
FIG. 88 is a block diagram of an image sensor according to a further embodiment associated with FIG. 78.

As shown in FIG. 88, a process selecting section 224 of a reproduction process section 223 selects the reproduction process in accordance with this flag. If data is compressed, it is decoded by a decoder 213, and the decoded result is stored in a frame memory 214 before being output to a monitor 215 or the like. If segmention is performed, the aforementioned bi-linear interpolation or high dimensional interpolation is performed on the image data, stored on the recording medium, by an electronic zoom processor 225.

Although the embodiment shown in FIGS. 51 through 57 has been described as being applied to a still picture system, the application of this invention to a motion picture system will now be described.

Figure 89:
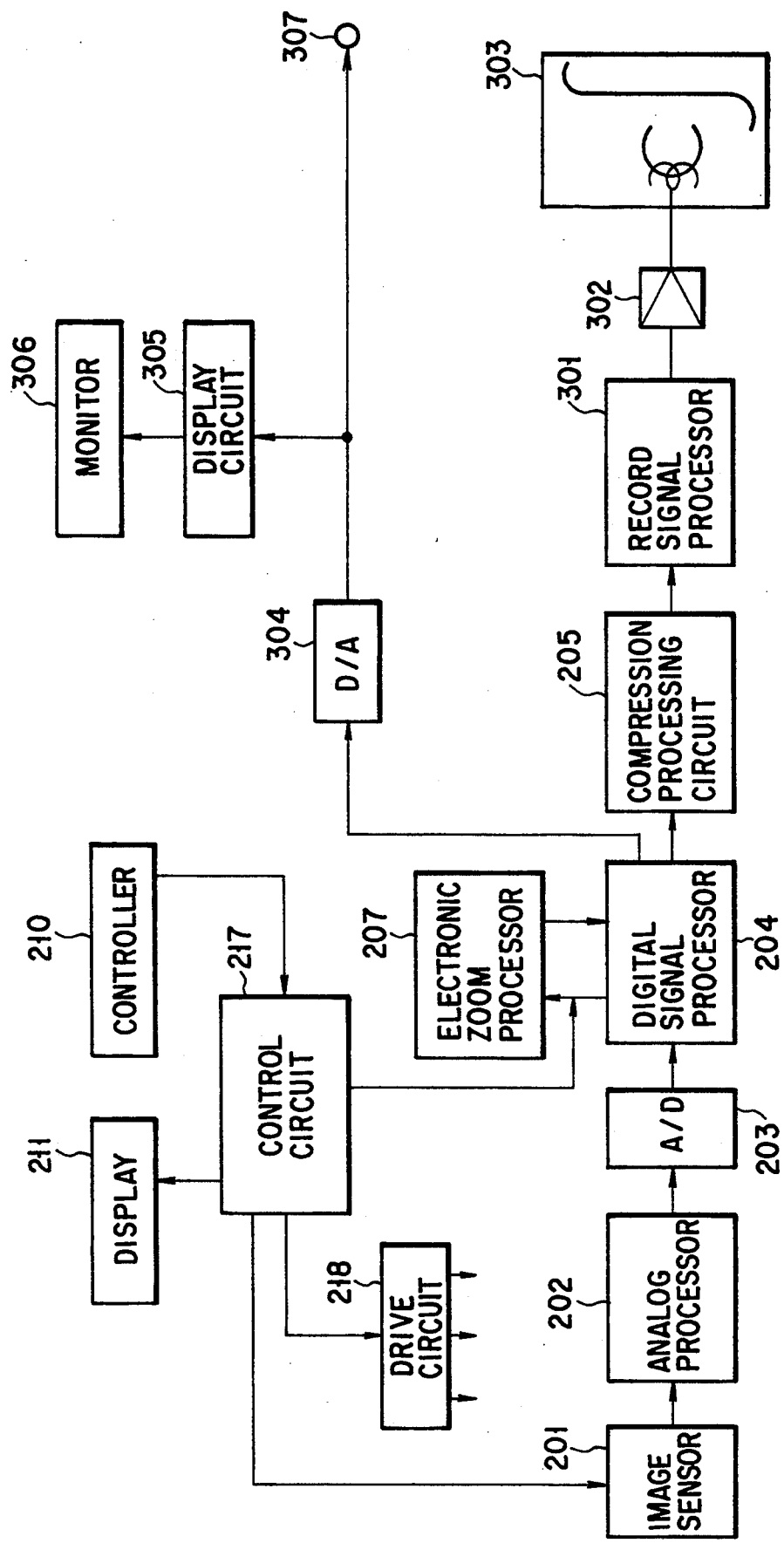
FIG. 89 is a block diagram of an image sensor according to still another embodiment associated with FIG. 78.

FIG. 89 is a block diagram showing the schematic structure of a digital camera system according to an embodiment which uses the aforementioned electronic zooming system and digitally records motion pictures. In FIG. 89, the image pick-up device 201 includes a photoelectric converting element, such as a CCD, which photoelectrically converts the image formed by the optical system including a lens. The picture signals output from the image pick-up device 201 are supplied to the signal processor 202 where gamma correction, white balance adjustment, and the like are performed. The output of the signal processor 202 is converted into digital data by the A/D converter 203, this digital data is input as digital image information to the digital signal processor 204 including an interpolation processor. When the zoom mode is selected by the user at the imaging time, video image is electronically enlarged through linear interpolation or the like in the electronic zoom processor 207. The enlarged image data is input to the image compression circuit 205.

The compression system may be an MPEG, which is a motion picture coding system that is one type of block coding. The video image compressed by this system is recorded via a recording signal processor 301 and an amplifier 302 on a digital tape 303 or a video recording medium such as an optical disk, which is detachably or exchangeably installed in or connected to the body of the electronic camera.

As described above, this elecronic zoom system performs image compression after executing interpolation by the electronic zoom processor 207, thereby eliminating the deterioration of the image quality originating from an increase in block-coding originated block deformation, and suppresses the high-frequency component of the image through the interpolation, thereby suppressing the occurrence of block deformation due to image compression.

Figure 90:
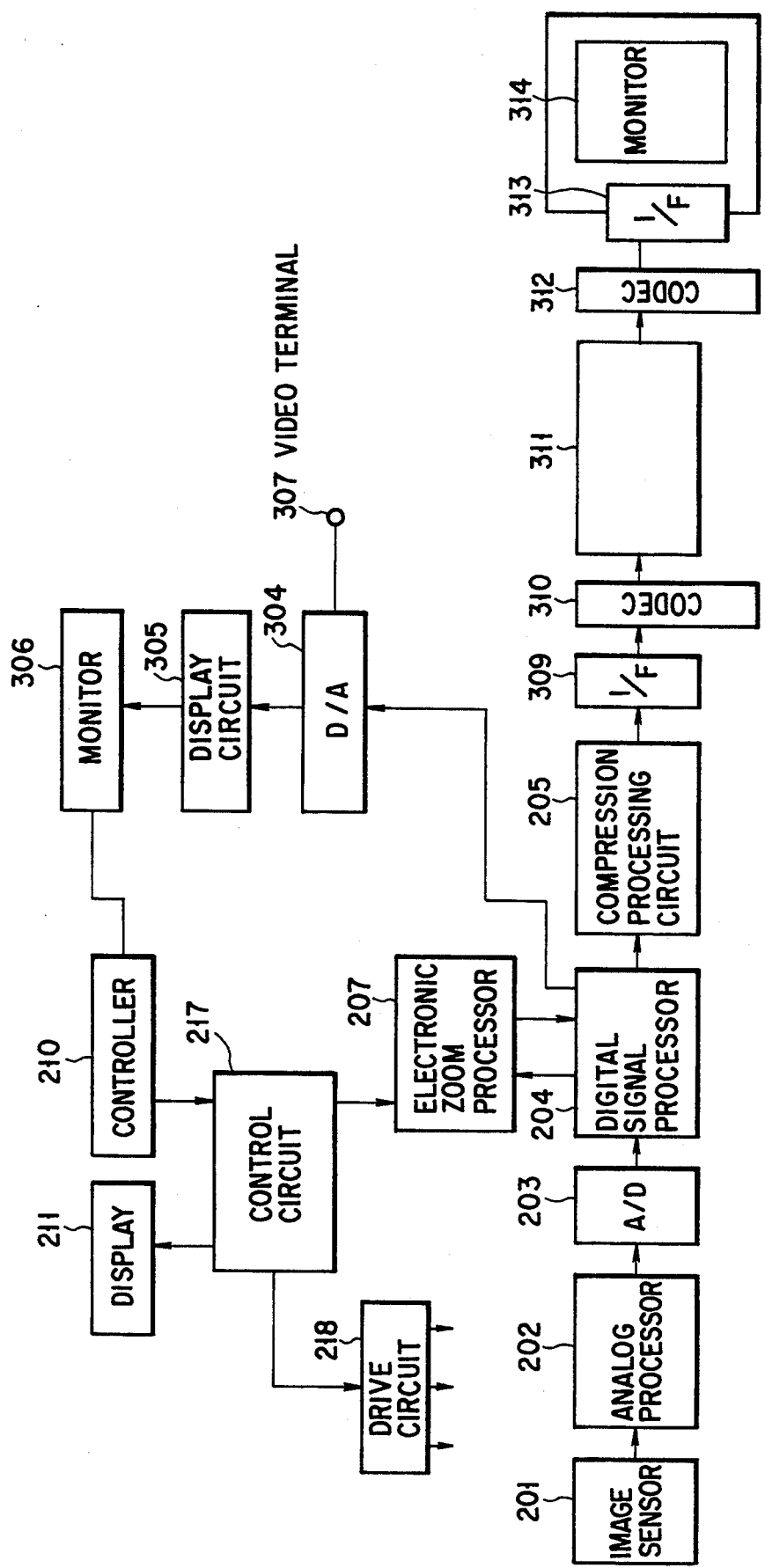
FIG. 90 is a block diagram of an image sensor according to a still further embodiment associated with FIG. 78.

Further, if a communication interface 309 is provided as shown in FIG. 90, this camera system can be used in a TV conference system and a TV telephone system, which outputs a video image on a TV monitor 314 at a remote site via a codec 310, a communication channel 311, a codec 312, and a communication interface 313.

As described above when this electronic zoom system is used in a motion picture system, the block-coding originated deterioration of the image quality can be suppressed, the compression can save the necessary memory, and the amount of communication can be reduced.

Additional advantages and modifications will readily occur to those skilled in the art. Therefore the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic device comprising:
an image sensor for outputting an image signal based upon an optical image that is incident thereon, the image sensor including:
a plurality of optical filters arranged in both a horizontal and a vertical direction; and
a plurality of pixels located at positions corresponding to positions of the optical filters; and
a moving unit for moving the optical image in one of the horizontal direction and the vertical direction, and for moving the optical image in an oblique direction among first second, third and fourth positions, the first, second, third and fourth positions defining four vertexes of a parallelogram the first position being a current position of the optical image, the second position being shifted by a distance of one pixel pitch from the first position in one of the horizontal and vertical directions, the third position being shifted by a distance of a half pixel pitch from the first position in both the horizontal and vertical directions, the fourth position being shifted a distance from the first position so as to form the fourth vertex along a diagonal of the parallelogram;
the image signal outputted by the image sensor being readable at each of the first, second, third and fourth positions.

2. An electronic device comprising:
an image sensor for outputting an image signal based upon an optical image that is incident thereon, the image sensor including:
a plurality of optical filters arranged in both a horizontal and a vertical direction; and
a plurality of pixels located at positions corresponding to positions of the optical filters; and
a moving unit for moving the image sensor in one of the horizontal direction and the vertical direction, and for moving the optical image in an oblique direction among first, second, third and fourth positions, the first, second, third and fourth positions defining four vertexes of a parallelogram, the first position being a current position of the image sensor, the second position being shifted by a distance of one pixel pitch from the first position in one of the horizontal and vertical directions, the third position being shifted by a distance of a half pixel pitch from the first position in both the horizontal and vertical directions, the fourth position being shifted by a distance from the first position so as to form the fourth vertex along a diagonal of the parallelogram;
the image signal outputted by the image sensor being readable at each of the first, second, third and fourth positions.

3. An electronic device comprising:
an image sensor for outputting an image signal based upon an optical image that is incident thereon, the image sensor including:
a plurality of optical color filters arranged in both a horizontal and a vertical direction, the optical filters including:
mosaic filters, having filter elements, arranged in both the horizontal and vertical directions, each of the mosaic filters being arranged in a unit in which the filter elements are arranged in one of a pattern of two rows and two columns, a pattern of four rows and two columns and a pattern of two rows and four columns, the filter elements being one of three-color and four-color filter elements; and
a plurality of pixels located at positions corresponding to positions of the optical color filters; and
a moving unit for moving the optical image in one of the horizontal direction and the vertical direction, and for moving the optical image in an oblique direction among first second, third and fourth positions, the first, second, third and fourth positions defining four vertexes of a parallelogram, the first position being a current position of the optical image, the second position being shifted by a distance of one pixel pitch from the first position in one of the horizontal and vertical directions, the third position being shifted by a distance of a half pixel pitch from the first position in both the horizontal and vertical directions, the fourth position being shifted by a distance from the first position so as to form the fourth vertex along a diagonal of the parallelogram;
the image signal outputted by the image sensor being readable at each of the first, second, third and fourth positions.

4. An electronic device according to claim 3, further comprising signal processing means for producing a single still image by processing the image signals outputted by the image sensor at the first, second, third and fourth positions.

5. An electronic device according to claim 3, wherein the moving means moves the optical image from the first position to one of the other three positions, then moves the optical image to one of the remaining two positions, and then moves the optical image to the only remaining position.

6. An electronic device according to claim 5, wherein the moving means returns the optical image to the first position after being moved to each of the first, second, third, and fourth positions.

7. An electronic device according to claims 3, wherein the image sensor further includes means for draining electric charges, which have accumulated on the image sensor, when the moving means moves the optical image.

8. An electronic device according to claims 3, wherein the image sensor further includes means for draining accumulated electric charges, when the moving means moves the optical image.

9. An electronic device according to claims 3, wherein the image sensor further includes means for recognizing a signal outputted by the image sensor, which contains accumulated electric charges, when the moving means moves the optical image.

10. An electronic device according to claims 3, wherein the moving means includes means for electrically moving the image sensor.

11. An electronic device according to claim 10, wherein the moving means includes a piezoelectric element.

12. An electronic device according to claims 3, wherein the moving means includes a parallel-plate member, disposed in front of the image sensor, for changing an optical path along which the optical image is incident on the image sensor.

13. An electronic device according to claims 3, wherein the one of three-color and four-color filter elements includes one of a color green and a color that includes a green-color component, and wherein a pixel arrangement of the one of the color green and the color that includes a green-color component, which is obtained after the image signal is outputted by the image sensor in the first, second, third and fourth positions, is formed in a checkered pattern with a half pixel pitch in the horizontal and the vertical directions.

14. An electronic device according to claims 3, wherein the filter elements are divided into a plurality of filter element blocks each filter element block including four filter elements which are arranged so that two of the four filter elements are in the vertical direction and the other two of the four filter elements are in the horizontal direction, and wherein two of the four filter elements each include a green color filter element.

15. An electronic device according to claims 14, wherein the green color filter elements are arranged in the oblique direction.

16. An electronic device according to claim 14, wherein two of the four filter elements include a red color and a blue color filter element.

17. An electronic device according to claims 16, wherein the green color filter elements are arranged in the oblique direction.

18. An electronic device comprising:
an image sensor for outputting an image signal based upon an optical image that is incident thereon, the image sensor including:
a plurality of optical color filters arranged in both a horizontal and a vertical direction, the optical filters including:
mosaic filters, having filter elements, arranged in both the horizontal and vertical directions, each of the mosaic filters being arranged in a unit in which the filter elements are arranged in one of a pattern of two rows and two columns, a pattern of four rows and two columns and a pattern of two rows and four columns, the filter elements being one of three-color and four-color filter elements; and
a plurality of pixels located at positions corresponding to positions of the optical color filters; and
a moving unit for moving the image sensor in one of the horizontal direction and the vertical direction, and for moving the optical image in an oblique direction among first, second, third and fourth positions, the first, second, third and fourth positions defining four vertexes of a parallelogram, the first position being a current position of the image sensor, the second position being shifted by a distance of one pixel pitch from the first position in one of the horizontal and vertical directions, the third position being shifted by a distance of a half pixel pitch from the first position in both the horizontal and vertical directions, the fourth position being shifted by a distance from the first position so as to form the fourth vertex along a diagonal of the parallelogram;
the image signal outputted by the image sensor being readable at each of the first, second, third and fourth positions.

19. An electronic device according to claim 18, further comprising signal processing means for producing a single still image by processing the image signals outputted by the image sensor at the first, second, third and fourth positions.

20. An electronic device according to claim 18, wherein the moving means moves the image sensor from the first position to one of the other three positions, then moves the image sensor to one of the remaining two positions, and then moves the image sensor to the only remaining position.

21. An electronic device according to claim 20, wherein the moving means returns the image sensor to the first position after being moved to each of the first, second, third, and fourth positions.

22. An electronic device according to claim 18, wherein the image sensor further includes means for draining electric charges, which have accumulated on the image sensor, when the moving means moves the image sensor.

23. An electronic device according to claim 18, wherein the image sensor further includes means for draining accumulated electric charges when the moving means moves the image sensor.

24. An electronic device according to claim 18, wherein the image sensor further includes means for recognizing a signal outputted by the image sensor, which contains accumulated electric charges, when the moving means moves the image sensor.

25. An electronic device according to claim 18, wherein the moving means includes means for electrically moving the image sensor.

26. An electronic device according to claim 18, wherein the moving means includes a piezoelectric element.

27. An electronic device according to claim 18, wherein the moving means includes a parallel-plate member, disposed in front of the image sensor, for changing an optical path along which the optical image is incident on the image sensor.

28. An electronic device according to claim 18, wherein the one of three-color and four-color filter elements includes one of a color green and a color that includes a green-color component, and wherein a pixel arrangement of the one of the color green and the color that includes a green-color component, which is obtained after the image signal is outputted by the image sensor in the first, second, third and fourth positions, is formed in a checkered pattern with a half pixel pitch in the horizontal and the vertical directions.

29. An electronic device according to claim 18, wherein the filter elements are divided into a plurality of filter element blocks, each filter element block including four filter elements which are arranged so that two of the four filter elements are in the vertical direction and the other two of the four filter elements are in the horizontal direction, and wherein two of the four filter elements each include a green color filter element.

30. An electronic device according to claim 29, wherein the green color filter elements are arranged in the oblique direction.

31. An electronic device according to claim 29, wherein two of the four filter elements include a red color and a blue color filter element.

32. An electronic device according to claim 31, wherein the green color filter elements are arranged in the oblique direction.

* * * * *